(12) United States Patent
Ryu et al.

(10) Patent No.: US 8,717,961 B2
(45) Date of Patent: May 6, 2014

(54) METHOD AND APPARATUS FOR TRANSMITTING BROADCAST, METHOD AND APPARATUS FOR RECEIVING BROADCAST

(75) Inventors: Ga-Hyun Ryu, Suwon-si (KR); Sung-Il Park, Suwon-si (KR); Jong-Hwa Kim, Suwon-si (KR); Kyo-Shin Choo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 12/537,021

(22) Filed: Aug. 6, 2009

(65) Prior Publication Data

US 2009/0296624 A1    Dec. 3, 2009

Related U.S. Application Data

(63) Continuation of application No. PCT/KR2008/002699, filed on May 14, 2008.

(60) Provisional application No. 60/917,776, filed on May 14, 2007, provisional application No. 60/944,619, filed on Jun. 18, 2007, provisional application No. 60/974,321, filed on Sep. 21, 2007, provisional application No. 60/978,488, filed on Oct. 9, 2007, provisional application No. 61/047,556, filed on Apr. 24, 2008, provisional application No. 61/071,364, filed on Apr. 24, 2008, provisional application No. 61/071,369, filed on Apr. 24, 2008, provisional application No. 61/071,393, filed on Apr. 25, 2008, provisional application No. 60/938,477, filed on May 17, 2007.

(51) Int. Cl.
*H04H 20/71* (2008.01)

(52) U.S. Cl.
USPC .......................................... 370/312; 370/432

(58) Field of Classification Search
None
See application file for complete search history.

(56) References Cited

U.S. PATENT DOCUMENTS

| 5,400,401 A | 3/1995 | Wasilewski et al. |
| 6,215,530 B1 | 4/2001 | Wasilewski |

(Continued)

FOREIGN PATENT DOCUMENTS

| CN | 1671191 A | 9/2005 |
| CN | 1929614 A | 3/2007 |

(Continued)

OTHER PUBLICATIONS

ETSI EN 300 401 v1.4.1, Radio Broadcasting Systems; Digital Audio Broadcasting (DAB) to mobile, portable and fixed receivers, Jan. 2006.*

(Continued)

*Primary Examiner* — Alex Skripnikov
(74) *Attorney, Agent, or Firm* — Sughrue Mion, PLLC

(57) ABSTRACT

Provided are a method and apparatus for transporting a broadcast and a method and apparatus for receiving a broadcast. In the method of transporting a broadcast service for mobile communications, the method includes generating an encapsulation packet including configuration information adaptive to application data that is to be transmitted and the application data; generating transport packets having data regarding the encapsulation packet by dividing the encapsulation packet into predetermined-sized packets, where the transport packets include information regarding the structures of the transport packets; and generating service configuration information including information set about a channel having the transport packets, and including the service configuration information in a service information channel at a predetermined location from among at least one transport channel on a transport stream. Accordingly, it is possible to efficiently use a data region and increase the speed of data transmission.

2 Claims, 111 Drawing Sheets

(56) References Cited

U.S. PATENT DOCUMENTS

| | | | |
|---|---|---|---|
| 6,598,226 | B1 | 7/2003 | Sorensen |
| 7,477,630 | B2 | 1/2009 | Kim et al. |
| 7,792,121 | B2 | 9/2010 | Thompson, III et al. |
| 7,886,323 | B2 | 2/2011 | Park |
| 2002/0142757 | A1 | 10/2002 | Leung et al. |
| 2002/0146038 | A1 | 10/2002 | Casavant et al. |
| 2003/0063615 | A1 | 4/2003 | Luoma et al. |
| 2004/0136352 | A1 | 7/2004 | Fu et al. |
| 2004/0190629 | A1 | 9/2004 | Cooper et al. |
| 2005/0232136 | A1* | 10/2005 | Kwak .................. 370/208 |
| 2005/0273833 | A1 | 12/2005 | Soinio |
| 2006/0053450 | A1 | 3/2006 | Saarikivi et al. |
| 2006/0067317 | A1 | 3/2006 | Engstrand et al. |
| 2006/0246836 | A1 | 11/2006 | Simon |
| 2006/0294205 | A1 | 12/2006 | Aaltonen et al. |
| 2007/0040937 | A1 | 2/2007 | Eum |
| 2007/0041377 | A1 | 2/2007 | Song et al. |
| 2007/0118586 | A1 | 5/2007 | Hwang et al. |
| 2008/0285556 | A1 | 11/2008 | Park et al. |
| 2009/0214043 | A1 | 8/2009 | Choi et al. |

FOREIGN PATENT DOCUMENTS

| | | | |
|---|---|---|---|
| DE | 10139066 | A1 | 2/2003 |
| DE | 60008251 | T2 | 12/2004 |
| DE | 10360431 | A1 | 7/2005 |
| EP | 1081866 | A3 | 3/2001 |
| JP | 2000-069454 | A | 3/2000 |
| JP | 2007-006349 | A | 1/2001 |
| KR | 10-2004-0007588 | A | 1/2004 |
| KR | 10-2004-0036447 | A | 4/2004 |
| KR | 10-2004-0058502 | A | 7/2004 |
| KR | 10-2004-0062893 | A | 7/2004 |
| KR | 10-2005-0056708 | A | 6/2005 |
| KR | 10-0565098 | B1 | 3/2006 |
| KR | 10-2006-0059877 | A | 6/2006 |
| KR | 10-2006-0126056 | A | 12/2006 |
| KR | 10-2007-0021032 | A | 2/2007 |
| KR | 10-2007-0025851 | A | 3/2007 |
| KR | 10-0692903 | B1 | 3/2007 |
| KR | 10-2007-0049042 | A | 5/2007 |
| KR | 10-2008-0100753 | A | 11/2008 |
| KR | 10-2009-0090809 | A | 8/2009 |
| WO | 03/010975 | A1 | 2/2003 |
| WO | 2005/041594 | A1 | 5/2005 |
| WO | 2006/006009 | A1 | 1/2006 |
| WO | 2007/013026 | A2 | 2/2007 |

OTHER PUBLICATIONS

German Office Action issued on Jan. 13, 2011 in the corresponding German Patent Application No. 112008000552.4.
Korean Office Action issued on Jan. 14, 2011 in the corresponding Korean Patent Application No. 10-2009-0097026.
Mexican Office Action issued in corresponding Application No. MX/a/2009/004942 on Jun. 2, 2011.
Korean Office Action issued in corresponding Korean Application No. 10-2011-7016426 on Jul. 29, 2011.
Setlur, et al., "A Mobile Open Rich Media Environment", ICME. 2006.26.26.12, Jul. 9, 2006, pp. 2029-2032.
Communication from the Canadian Patent Office in counterpart application No. 2,667,571 issued Apr. 4, 2011.
Communication from the Canadian Patent Office in counterpart application No. 2,666,573 issued Apr. 18, 2011.
Office Action from the State Intellectual Property Office of P.R. China, dated Sep. 15, 2011, issued in corresponding Chinese Application No. 200880001062.7.
International Search Report and Written Opinion for PCT/KR2008/001372, dated Jul. 8, 2008.
International Search Report and Written Opinion for PCT/KR2008/002697, dated Nov. 5, 2008.
International Search Report and Written Opinion for PCT/KR2008/003267, dated Dec. 9, 2008.
Communication from the Finnish Patent Office issued Mar. 8, 2012 in counterpart Finnish Application No. 20095929.
International Search Report and Written Opinion for PCT/KR2008/002750, dated Sep. 25, 2008.
Communication dated Jul. 2, 2012 from the State Intellectual Property Office of P.R. China in a counterpart application No. 200880001075.4.
Communication from the Canadian Patent Office issued Jul. 5, 2012 in counterpart Canadian Application No. 2702054.
Communication from the Canadian Patent Office issued Jul. 9, 2012 in counterpart Canadian Application No. 2667571.
Communication dated Jan. 5, 2013 issued by the State Intellectual Property Office of P.R. China in counterpart Chinese Patent Application No. 200880001075.4.
Communication dated May 2, 2013 issued by the State Intellectual Property Office of P.R. China in counterpart Chinese Patent Application No. 200880001075.4.
Communication dated May 31, 2013 issued by the Canadian Intellectual Property Office in counterpart Canadian Patent Application No. 2 702 054.
Communication dated Jul. 10, 2013 issued by the Korean Intellectual Property Office in counterpart Korean Patent Application No. 10-2010-0108395.
Communication dated Jul. 10, 2013 issued by the Korean Intellectual Property Office in counterpart Korean Patent Application No. 10-2010-0108396.
Communication dated Jul. 10, 2013 issued by the Korean Intellectual Property Office in counterpart Korean Patent Application No. 10-2010-0108397.
Communication dated Jul. 31, 2013, issued by the Korean Intellectual Property Office in counterpart Korean Application No. 10-2007-0074642.
Communication, dated Nov. 6, 2013, issued by the Finnish Patent and Registration Office in counterpart Finnish Patent Application No. 20095927.
Communication, dated Jan. 16, 2014, issued by the Finnish Patent and Registration Office in counterpart Finnish Patent Application No. 20105338.
Communication, dated Dec. 17, 2013, issued by the Korean Intellectual Property Office in counterpart Korean Patent Application No. 10-2007-0124371.
Communication, dated Dec. 17, 2013, issued by the Canadian Intellectual Property Office in counterpart Canadian Patent Application No. 2,667,571.
Communication, dated Jan. 9, 2014, issued by the Korean Intellectual Property Office in counterpart Korean Patent Application No. 10-2010-0108395.
Communication, dated Jan. 9, 2014, issued by the Korean Intellectual Property Office in counterpart Korean Patent Application No. 10-2010-0108396.
Communication, dated Jan. 9, 2014, issued by the Korean Intellectual Property Office in counterpart Korean Patent Application No. 10-2010-0108397.
Communication, dated Feb. 14, 2014, issued by the Korean Intellectual Property Office in counterpart Korean Patent Application No. 10-2007-0074642.
Communication, dated Feb. 19, 2014, issued by the Korean Intellectual Property Office in counterpart Korean Patent Application No. 10-2008-0002954.

\* cited by examiner

FIG. 10A

| Syntax | # of bits |
|---|---|
| ServiceConfigurationInformation() | |
| { | |
|     turbo_channel_information_flag | 1 |
|     additional_service_information_flag | 1 |
|     padding_flag | 1 |
|     reserved | 1 |
|     version_indicator_information () | 12 |
|     frame_group_information () | 16 |
|     if(turbo_channel_information_flag) | |
|     { | |
|         turbo_channel_information () | 8*N |
|     } | |
|     if (additional_service_information_flag) | |
|     { | |
|         addtional_service_information() | 8*N |
|     } | |
|     if(padding_flag) | |
|     { | |
|         byte | 8*N |
|     } | |
|     CRC | 16 |
| } | |

FIG. 10B

| Syntax | # of bits |
|---|---|
| ServiceConfigurationInformation() | |
| { | |
|     current_frame_number | 8 |
|     total_frame_number | 8 |
|     if(current_frame_number %2 == 0) | |
|     { | |
|         TCC_next_update_offset | 8 |
|         TCC_version | 3 |
|         number_of_turbo_channel | 5 |
|         for (i=0 ; i < N ; i ++) | |
|         { | |
|             turbo_channel_configuration() | 8*N |
|         } | |
|     } else | |
|     { | |
|         BD_next_update_offset | 8 |
|         BD_packet() | 8*N |
|     } | |
| } | |

FIG. 10C

| Syntax | No. of Bits | Format |
|---|---|---|
| ServiceConfigurationInformation() { | | |
|     current_frame_number | 8 | uimsbf |
|     total_frame_number | 8 | uimsbf |
|     if (current_frame_number % 2 == 0) { | | |
|         wake_up_mode | 7 | uimsbf |
|         TCC_next_update_offset | | |
|         TCC_version | 3 | uimsbf |
|         number_of_turbo_channel | 5 | uimsbf |
|         for (i=0 ; i < number_of_turbo_channel ; i ++) { | | |
|             turbo_channel_configuration() | var | bslbf |
|         } | | |
|     } else { | | |
|         BD_next_update_offset | 8 | uimsbf |
|         BD_packet() | var | bslbf |
|     } | | |
| } | | |

FIG. 11

| Syntax | # of bits |
|---|---|
| version_indicator_information() | |
| { | |
|     frame_counter | 8 |
|     version | 4 |
| } | |

FIG. 12

| Syntax | # of bits |
|---|---|
| frame_group_information() | |
| { | |
|     current_frame_number | 8 |
|     total_frame_number | 8 |
| } | |

FIG. 13

| Syntax | # of bits |
|---|---|
| turbo_channel_information () | |
| { | |
|     version | 4 |
|     Turbo_svc | 4 |
|     For (i=0; i<=turbo_svc; i++) | |
|     { | |
|         Turbo_svc_id | 4 |
|         Is_Enhanced | 1 |
|         Reserved | 1 |
|         MCAST_Frame_Slicing_flag | 1 |
|         MCAST_AL_FEC_flag | 1 |
|         turbo_start_position | 20 |
|         turbo_fragments_bits | 4 |
|         turbo_arrange_index | 3 |
|         coding_rates | 3 |
|         reserved | 2 |
|         if (MCAST_Frame_Slicing_flag) | |
|         { | |
|             Start_frame_number | 8 |
|             Frame_block_number | 8 |
|         } | |
|         if(MCAST_AL_FEC_flag) | |
|         { | |
|         } | |
|     } | |
| } | |

FIG. 14

| Syntax | # of bits |
|---|---|
| additional_service_information() | |
| { | |
|    current_index | 8 |
|    last_index | 8 |
|    length | 8 |
|    user_data | 8*N |
| } | |

FIG. 15

| Syntax | # of bits |
|---|---|
| turbo_channel_info_descriptor () | |
| { | |
|     Tag | 8 |
|     Length | 8 |
|     version | 4 |
|     Turbo_svc | 4 |
|     For (i=0; i<=turbo_svc; i++) | |
|     { | |
|         Turbo_svc_id | 4 |
|         Is_Enhanced | 1 |
|         Reserved | 1 |
|         MCAST_Frame_Slicing_flag | 1 |
|         MCAST_AL_FEC_flag | 1 |
|         Turbo_start_position | 20 |
|         turbo_fragments_bits | 4 |
|         Turbo_arrange_index | 3 |
|         coding_rates | 3 |
|         reserved | 2 |
|         if(MCAST_Frame_Slicing_flag) | |
|         { | |
|             Start_frame_number | 8 |
|             Frame_block_number | 8 |
|         } | |
|         if(MCAST_AL_FEC_flag) | |
|         { | |
|         } | |
|     } | |
| } | |

FIG. 16A

| Syntax | # of bits |
|---|---|
| turbo_channel_configuration() | |
| { | |
|    selector_bits | 3 |
|    turbo_channel_id | 5 |
|    if (selector_bits & 0b1xx) | |
|    { | |
|       start_frame_number | 8 |
|       frame_count | 8 |
|    } | |
|    if (selector_bits & 0bx1x) | |
|    { | |
|       reserved | 3 |
|       turbo_cluster_size | 5 |
|    } else if (selector_bits & 0bx0x) | |
|    { | |
|       is_enhanced | 1 |
|       adaptive_time_slicing_flag | 1 |
|       reserved | 3 |
|       coding_rates | 3 |
|       full_packet_flag | 1 |
|       turbo_start_sector | 7 |
|       reserved | 1 |
|       turbo_cluster_size | 7 |
|    } | |
|    if (selector_bits & xx1) | |
|    { | |
|       turbo_channel_descriptor_loop() | 8*N |
|    } | |
| } | |

FIG. 16B

| Syntax | No. of Bits | Format |
|---|---|---|
| turbo_channel_configuration() { | | |
|     selector_bits | 3 | bslbf |
|     turbo_channel_id | 5 | uimsbf |
|     if (selector_bits & 0b1xx) { | | |
|         start_frame_number | 8 | uimsbf |
|         frame_count | 8 | uimsbf |
|     } | | |
|     if (selector_bits & 0bx1x) { | | |
|         reserved | 3 | bslbf |
|         turbo_cluster_size | 5 | uimsbf |
|     } else if (selector_bits & 0bx0x) { | | |
|         is_enhanced | 1 | bslbf |
|         adaptive_time_slicing_flag | 1 | bslbf |
|         enhanced_protection_mode | 1 | bslbf |
|         reserved | 2 | Bslbf |
|         coding_rates | 3 | uimsbf |
|         full_packet_flag | 1 | bslbf |
|         turbo_start_sector | 7 | uimsbf |
|         reserved | 1 | bslbf |
|         turbo_cluster_size | 7 | uimsbf |
|     } | | |
|     if (selector_bits & 0bxx1) | | |
|         descriptor_loop() | var | bslbf |
| } | | |

FIG. 17

| Syntax | # of bits |
|---|---|
| descriptor_loop()<br>{<br>    do{<br>        next_indicator<br>        tag<br>        length<br>        descriptor_information()<br>    } while(next_indicator);<br>} | 1<br>7<br>8<br>8*N |

FIG. 18

| Syntax | No. of Bits | Format |
|---|---|---|
| frame_group_update() {<br>    next_update_offset<br>    new_GOF<br>} | <br>8<br>8 | <br>Uimsbf<br>Uimsbf |

FIG. 19A

| Syntax | # of bits |
|---|---|
| Frame_Slicing_Duration_Update()<br>{<br>  new_start_frame_number<br>  new_frame_count<br>} | 8<br>8 |

FIG. 19B

| Syntax | No. of Bits | Format |
|---|---|---|
| Frame_Slicing_Duration_Update() { | | |
| next_update_offset | 8 | uimsbf |
| new_start_frame_number | 8 | uimsbf |
| new_frame_count | 8 | uimsbf |
| } | | |

FIG. 20A

| Syntax | # of bits |
|---|---|
| SRS_position_update()<br>{<br>  start_frame_offset<br>  reserved<br>    turbo_cluster_size<br>} | 8<br>3<br>5 |

FIG. 20B

| Syntax | No. of Bits | Format |
|---|---|---|
| SRS_position_update() { | | |
| next_update_offset | | |
| start_frame_offset | 8 | Uimsbf |
| reserved | 3 | Bslbf |
| turbo_cluster_size | 5 | Uimsbf |
| } | | |

FIG. 21A

| Syntax | # of bits |
|---|---|
| turbo_channel_update () | |
| { | |
|     start_frame_offset | 8 |
|     is_enhanced | 1 |
|     reserved | 4 |
|     coding_rates | 3 |
|     full_packet_flag | 1 |
|     turbo_start_sector | 7 |
|     reserved | 1 |
|     turbo_cluster_size | 7 |
| } | |

FIG. 21B

| Syntax | No. of Bits | Format |
|---|---|---|
| turbo_channel_update () { | | |
| next_update_offset | 8 | uimsbf |
| start_frame_offset | 8 | uimsbf |
| is_enhanced | 1 | bslbf |
| adaptive_time_slicing_flag | 1 | bslbf |
| enhanced_protection_mode | 1 | bslbf |
| reserved | 2 | Bslbf |
| coding_rates | 3 | uimsbf |
| full_packet_flag | 1 | bslbf |
| turbo_start_sector | 7 | uimsbf |
| reserved | 1 | bslbf |
| turbo_cluster_size | 7 | uimsbf |
| } | | |

FIG. 22A

| Syntax | # of bits |
|---|---|
| BD_packet () | |
| { | |
| first_last | 2 |
| padding_flag | 1 |
| reserved | 2 |
| BD_version | 3 |
| if(padding_flag) | |
| { | |
|     padding_length | 8 |
|     for(i=0 ; i < padding_length ; i++) | |
|         padding_byte | 8*N |
| } | |
| BD_fragment | 8*N |
| } | |

FIG. 22B

| Syntax | No. of Bits | Format |
|---|---|---|
| BD_packet () { | | |
|     first_last | 2 | bslbf |
|     padding_flag | 1 | bslbf |
|     System_time_flag | 1 | bslbf |
|     reserved | 4 | Bslbf |
|     If(System_time_flag) | | |
|         System_time | 40 | uimsbf |
|     reserved | 4 | uimsbf |
|     BD_version | 4 | uimsbf |
|     if(padding_flag) { | | bslbf |
|         padding_length | 8 | uimsbf |
|         for(i=0 ; i < padding_length ; i++) | | |
|             padding_byte | 8 | bslbf |
|     } | | |
|     BD_fragment() | var | bslbf |
| } | | |

FIG. 23

| Syntax | # of bits |
|---|---|
| Broadcast_Descriptor () { <br>   number_of_BD <br>   for(i =0 ; i < number_of_BD ; i++) <br>   { <br>      tag <br>      length <br>      Broadcast_Descriptor_information() <br>   } <br>} | 8<br>8<br>8<br>8*N |

FIG. 24A

| Syntax | # of bits |
|---|---|
| Channel_info_update ()<br>{<br>   update_frame_counter<br>   new_TCC_version<br>   number_of_turbo_channel<br>   for (i=0 ; i < number_of_turbo_channel ; i ++)<br>   {<br>      new_turbo_channel_configuration()<br>   }<br>} | 8<br>3<br>5<br><br>8*N |

FIG. 24B

| Syntax | No. of Bits | Format |
|---|---|---|
| Channel_info_update () { | | |
| next_update_offset | 8 | uimsbf |
| reserved | 3 | uimsbf |
| number_of_turbo_channel | 5 | uimsbf |
| for (i=0 ; i < number_of_turbo_channel ; i ++) | | |
| new_turbo_channel_configuration() | var | bslbf |
| } | | |

FIG. 24C

| Syntax | No. of Bits | Format |
|---|---|---|
| Channel_info_update () { | | |
|     update_frame_counter | 8 | uimsbf |
|     new_TCC_version | 3 | uimsbf |
|     number_of_turbo_channel | 5 | uimsbf |
|     for (i=0 ; i < number_of_turbo_channel ; i ++) | | |
|     new_turbo_channel_configuration() } | var | bslbf |

FIG. 25A

| Syntax | # of bits |
|---|---|
| IP_mapping_table() | |
| { | |
|    extended_version | 1 |
|    number_of_IP | 7 |
|    for(i=0;i<number_of_IP;i++) | |
|    { | |
|       reference_ch_flag | 1 |
|       reserved | 2 |
|       turbo_channel_id | 5 |
|       reserved | 3 |
|       LMT_Index_number | 5 |
|       number_of_IP_ch_descriptor | 8 |
|       for(i = 0 ; i < number_of_IP_ch_descriptor ; i ++) | |
|       { | |
|          IP_channel_description() | 8*N |
|       } | |
|    } | |
| } | |

FIG. 25B

| Syntax | No. of Bits | Format |
|---|---|---|
| IP_mapping_table() { | | |
|     extended_version | 1 | bslbf |
|     number_of_channel | 7 | uimsbf |
|     for(i=0;i<number_of_channel;i++) { | | |
|         reference_ch_flag | 1 | bslbf |
|         reserved | 2 | bslbf |
|         turbo_channel_id | 5 | uimsbf |
|         VMI | 8 | uimsbf |
|         number_of_IP_ch_descriptor | 8 | uimsbf |
|         for(i = 0 ; i < number_of_IP_ch_descriptor ; i ++) | | |
|             IP_channel_description() | var | bslbf |
| } | | |

FIG. 26

| Syntax | # of bits |
|---|---|
| IP_channel_description() {  tag  length  IP_channel_table() } | 8 8 8*N |

FIG. 27A

| Syntax | # of bits |
|---|---|
| IP_address_table () {  reserved  IP_version  if(IP_version = IPv4)  {  IPv4_address  }  else if(IP_version = IPv6)  {  IPv6_address  }  port_number } | 4 4 32 128 16 |

FIG. 27B

| Syntax | No. of Bits | Format |
|---|---|---|
| IP_address_table () { | | |
|     port_number_usage_flag | 1 | bslbf |
|     reserved | 3 | bslbf |
|     IP_version | 4 | uimsbf |
|     if(IP_version = IPv4) | | |
|         IPv4_address | 32 | uimsbf |
|     else if(IP_version = IPv6) | | |
|         IPv6_address | 128 | uimsbf |
| if(port_number_usage_flag ) | | |
|     port_number | 16 | uimsbf |
| } | | |

FIG. 28

| Syntax | No. of Bits | Format |
|---|---|---|
| MAC_address_table() { | | |
|     MAC_address | 48 | uimsbf |
| } | | |

FIG. 29

| Syntax | No. of Bits | Format |
|---|---|---|
| Text_description_table() { | | |
|     ISO_639_language_code | 24 | bslbf |
|     for(i = 0 ; i < N ; i++) | | |
|         description | 8*N | bslbf |
| } | | |

FIG. 35B

| Syntax | # of bits |
|---|---|
| LMT_field() | |
| { | |
| tag | 7 |
| length | 8 |
| for(i=0; i<length; i++){ | |
| LMT_information | 8 |
| } | |
| } | |

FIG. 36

| Syntax | # of bits |
|---|---|
| LMT_information() | |
| { | |
| LMT_coverage | 3 |
| reserved | 1 |
| version_number | 4 |
| LMT_boundary | 8 |
| SD_end_offset | 8 |
| number_of_IP | 8 |
| for(i=0;i<number_of_IP ;i++) | |
| IP_end_offset | 8 |
| } | |

FIG. 37B

| Syntax | # of bits |
|---|---|
| LMT_information() <br> { <br>   cur_LMT_coverage <br>   version_number <br>   SEP_flag <br>   LMT_boundary <br>   if(SEP_flag) <br>   { <br>     reserved <br>     SEP_end_offest <br>   } <br>   do{ <br>     next_indicator <br>     real-time_end_offset <br>   } while(next_indicator) <br>   do{ <br>     next_indicator <br>     IP_end_offset <br>   } while(next_indicator) <br>   do{ <br>     next_indicator <br>     object_end_offset <br>   } while(next_indicator) <br>   do{ <br>     next_indicator <br>     real-time_end_offset <br>   } while(next_indicator) <br> } | <br><br>3<br>5<br>1<br>7<br><br><br><br>1<br>7<br><br><br><br>1<br>7<br><br><br>1<br>7<br><br><br>1<br>7<br><br><br>1<br>7 |

FIG. 38

| Syntax | No. of Bits | Format |
|---|---|---|
| LMT_information() { | | |
|     LMT_coverage | 3 | uimsbf |
|     version_number | 2 | uimsbf |
|     selector_bits(SEP,IP) | 3 | bslbf |
|     LMT_Length | 8 | uimsbf |
|     LMT_boundary | 8 | uimsbf |
|     if(selector_bits & 1xx) { | | |
|         num_of_SEP | 8 | uimsbf |
|         for(I = 0 ; I < num_of_SEP;i++){ | | |
|             VMI | 8 | uimsbf |
|             SEP_end_offset | 8 | uimsbf |
|         } | | |
|     } | | |
|     if(selector_bits & x1x) { | | |
|         reserved | | |
|     } | | |
|     if(selector_bits & xx1) { | | |
|         num_of_IP | 8 | uimsbf |
|         for(I = 0 ; I < num_of_IP;i++){ | | |
|             VMI | 8 | uimsbf |
|             IP_end_offset | 8 | uimsbf |
|         } | | |
|     } | | |

FIG. 41B

| Syntax | # of bits |
|---|---|
| LIT_information() | |
| { | |
|    num_of_service | 6 |
|    reserved | 5 |
|    version_number | 5 |
|    for(i=0; i<num_of_service; i++) | |
|    { | |
|       service_ID | 8 |
|       do{ | |
|          next_indicator | 1 |
|          type_info | 2 |
|          LMT_index_number | 5 |
|       } while (next_indicator == 1) | |
|    } | |
| } | |

FIG. 43

| Syntax | # of bits |
|---|---|
| Object_Delivery_information | |
| { | |
|    directory_information_flag | 1 |
|    reserved | 5 |
|    number_of_objects | 10 |
|    if(directory information flag) | |
|    { | |
|      number_of_directory | 8 |
|      for(i=0; i<N ; i++) | |
|      { | |
|        directory_information() | 8*N |
|      } | |
|    } | |
|    for(i = 0 ; i < number_of_object ; i ++) | |
|    { | |
|      object_id | 10 |
|      expire_time_flag | 1 |
|      LMT_index_number | 5 |
|      object_extension_id | 4 |
|      AL_FEC_mode | 4 |
|      total_length | 32 |
|      if(expire_time) | |
|        time_table() | 8*N |
|      if (AL_FEC_mode =0x01 /*MCAST AL-FEC*/) | |
|      { | |
|        encoding_mode | 4 |
|        padding_length | 12 |
|      } | |
|      number_of_descriptors | 8 |
|      for(i = 0 ; i < N ; i++) | |
|      { | |
|        tag | 8 |
|        length | 8 |
|        descriptor() | 8*N |
|      } | |
|    } | |
| } | |

FIG. 44

| Syntax | # of bits |
|---|---|
| directory_information() | |
| { | |
|   reserved | 2 |
|   number_of_directory | 6 |
|   for(i=0; i<N ; i++) | |
|   { | |
|     reserved | 2 |
|     directory_id | 6 |
|     directory name length | 8 |
|     directory_name | 8*k |
|     number_of_components | 8 |
|     for(i=0 ; j<number_of_components ; j++) | |
|     { | |
|       object id | 10 |
|       directory_id | 6 |
|     } | |
|   } | |
| } | |

FIG. 45

| Syntax | # of bits |
|---|---|
| time_table( ) { | |
|     years | 8 |
|     months | 4 |
|     reserved | 3 |
|     days | 5 |
|     reserved | 1 |
|     hours | 5 |
|     minutes | 6 |
| } | |

FIG. 46

| Syntax | # of bits |
|---|---|
| content_name_descriptor () { | |
|     content_name_length | 8 |
|     content_name | 8*N |
| } | |

FIG. 47

| Syntax | # of bits |
|---|---|
| mime_type_descriptor() { | |
|     mime_type_length | 8 |
|     mime_type | 8*N |
| } | |

FIG. 49B

| Syntax | # of bits |
|---|---|
| ATSC_MCAST_Signaling_Encapsulation_Packet() { | |
|    first_last | 2 |
|    compression_flag | 1 |
|    signal_type | 5 |
|    sequence_number | 8 |
|    version_number | 4 |
|    packet_length | 12 |
|    for(i=0; i<N; i++){ | |
|      data_byte | 8 |
|    } } | |

FIG. 50B

| Syntax | # of bits |
|---|---|
| ATSC_MCAST_Real-Time_Encapsulation_Packet() | |
| { | |
|   first_last | 2 |
|   RT_type | 6 |
|   DCI_flag | 1 |
|   DC_version | 2 |
|   addition_flag | 1 |
|   reserved | 4 |
|   if(DCI_flag==1){ | |
|     DCI_length | 8 |
|     for(i=0; i<N; i++) | |
|       DCI_field | 8 |
|   } | |
|   packet_length | 16 |
|   if(addition_flag==1){ | |
|     PTS_flag | 1 |
|     DTS_flag | 1 |
|     padding_flag | 1 |
|     scrambling_control | 2 |
|     reserved | 2 |
|     if(PTS_flag==1) | |
|       reserved | 7 |
|       PTS_high | 1 |
|       PTS | 32 |
|     if(DTS_flag==1) | |
|       reserved | 7 |
|       DTS_high | 1 |
|       DTS | 32 |
|     if(padding_flag==1){ | |
|       padding_length | 8 |
|       for(i=0; i<N; i++) | |
|         padding_byte | 8 |
|     } | |
|   } | |
|   for(i=0; i<N; i++){ | |
|     data_byte | 8 |
|   } | |
| } | |

FIG. 51

| Syntax | No. of Bits | Format |
|---|---|---|
| real-time_encapsulation_packet(){ | | |
|     first_last | 2 | |
|     RT_type | 6 | uimsbf |
|     DCI_flag | 1 | |
|     DCI_version | 2 | |
|     addition_flag | 1 | |
|     reserved | 4 | uimsbf |
|     if(DCI_flag==1){ | | |
|         decoder_configuration_information() | N*8 | uimsbf |
|     } | | |
|     packet_length | 16 | uimsbf |
|     if(addition_flag==1){ | | |
|         PTS_flag | 1 | bslbf |
|         DTS_flag | 1 | bslbf |
|         padding_flag | 1 | bslbf |
|         scrambling_control | 2 | bslbf |
|         reserved | 3 | bslbf |
|         if(PTS_flag==1){ | | |
|             reserved | 7 | uimsbf |
|             PTS | 33 | uimsbf |
|         } | | |
|         if(DTS_flag==1){ | | |
|             reserved | 7 | uimsbf |
|             DTS | 33 | uimsbf |
|         } | | |
|         if(padding_flag==1){ | | |
|             padding_length | 8 | uimsbf |
|             for(i=0; i<N; i++) | | |
|                 padding_byte | 8 | uimsbf |
|         } | | |
|     } | | |
|     for(i=0; i<N; i++){ | | |
|         data_byte | var | uimsbf |
|     } | | |
| } | | |

FIG. 52B

| Syntax | No. of Bits | Format |
|---|---|---|
| IP_Encapsulation_Packet(){ | | |
|     first_last | 2 | bslbf |
|     if(first_last & 2){ | | |
|         addition_flag | 1 | bslbf |
|         IP_type | 5 | uimsbf |
|         reserved | 4 | uimsbf |
| | 12 | uimsbf |
| encapsulation_packet_length | | |
|     else{ | | |
|         reserved | 6 | uimsbf |
|         sequence_number | 4 | uimsbf |
| | 12 | uimsbf |
| encapsulation_packet_length | | |
|     } | | |
|     if(addition_flag==1){ | | |
|         do{ | | |
|             continuity_flag | 1 | bslbf |
|             tag | 7 | uimsbf |
|             length | 8 | uimsbf |
|             additional_data | 8*N | uimsbf |
|         }while(continuity_flag==1) | | |
|     } | | |
|     for(i=0; i<N; i++){ | | |
|         payload | 8 | uimsbf |
|     } | | |
| } | | |

FIG. 54B

| Syntax | # of bits |
|---|---|
| ATSC_MCAST_Object_Encapsulation_Packet() | |
| { | |
|    first_last | 2 |
|    addition_flag | 1 |
|    if(first_last & 10){ | |
|       reserved | 3 |
|       object_ID | 10 |
|       object_type | 8 |
|       reserved | 4 |
|       packet_length | 12 |
|    else{ | |
|       reserved | 5 |
|       sequence_number | 8 |
|       reserved | 4 |
|       packet_length | 12 |
|    } | |
|    if(addition_flag==1){ | |
|       do{ | |
|          continuity_flag | 1 |
|          tag | 7 |
|          length | 8 |
|          Additional Field Data | 8*N |
|       }while(continuity_flag==1) | |
|    } | |
|    for(i=0; i<N; i++){ | |
|       payload | 8 |
|    } | |
| } | |

FIG. 55A

| first_last (2) | object delivery mode (2) | extension_id (4) | Source Block Number (0 or 8 or 16) | reserved (1) | version (3) | fragment number (12) | reserved (4) | packet_length (12) | payload |

FIG. 55B

| Syntax | # of bits |
|---|---|
| Object_Encapsulation_Packet() | |
| { | |
|   first_last | 2 |
|   object_delivery_mode | 2 |
|   extension_id | 4 |
|   if(object_delivery_mode = 0x01) | |
|     source_block_number_8 | 8 |
|   else if(object_delivery_mode =0x02) | |
|     source_block_number_16 | 16 |
|   reserved | 1 |
|   version | 3 |
|   fragment_number | 12 |
|   reserved | 4 |
|   packet_length | 12 |
| } | |

FIG. 59A-1

| Syntax | # of bits |
|---|---|
| ATSC_MCAST_Transport_Packet() | |
| { | |
|   first_last | 2 |
|   DC_flag | 1 |
|   pointer_flag | 1 |
|   padding_flag | 1 |
|   LMT_flag | 1 |
|   LIT_flag | 1 |
|   PCR_flag | 1 |
|   if(pointer_flag==1) | |
|     pointer_field | 8 |
|   if(padding_flag==1){ | |
|     padding_length | 8 |
|     for(i=0; i<N; i++) | |
|       padding_byte | 8 |
|   } | |
|   if(LMT_flag==1){ | |
|     type_bitmap | 3 |
|     reserved | 1 |
|     version_number | 4 |
|     if(type_bitmap & 100){ | |
|       real-time_channel_number | 8 |
|       for(i=0; i<N1; i++) | |
|         real-time_channel_pointer | 8 |
|     } | |
|     if(type_bitmap & 010){ | |
|       IP_channel_number | 8 |
|       for(i=0; i<N2; i++) | |
|         IP_channel_pointer | 8 |
|     } | |
|     if(Type_bitmap & 001){ | |
|       object_channel_number | 8 |
|       for(i=0; i<N3; i++) | |

FIG. 59A-2

| | |
|---|---|
|       object_channel_pointer | 8 |
|     } | |
| } | |
| if(LIT_flag==1){ | |
|   service_number | 6 |
|   version_number | 10 |
|   for(i=0; i<N; i++){ | |
|     service_ID | 8 |
|     for(i=0; i<N1; i++){ | |
|       next_indicator | 1 |
|       LMT_index_number | 7 |
|     } | |
|   } | |
| } | |
| if(PCR_flag==1) | |
| { | |
|   Program_clock_reference_base | 33 |
|   Reserved | 6 |
|   Program_clock_reference_extension | 9 |
| } | |
| for(i=0; i<N; i++){ | |
|   data_byte | 8 |
| } | |
| } | |

FIG. 59B

| Syntax | # of bits |
|---|---|
| Transport_Packet() | |
| { | |
|    first_last | 2 |
|    DC_flag | 1 |
|    pointer_flag | 1 |
|    padding_flag | 1 |
|    LMT_flag | 1 |
|    LIT_flag | 1 |
|    PCR_flag | 1 |
|    if(PCR_flag==1) | |
|    { | |
|       program_clock_reference_base | 33 |
|       Reserved | 6 |
|       program_clock_reference_extension | 9 |
|    } | |
|    if(pointer_flag==1) | |
|       pointer_field | 8 |
|    if(padding_flag==1){ | |
|       padding_length | 8 |
|       for(i=0; i<N; i++) | |
|          padding_byte | 8 |
|    } | |
|    if(LMT_flag==1){ | |
|       LMT_information() | 8*N |
|    } | |
|    if(LIT_flag==1){ | |
|       LIT_information() | 8*N |
|    } | |
|    for(i=0; i<N; i++){ | |
|       data_byte | 8 |
|    } | |
| } | |

FIG. 59C

| Syntax | No. of Bits | Format |
|---|---|---|
| Transport_Packet() { | | |
|     first_last | 2 | bslbf |
|     reserved | 1 | bslbf |
|     Error_flag | 1 | bslbf |
|     pointer_flag | 1 | bslbf |
|     padding_flag | 1 | bslbf |
|     LMT_flag | 1 | bslbf |
|     reserved | 1 | bslbf |
|     if(pointer_flag){ | | |
|         pointer_field | 8 | uimsbf |
|     if(padding_flag){ | | |
|         padding_length | 8 | uimsbf |
|         for(i=0; i<padding_length; i++) | | |
|             padding_byte | 8 | uimsbf |
|     } | | |
|     if(LMT_flag==1) | | |
|         LMT_information() | var | bslbf |
|     for(i=0; i<N; i++) | | |
|         data_byte | 8*N | bslbf |
| } | | |

FIG. 59D

| Syntax | # of bits |
|---|---|
| Transport_Packet() | |
| { | |
|     first_last | 2 |
|     DC_flag | 1 |
|     pointer_flag | 1 |
|     padding_flag | 1 |
|     LMT_flag | 1 |
|     LIT_flag | 1 |
|     PCR_flag | 1 |
|     if(pointer_flag==1) | |
|         pointer_field | 8 |
|     if(padding_flag==1){ | |
|         padding_length | 8 |
|         for(i=0; i<N; i++) | |
|             padding_byte | 8 |
|     } | |
|     if(LMT_flag==1){ | |
|         LMT_information() | 7 |
|     } | |
|     if(LIT_flag==1){ | |
|         LIT_information() | |
|     } | |
|     if(PCR_flag==1) { | |
|         program_clock_reference_base | 33 |
|         Reserved | 6 |
|         program_clock_reference_extension | 9 |
|     } | |
|     for(i=0; i<N; i++){ | |
|         data_byte | 8 |
|     } | |
| } | |

FIG. 60B

| Syntax | # of bits |
|---|---|
| Transport_Packet() | |
| { | |
|   first_last | 2 |
|   signal_pkt_indicator | 1 |
|   error_indicator | 1 |
|   additional_flag | 1 |
|   compression_flag | 1 |
|   reserved | 1 |
|   pointer_flag | 1 |
|   if(additional_flag) | |
|   { | |
|     Continuity_flag | 1 |
|     Tag | 7 |
|     Length | 8 |
|     for(i=0; i<Length; i++){ | |
|       Additional_field | 8*N1 |
|     } | |
|   } | |
|   if(pointer_flag==1) | |
|     pointer_field | 8 |
|   for(i=0; i<N; i++){ | |
|     data_byte | 8 * N |
|   } | |
| } | |

FIG. 61B

| Syntax | # of bits |
|---|---|
| padding_field() | |
| { | |
|    tag | 7 |
|    length | 8 |
|    for(i=0; i<length; i++){ | |
|       padding_byte | 8 |
|    } | |
| } | |

FIG. 62

| Syntax | # of bits |
|---|---|
| LMT_field() | |
| { | |
|   tag | 7 |
|   length | 8 |
|   for(i=0; i<length; i++){ | |
|     LMT_information | 8 |
|   } | |
| } | |

FIG. 63

| Syntax | # of bits |
|---|---|
| compression_field_parameter () | |
| { | |
|   tag | 7 |
|   length | 8 |
|   compression_type | 8 |
|   compression_parameter | 8 * N |
| } | |

FIG. 64B

| Syntax | # of bits |
|---|---|
| signaling_encapsulation_packet() | |
| { | |
| signal_ type | 5 |
| version_number | 3 |
| payload_length | 16 |
| for(i=0; i<N; i++){ | |
| data_byte | 8*N |
| } | |
| } | |

** Block = 4992 byte /frame = 624 sectors/frame

** Block = 4992 byte /frame = 624 sectors/frame

METHOD AND APPARATUS FOR TRANSMITTING BROADCAST, METHOD AND APPARATUS FOR RECEIVING BROADCAST

CROSS-REFERENCE TO RELATED APPLICATIONS

This application claims priority from U.S. Provisional Patent Application Nos. 60/917,776 filed on May 14, 2007, 60/938,477 filed on May 17, 2007, 60/944,619 filed on Jun. 18, 2007, 60/974,321 filed on Sep. 21, 2007, 60/978,488 filed on Oct. 9, 2007, 61/047,556 filed on Apr. 24, 2008, 61/071,364 filed on Apr. 24, 2008, 61/071,369 filed on Apr. 24, 2008, and 61/071,393 filed on Apr. 25, 2008, in the U.S. Patent and Trademark Office, and International Application No. PCT/KR2008/002699 filed on May 14, 2008 in the Korean Intellectual Property Office (KIPO) receiving office (published as International Publication No. WO 2008/140263), the disclosures of which are incorporated herein in their entireties by reference.

BACKGROUND OF THE INVENTION

1. Field of the Invention

Apparatuses and methods consistent with the present invention relate to transmitting a broadcast and receiving a broadcast, and more particularly, to broadcast transmitting methods and apparatuses for providing a mobile broadcast service.

2. Description of the Related Art

The Advanced Television System Committee (ATSC) is a group that defines the standards for digital television (DTV) transmission in the United States of America from among standards for terrestrial DTV broadcast transmission. A main point of the standards defined by the ATSC relates to audio/video (A/V) compression and transmission. That is, a video signal is compressed according to the Moving Picture Experts Group-2 (MPEG2) standard, sound and speech signals are compressed according to the audio codec-3 (AC-3) standard, and theses signals are transmitted using the vestigial side band (VSB) technique. The VSB which is terrestrial DTV reception standards is advantageous in that it increases utilization of frequency bands thus maximizing the range of DTV watching but is disadvantageous in that it is difficult to be applied to mobile TV since a radio signal is difficult to be received during movement.

Meanwhile, as a need for broadcast services, such as terrestrial digital multimedia broadcasting (DMB) broadcast services and satellite DMB broadcast services, which use a mobile communication device, has increased and requirements for broadcast services have been increased and diversified, various broadcasting techniques for satisfying such user's demands have been introduced.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a broadcast service transporting method and apparatus capable of rapidly and efficiently providing a high-quality standard broadcast service in a mobile communication system, and broadcast service receiving methods and apparatuses.

According to an aspect of the present invention, there is provided a method of transporting a broadcast service for mobile communications, the method comprising generating an encapsulation packet including configuration information adaptive to application data that is to be transmitted and the application data; generating transport packets having data regarding the encapsulation packet by dividing the encapsulation packet into predetermined-sized packets, where the transport packets include information regarding the structures of the transport packets; and generating service configuration information including information set about a channel having the transport packets, and including the service configuration information in a service information channel at a predetermined location from among at least one transport channel on a transport stream.

According to exemplary embodiments of the present invention, since service configuration information is present in a predetermined region of a transport frame, a broadcast service receiving apparatus can access a transport channel by using the service configuration information without processing signaling information channel. Thus, it is possible to reduce a waiting time of a broadcast service receiving apparatus in order to receive a broadcast service, which is incurred until each of broadcast services is accessed after detecting signaling information channel in the transport frame and interpreting the signaling information channel. Also, according to exemplary embodiments of the present invention, the structures of an encapsulation packet and a transport packet are determined adaptively to the type of application data provided, thereby efficiently using a data region and increasing the speed of data transmission.

Also, according to exemplary embodiments of the present invention, decoder configuration information is transported together with a broadcast service that provides real-time media data, and thus, a receiving side can update the specifications of a decoder suitable for the format of the provided media data beforehand by using the decoder configuration information.

According to another aspect of the present invention, there is provided an apparatus for transporting a broadcast service for mobile communications, the apparatus including an encapsulation packet generation unit generating an encapsulation packet including configuration information adaptive to application data that is to be transmitted and the application data; a transport packet generation unit generating transport packets having data regarding the encapsulation packet by dividing the encapsulation packet into predetermined-sized packets, where the transport packets comprise information regarding the structures of the transport packets; and a service configuration information generation unit generating service configuration information including information about a channel having the transport packets, and including the service configuration information in a service information channel at a predetermined location from among at least one transport channel on a transport stream.

According to another aspect of the present invention, there is provided a method of receiving a broadcast service for mobile communications, the method including determining a predetermined transport channel by using service configuration information extracted from a service information channel; extracting a transport packet from the determined transport channel; extracting information regarding the transport packet from the extracted transport packet; obtaining a combination of encapsulation packets each having at least one transport packet by extracting the information regarding the transport packet; and obtaining a combination of application data having at least one encapsulation packet by using information regarding the encapsulation packets, which is extracted from the combination of the encapsulation packets.

According to another aspect of the present invention, there is provided an apparatus for receiving a broadcast service for mobile communications, the apparatus including a transport channel determination unit determining a predetermined transport channel by using service configuration information extracted from a service information channel; a transport packet extraction unit extracting a transport packet from the determined transport channel; a transport packet information extraction unit extracting information regarding the transport packet from the extracted transport packet; an encapsulation packet combination unit obtaining a combination of encapsulation packets each having at least one transport packet by using the information regarding the transport packet; and an application data combination unit obtaining a combination of application data having at least one encapsulation packet by using information regarding the encapsulation packets, which is extracted from the combination of the encapsulation packets.

According to another aspect of the present invention, there is provided a method of transporting a stream, the method including inserting a second transport stream, which is needed for a mobile terminal to receive broadcast data, into a first transport stream; and transporting the first transport stream into which the second transport stream is inserted.

The second transport stream may be inserted into a predetermined location on the first transport stream.

The method may further include generating signaling information including at least one of information regarding the location of the second transport stream and information needed to process the second transport stream, wherein during the transporting of the first transport stream, the signaling information is further transported.

According to another aspect of the present invention, there is provided a method of receiving a stream, the method including obtaining a second transport stream by receiving a first transport stream into which the second transport stream is inserted; and processing the second transport stream. The second transport stream may be inserted into a predetermined location on the first transport stream.

During the obtaining of the second transport stream, signaling information including at least one of information regarding the location of the second transport stream and information needed to process the second transport stream may be further obtained, and the processing of the second transport stream may include processing the second transport stream based on the signaling information.

For convenience of explanation, abbreviations and terms used in the present specification are defined as follows:

application layer: audio/video (A/V) streaming, and Internet protocol (IP) and non-real-time (NRT) services;

ATSC-M/H terminal: a terminal device accessing an ATSC-M/H service;

ATSC-M/H service: an ATSC broadcast service targeted to mobile and handheld terminals;

ATSC-M/H system: a combination of a service system and head-end equipment that makes an ATSC-M/H service available over broadcast and optionally over an interaction channel;

cluster: a group of any number of sectors where a Turbo fragment is placed;

primary service: a first priority service that a user watches when powered on (this is an optional service of broadcaster);

link layer: FEC encoding, partitioning and mapping between a Turbo stream and clusters;

linkage information table (LIT): a linkage information table between service components which is placed in everywhere in a mobile broadcasting (MCAST) parcel;

location map table (LMT):—a location information table which is placed in everywhere in an MCAST parcel;

MCAST packet: a transport packet defined in an MCAST packet;

MCAST parcel: a group of MCAST packets decoded after Turbo packets are extracted from a parcel;

MCAST stream: a sequence of MCAST packets;

MCAST transport layer: a transport layer defined in ATSC-MCAST;

MPEG data: a sync byte-absent TS;

MPEG data packet: a sync byte-absent TS packet;

parcel: a group of 624 TS of MPEG data packets;

sector: an 8-byte space reserved in AF of a TS or an MPEG data packet;

SIC: a type of a turbo stream, which is a signaling information channel containing information for processing all turbo streams;

sub channel: a physical space for A/V streaming, Internet protocol (IP) and NRT data;

sub data channel: a physical space for sub channel components;

transport layer: a transport layer defined in ATSC-MCAST;

turbo channel: a physical space storing transport streams (the protection levels of turbo channels may be different from one another);

turbo stream: turbo-coded TS;

VSB frame: 626 segments consisting of two data field sync segments and 624 (data+FEC) segments;

A-VSB: an advanced VSB System;
AF: adaptation field in an A/53 defined TS packet;
ATSC: Advanced Television Systems Committee;
BD: broadcast descriptor;
BCAST: OMA mobile broadcast service enabler;
IRD: integrated receiver and decoder;
DC: decoder configuration;
DCI: decoder configuration information;
DFS: data field sync;
DVB: digital video broadcasting;
ES: elementary stream;
EC channel: elementary component channel;
FEC: forward error correction. F/L: first/last;
IMT: IP mapping table;
IPEP: IP encapsulation packet;
LMT: location map table;
LIT: linkage information table;
MAC: medium access layer;
MCAST: mobile broadcasting;
OEP: object encapsulation packet;
OMA: open mobile alliance;
PCR: program clock reference;
PSI: program specific information;
PSIP: program specification information protocol;
REP: real-time encapsulation packet;
SD-VFG: service division in variable frame group;
SEP: signaling encapsulation packet;
SG: service guide;
SIC: signaling information channel;
SRC: supplementary reference sequence; and
TS: transport stream.

BRIEF DESCRIPTION OF THE DRAWINGS

The above and/or other aspects of the invention will become apparent and more readily appreciated from the following description of exemplary embodiments, taken in conjunction with the accompanying drawings of which:

FIGS. 10A through 10C illustrate service configuration information according to an exemplary embodiment of the present invention, FIG. 11 illustrates the structure of a version_indicator_information( ) field illustrated in FIG. 10A according to an exemplary embodiment of the present invention.

FIG. 12 illustrates the structure of a frame_group_information( ) field according to an exemplary embodiment of the present invention.

FIG. 13 illustrates the structure of a turbo_channel_information( ) field illustrated in FIG. 10A according to an exemplary embodiment of the present invention.

FIG. 14 illustrates the structure of an additional_service_information( ) field illustrated in FIG. 10A according to an exemplary embodiment of the present invention.

FIG. 15 illustrates the structure of a Turbo_channel_information_description( ) field according to an exemplary embodiment of the present invention.

FIG. 16A illustrates the structure of a turbo_channel_configuration( ) field illustrated in FIG. 10B according to an exemplary embodiment of the present invention.

FIG. 16B illustrates the structure of a turbo_channel_configuration( ) field according to another exemplary embodiment of the present invention.

FIG. 17 illustrates the structure of a descriptor_loop( ) field illustrated in FIG. 16A according to an exemplary embodiment of the present invention.

FIG. 18 illustrates the structure of a 'frame_group_update' field when the value of a 'tag' field illustrated in FIG. 17 is set to be '0' according to an exemplary embodiment of the present invention.

FIG. 19A illustrates the structure of a Frame_Slicing_Duration_Update( ) field when the value of the 'tag' field illustrated in FIG. 17 is set to be '1', according to an exemplary embodiment of the present invention.

FIG. 19B illustrates the structure of a Frame_Slicing_Duration_Update( ) field when the value of the 'tag' field illustrated in FIG. 17 is set to be '1', according to another exemplary embodiment of the present invention.

FIG. 20A illustrates the structure of an SRS_position_update( ) field when the value of the 'tag' field illustrated in FIG. 17 is set to be '2', according to an exemplary embodiment of the present invention.

FIG. 20B illustrates the structure of the SRS_position_update( ) field when the value of the 'tag' field illustrated in FIG. 17 is set to be '2', according to another exemplary embodiment of the present invention.

FIG. 21A illustrates the structure of a turbo_channel_update( ) field when the value of the 'tag' field illustrated in FIG. 17 is set to be '3', according to an exemplary embodiment of the present invention.

FIG. 21B illustrates the structure of the turbo_channel_update( ) field when the value of the 'tag' field illustrated in FIG. 17 is set to be '3', according to another exemplary embodiment of the present invention.

FIG. 22A illustrates the structure of a BD_Packet( ) field according to an exemplary embodiment of the present invention.

FIG. 22B illustrates the structure of a BD_Packet( ) field according to another exemplary embodiment of the present invention.

FIG. 23 illustrates the structure of a broadcast descriptor (BD) (Broadcast_Descriptor( ) field) according to an exemplary embodiment of the present invention.

FIG. 24A illustrates the structure of a Channel_info_update( ) field when the value of a 'tag' field illustrated in FIG. 23 is '1', according to an exemplary embodiment of the present invention.

FIG. 24B illustrates the structure of a Channel_info_update( ) field according to an exemplary embodiment of the present invention.

FIG. 24C illustrates the structure of a Channel_info_update( ) field according to another exemplary embodiment of the present invention.

FIG. 25A illustrates an Internet protocol (IP) mapping descriptor (IP_mapping_table( ) field) when the value of the 'tag' field illustrated in FIG. 23 is '1', according to an exemplary embodiment of the present invention.

FIG. 25B illustrates the IP mapping descriptor (IP_mapping_table( ) field) according to another exemplary embodiment of the present invention.

FIG. 26 illustrates the structure of an IP_channel_description( ) field illustrated in FIG. 25A according to an exemplary embodiment of the present invention.

FIG. 27A illustrates the structure of an IP_address_table( ) field when the value of a 'tag' field illustrated in FIG. 26 is '1' according to an exemplary embodiment of the present invention.

FIG. 27B illustrates the structure of the IP_address_table( ) field when the value of the 'tag' field illustrated in FIG. 26 is '1' according to another exemplary embodiment of the present invention.

FIG. 28 illustrates the structure of a MAC_address_table( ) field when the value of the 'tag' field illustrated in FIG. 26 is '2' according to an exemplary embodiment of the present invention.

FIG. 29 illustrates the structure of a Text_description_table( ) field when the value of the 'tag' field illustrated in FIG. 26 is '3' according to an exemplary embodiment of the present invention.

FIGS. 35A and 35B illustrate structures of the LMT according to exemplary embodiments of the present invention.

FIG. 36 illustrates the structure of an LMT_information( ) field illustrated in FIG. 35 according to an exemplary embodiment of the present invention.

FIGS. 37A and 37B illustrate the structures of the LMT and the LMT_information( ) field according to another exemplary embodiment of the present invention.

FIG. 38 illustrates the structure of the LMT according to another exemplary embodiment of the present invention.

FIGS. 41A and 41B illustrate the structure of an LIT according to another exemplary embodiment of the present invention.

FIG. 43 illustrates the structure of object transmission information according to an exemplary embodiment of the present invention.

FIG. 44 illustrates the structure of a directory_information( ) field illustrated in FIG. 43 according to an exemplary embodiment of the present invention.

FIG. 45 illustrates the structure of a time_table( ) field illustrated in FIG. 43 according to an exemplary embodiment of the present invention.

FIG. 46 illustrates the structure of a content_name_descriptor( ) field when the value of a 'tag' field illustrated in FIG. 43 is '1' according to an exemplary embodiment of the present invention.

FIG. 47 illustrates the structure of a mime_type_description( ) field when the value of a 'tag' field illustrated in FIG. 43 is '2' according to an exemplary embodiment of the present invention.

FIGS. 49A and 49B illustrate the structure of an encapsulation packet for signaling according to an exemplary embodiment of the present invention.

FIGS. 50A and 50B illustrate the structure of an encapsulation packet for real-time data according to an exemplary embodiment of the present invention.

FIG. 51 illustrates the syntax of an encapsulation packet for real-time data according to an exemplary embodiment of the present invention.

FIGS. 52A and 52B illustrate the syntax of an encapsulation packet for IP data according to an exemplary embodiment of the present invention.

FIGS. 54A and 54B illustrate the structure of a packet for object data according to an exemplary embodiment of the present invention.

FIGS. 55A and 55B illustrate the structure of a packet for object data according to another exemplary embodiment of the present invention.

FIGS. 59A-1, 59A-2, 59B, 59C and 59D illustrate the syntax of a transport packet according to exemplary embodiments of the present invention.

FIGS. 60A and 60B illustrate the structures of a transport packet, a base header, and an additional field according to another exemplary embodiment of the present invention.

FIGS. 61A and 61B illustrate the structure of a padding_field( ) field when the value of a 'tag' field illustrated in FIG. 60 is '0', according to an exemplary embodiment of the present invention.

FIG. 62 illustrates the structure of an LMT_field( ) field when the value of the 'tag' field illustrated in FIG. 60 is '1' according to an exemplary embodiment of the present invention.

FIG. 63 illustrates the structure of a compression_field_parameter( ) field when the value of the 'tag' field illustrated in FIG. 60 is '2', according to an exemplary embodiment of the present invention.

FIGS. 64A and 64B illustrate the structure of a signaling packet according to an exemplary embodiment of the present invention.

DETAILED DESCRIPTION OF EXEMPLARY EMBODIMENTS OF THE INVENTION

Hereinafter, exemplary embodiments of the present invention will be described in greater detail with reference to the accompanying drawings.

An MCAST transmission system according to an exemplary embodiment of the present invention is capable of providing various types of services together or providing only a specific type of service, such as an Internet protocol (IP) service. FIG. 1 illustrates a case where various types of services are provided together. FIG. 2 illustrates a case where only a particular type of service is provided.

Figure 1A:
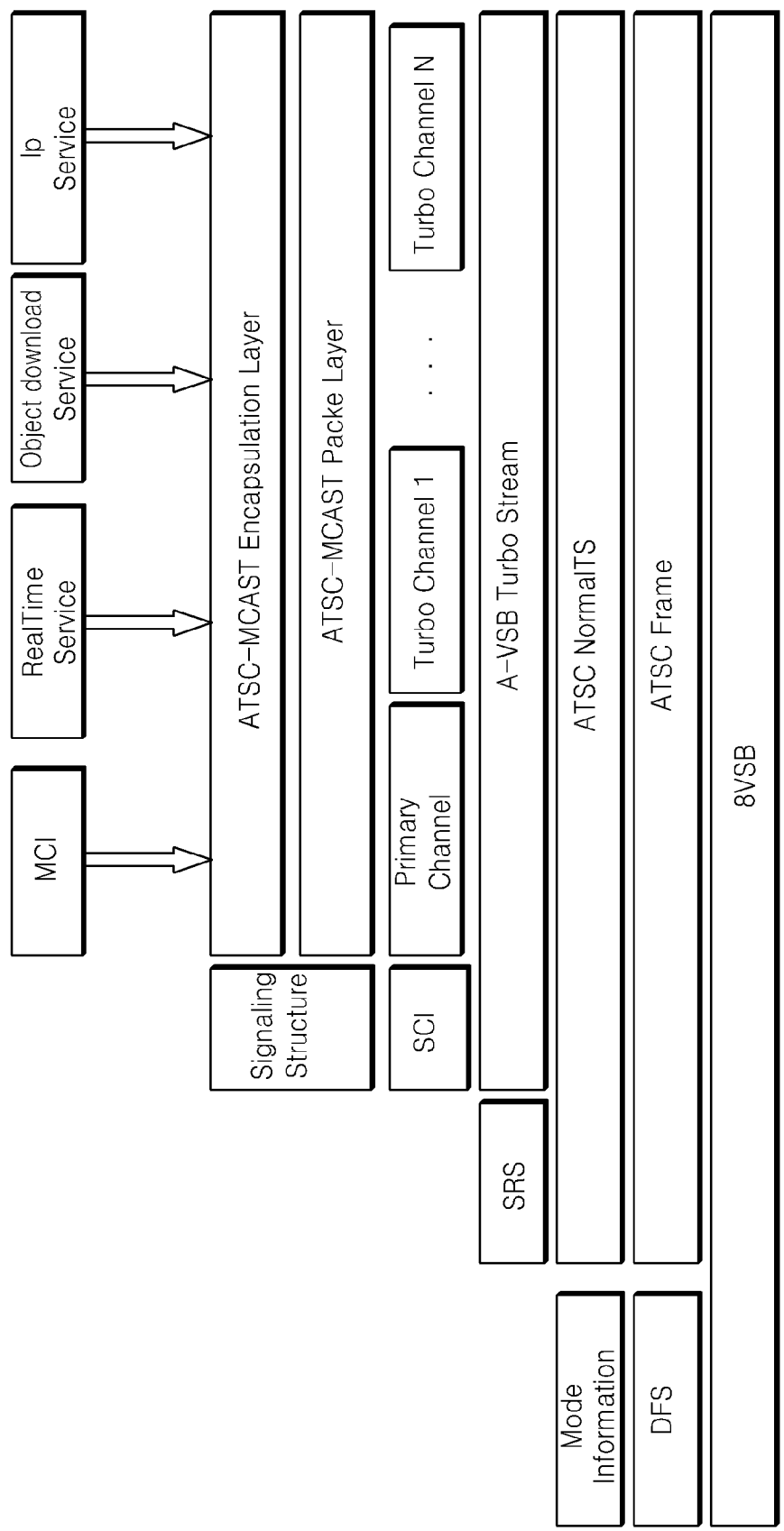
FIGS. 1A and 1B illustrate an MCAST data protocol stack according to an exemplary embodiment of the present invention.
Figure 1B:
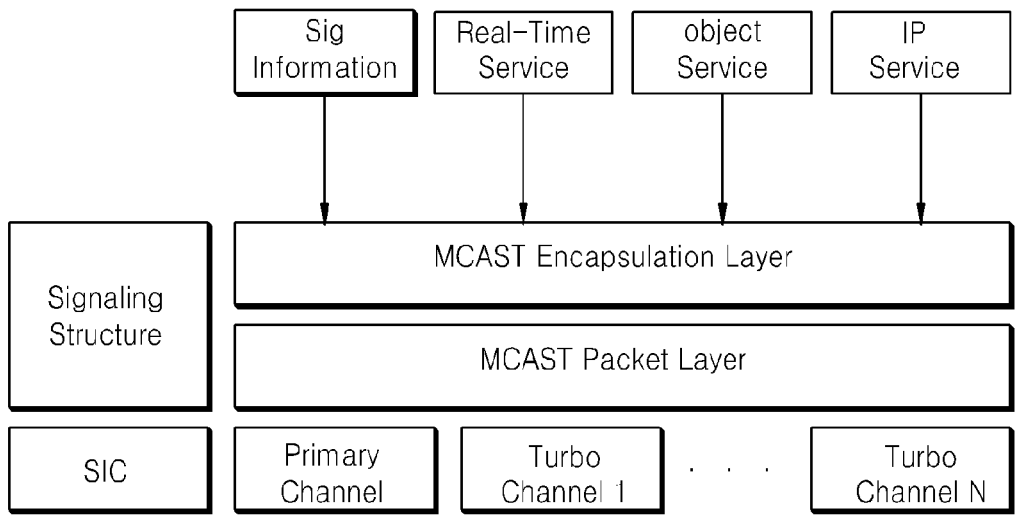
Figure 2:
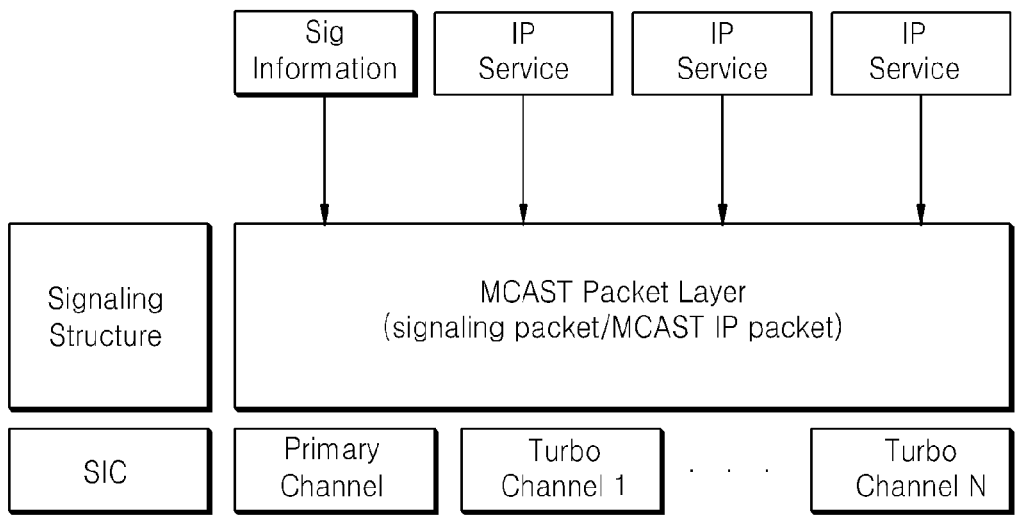
FIG. 2 illustrates an MCAST data protocol stack according to another exemplary embodiment of the present invention.

FIGS. 1A and 1B illustrate an MCAST data protocol stack according to an exemplary embodiment of the present invention. Referring to FIGS. 1A and 1B, various types of content are transmitted so that various types of services are provided through an MCAST transmission system. Examples of services supported by the MCAST transmission system, e.g., a real-time service, an IP service and an object download service, will now be described. However, the types of services that the MCAST transmission system can support are not limited thereto.

In a real-time service, data is received in real time, and it is intended to be consumed as soon as it is received. Types of real-time data include video, audio, and auxiliary information that is to be presented together with the audio/video (A/V).

An IP service is a broad term indicating all types of services including services using IP-based data, such as IP data casting. In an IP service, IP-based data received in real time is expected to be consumed as soon as the data is received or in the near future. Otherwise, the IP service may be extended to a service in which IP-based data is downloaded as an object and is stored in a storage device so that it can be used later.

An object download service is characterized in that multimedia data or general object data is received at any point of time, and displayed or stored in response to a control signal.

The characteristics of data supported by the MCAST system in order to provide a service will now be described.

MCAST supports H.264/AVC video encoding and decoding in an IRD. To allow full compliance to the specification and upward compatibility with future enhanced versions, the IRD may be able to skip over data structures which are currently "reserved" or which correspond to functions being not implemented by the IRD.

In relation to profile and level, MCAST supports encoding and decoding as follows:

encoding: An H.264/AVC bitstream may conform to the restrictions described in ITU-T Recommendation H.264 (H.264 recommended by the ITU-T)/ISO/IEC 14496-10 for Level 1.3 of the Baseline Profile with constraint_set1_flag being equal to '1'.

decoding: Similarly, An IRD that supports H.264/AVC may be capable of decoding and rendering pictures using level 1.3 Baseline Profile with constraint_set1_flag equal to '1'.

In the case of a sample aspect ratio, a square (1:1) sample aspect ratio may be used for encoding, and each IRD may support decoding and rendering of pictures with a square (1:1) sample aspect ratio for decoding.

In relation to random access points, it is recommended that sequence and picture parameter sets be sent together with a random access point at lease once every two seconds.

In relation to audio, ATSC-MCAST supports MPEG-4 AAC profile, MPEG-4 HE AAC profile and MPEG HE AAC v2 profile. To allow full compliance to ISO/IEC 14496-3[5] and upward compatibility with future enhanced versions, the IRD may be able to skip over data structures which are currently "reserved" or which correspond to functions being not implemented by the IRD.

In relation to an audio mode, audio may be encoded in mono, parametric stereo or 2-channel stereo according to the functionality defined in the HE AAC v2 profile level 2 or encoded in a multichannel according to the functionality defined in the HE AAC v2 profile level 4 as specified in ISO/IEC 14496-3 including amendments 1 and 2[5]. Also, the IRD may be capable of decoding mono, parametric stereo or 2 channel stereo of the functionality defined in the HE AAC v2 profile level 2 as specified in ISO/IEC 14496-3 including amendments 1 and 2[5].

In relation to bitrates, during encoding, the maximum bit rate of the audio may not exceed 192 kbit/s for a stereo pair and the maximum bit rate of encoded audio may not exceed 320 kbit/s for multi channel audio. During decoding, the IRD may support HE AAC v2 profile and a selected level subject to a maximum of 192 kbit/s for a stereo pair.

Also, in relation to matrix downmixing, the IRD may support matrix downmixing as defined in MPEG-4.

However, MCAST is not limited to the above encoding method. Streams encoded according to another encoding method, e.g., MPEG-2 Video/BSAC, can also be transmitted by directly/indirectly expressing the encoding method.

FIG. 2 illustrates an MCAST data protocol stack according to another exemplary embodiment of the present invention. In detail, FIG. 2 illustrates a case where only an IP service is provided through MCAST.

A packet layer segments the signaling information and IP datagram into MCAST packets and adds a transmission header thereto. The signaling information channel (SIC) contains signaling information regarding every turbo channel.

In mobile services, fast service acquisition is an important requirement. MCAST reduces the steps of tuning, demultiplexing and decoding the services, and thus provides the fast service acquisition.

Also, MCAST supports the concept of a primary service. The primary service is a first priority service for a user to watch in a continuous mode. In a general case of service access in a turbo stream, the SIC should be acquired and decoded first for turbo processing. The SIC contains physical decoding information and some simple description of all turbo services. In the case of the primary service, fast access is possible since access information is defined in the Data Field Sync (DFS). A fast access method will be described later with reference to FIGS. 7 through 9.

The primary service and the SIC may be in a continuous transmission mode and the SIC may exist in every frame. In the continuous transmission mode, frames are continuously transmitted. In a burst transmission mode, a plurality of frames are transmitted at one time at a particular point of time (see FIG. 68 for more details). The SIC is mandatory. However, the primary service is optional and depends on a service provider.

Figure 3:
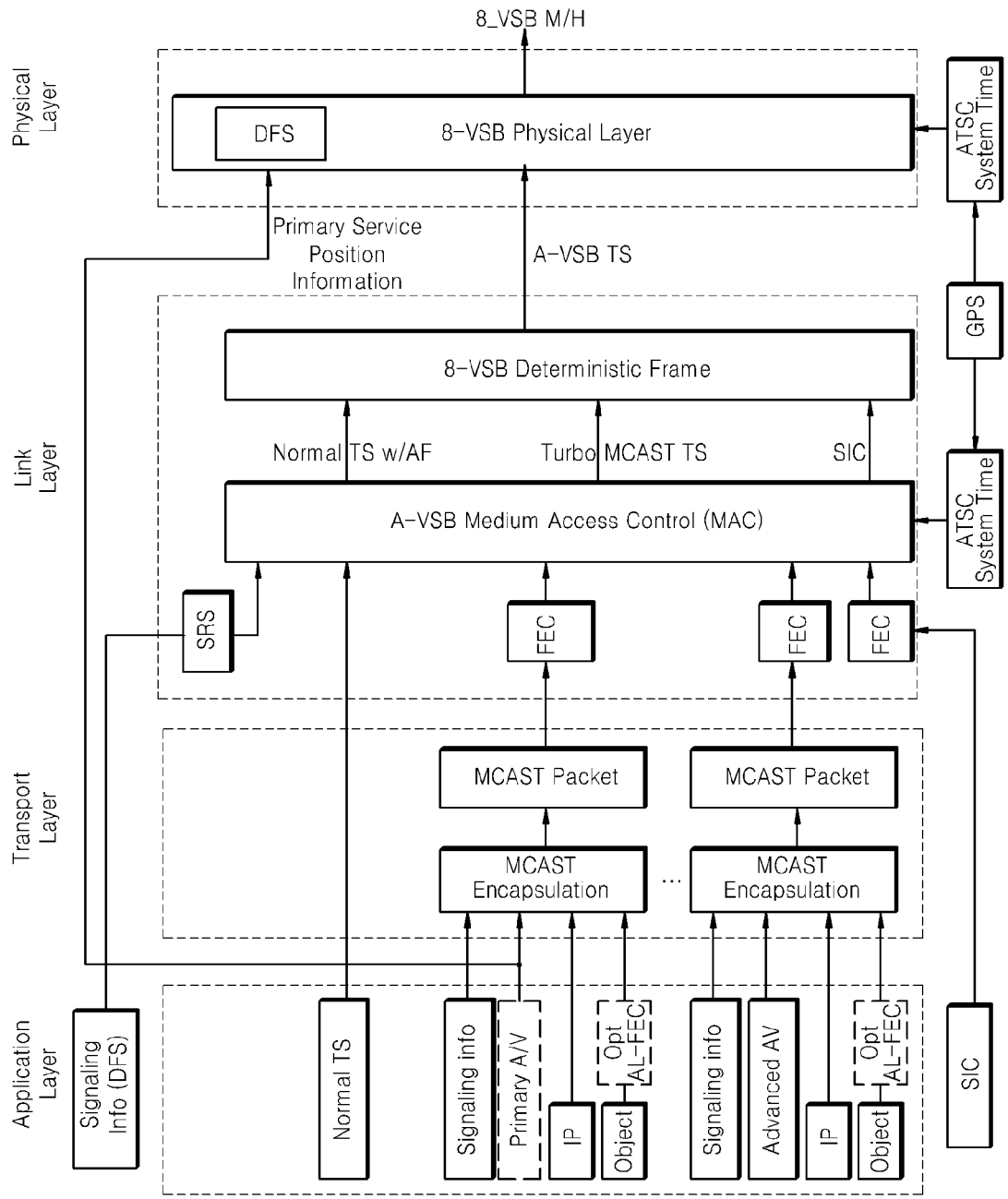
FIG. 3 schematically illustrates the structure of an A-VSB MCAST transmission system according to an exemplary embodiment of the present invention.

FIG. 3 schematically illustrates the structure of an A-VSB MCAST transmission system according to an exemplary embodiment of the present invention. Referring to FIG. 3, MCAST supports various types of services. An MCAST architecture is composed of four layers: an application layer, a transport layer, a data link layer, and a physical layer. These layers are indicated from left to right in FIG. 3.

The transport layer provides the application specific and fragmentation information of application data, and encapsulates elementary units with a predefine syntax. Application streams are encapsulated by specific type and multiplexed into fixed length packets, which are referred to as an 'MCAST turbo stream'. The packets later form turbo channels.

The link layer receives turbo channels and applies specific forward error correction (FEC), e.g., a code rate, etc., to each of the turbo channels. Signaling information present in an SIC is important, and thus, most powerful FEC is applied thereto so that an application signaled can be received even at a lower signal-to-noise ratio (SNR) level. Next, turbo channels to which FEC is applied are transmitted together with the Normal TS packets to an A-VSB MAC layer.

An A-VSB MAC layer inserts or adds a robust packet containing additional data that a mobile terminal can receive to a Normal TS. For example, a robust packet may be inserted into a null packet region of an MPEG TS or be included in a private data region of an MPEG-2 TS. The A-VSB MAC layer opens adaptation fields (AF) in Normal TS packets if necessary. In this case, the SIC transmitting signaling information for processing the robust packet is defined, and the SIC can be easily obtained since it is present at a predetermined location or by using a flag indicating the location of the SIC. As described above, the A-VSB MAC layer specifies a method of or information regarding inserting or adding the robust packet to a normal TS. In order to obtain an overall gain and an outcome (improvement) of efficiency over a system, which an 8-VSB system does not originally have, while maintaining compatibility, robust data is mapped to a deterministic frame structure, signaled and transmitted to an 8-VSB physical layer. Also, an exciter deterministically operates at the physical layer under control of the MAC layer, and inserts signaling information in DFS.

MCAST provides a real-time service, an IP service and an object service as application services. At least one of these services is multiplexed into an MCAST stream per turbo channel. In particular, MCAST is capable of providing a primary service for obtaining a high-speed initial service.

In order to provide various services, MCAST provides at least one of four types of data: real-time audio, real-time video, IP, and object signaling. For example, in order to improve service quality of applications, an application layer FEC (AL-FEC) may be applied to an object stream or an IP stream when a large amount of data is transmitted. AL-FEC will be described later with reference to FIG. 57.

Figure 4:
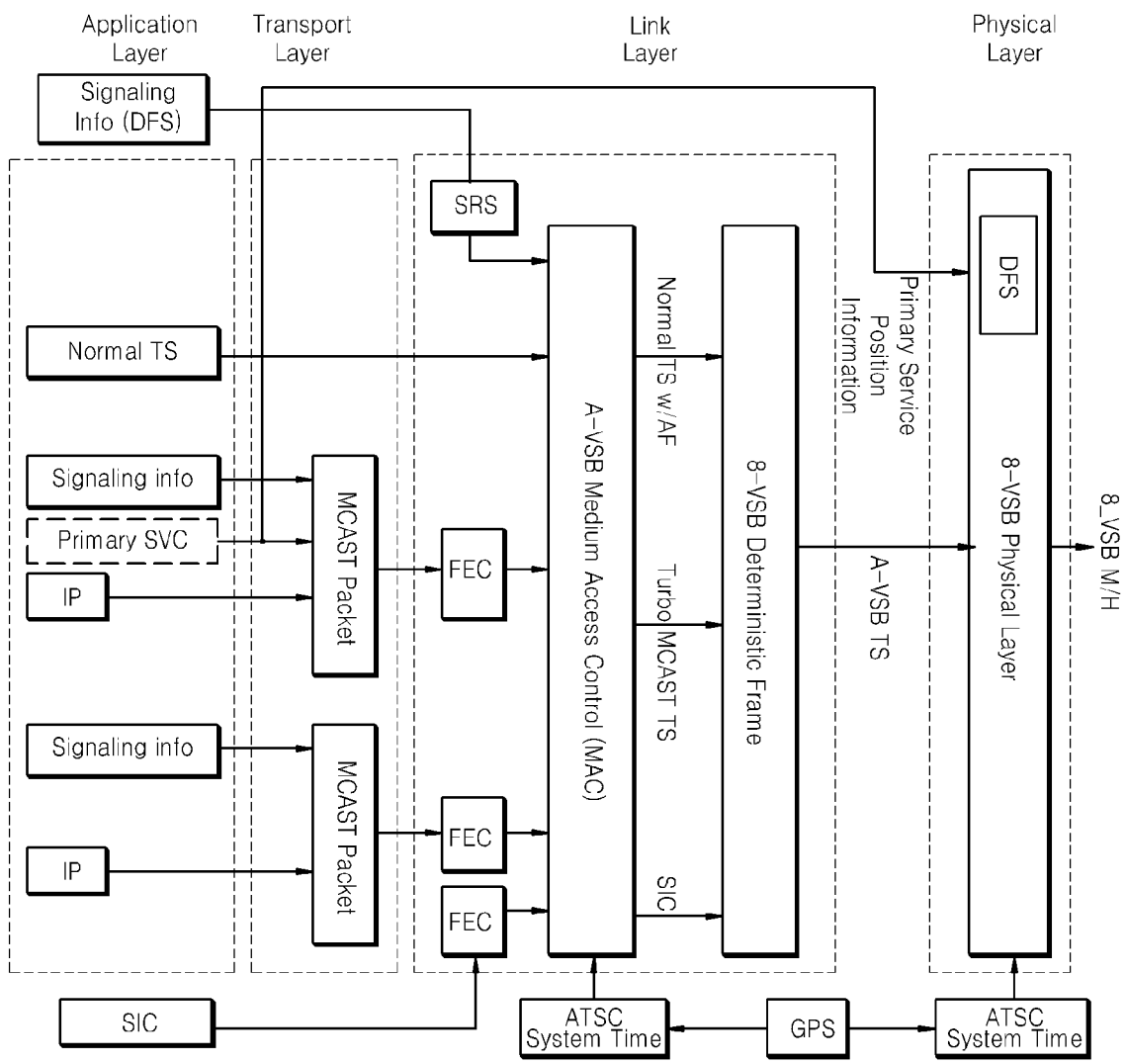
FIG. 4 schematically illustrates the structure of an A-VSB MCAST transmission system according to another exemplary embodiment of the present invention.

FIG. 4 schematically illustrates the structure of an A-VSB MCAST transmission system according to another exemplary embodiment of the present invention. Referring to FIG. 4, MCAST supports only an IP service. The A-VSB MCAST transmission system is similar to that illustrated in FIG. 3 except that only IP services are multiplexed into one MCAST stream for each turbo channel.

Figure 5:
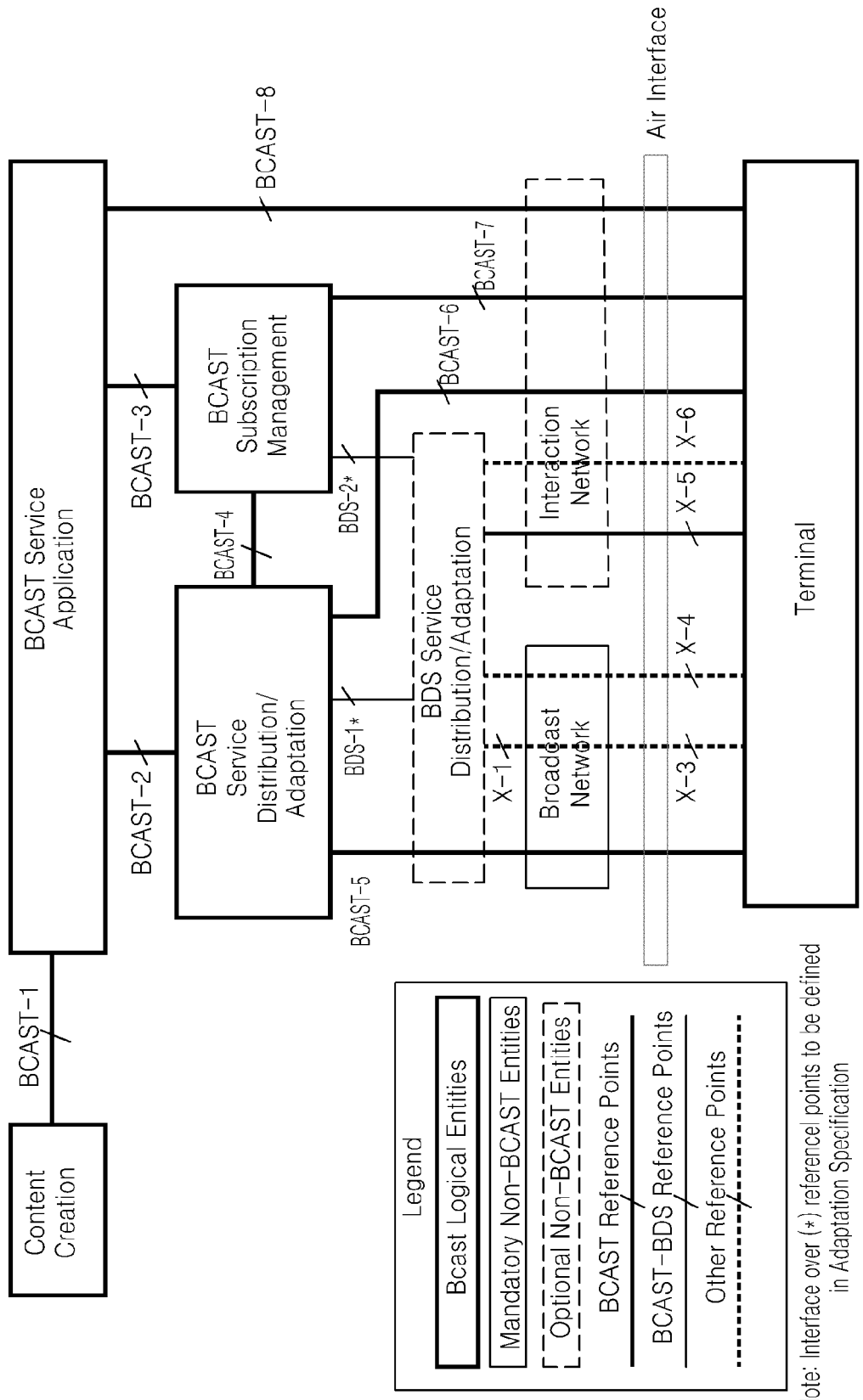
FIG. 5 schematically illustrates an OMA BCAST service layer according to an exemplary embodiment of the present invention.

FIG. 5 schematically illustrates the structure of an OMA BCAST service layer according to an exemplary embodiment of the present invention. In FIG. 5, a 'terminal' corresponds to an 'ATSC-M/H terminal' in terms of functions, and the other elements correspond to an 'ATSC-M/H system'.

BCAST-5 is a broadcast service layer interface for an upper part of a management layer. A lowest part of this interface is Internet Protocol (IP), which in turn is then interfaced with an upper part of interface X-3/X-4.

BCAST-6 is the interactive service layer interface for the upper part of the management layer.

BCAST-7 represents an interface supporting signaling for subscriber management and service/content transactions.

BCAST-8 represents service-bound interactivity.

X-3 and X-4 are considered identical in this specification. They represent a bearer layer and carry data associated with the interface BCAST-5. For a lower part this interface specifies the A-VSB bearer. For an upper part this interface specifies MCAST transport supporting delivery of BCAST-5.

X-5 and X-6 are considered identical in this specification. They represent an optional interactivity network/bearer to carry data associated with interfaces BCAST-6, BCAST-7 and BCAST-8.

Interfaces BCAST-1, BCAST-2, BCAST-3, BCAST-4, BDS-1, BDS-2, X-1 and X-2 are not relevant to this specification and will not described here.

Figure 6:
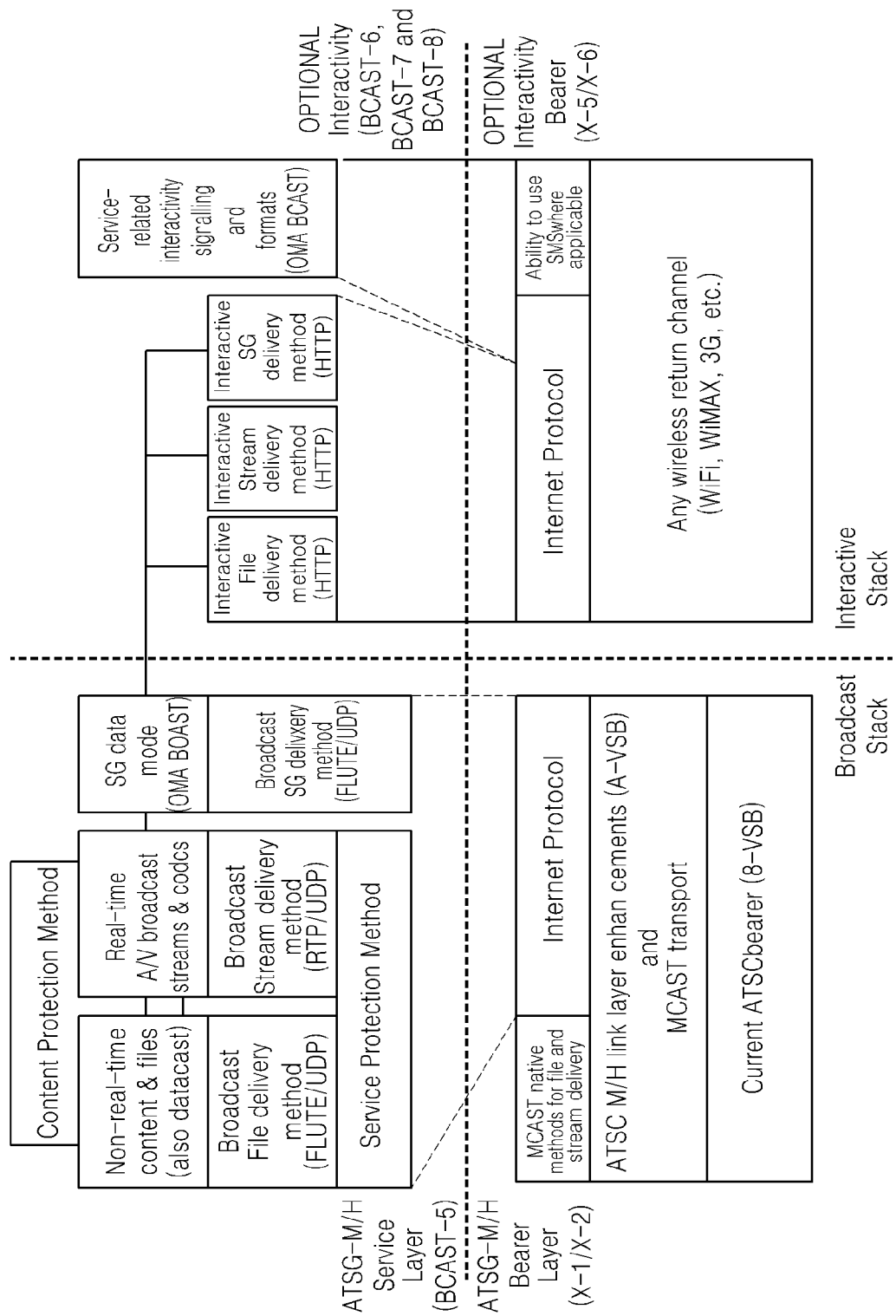
FIG. 6 schematically illustrates a terminal-network protocol interface according to an exemplary embodiment of the present invention.

FIG. 6 schematically illustrates the structure of terminal-network protocol interface according to an exemplary embodiment of the present invention. In FIG. 6, an ATSC-M/H terminal-network interface will be shown in greater detail described using the concepts of a BCAST interface and an MCAST structure. FIG. 6 illustrates a protocol stack proposed related to ATSC-M/H for not only a broadcast interactive mode but also a broadcast-only mode. The stack is divided into two major parts. One of the major parts is an ATSC-M/H service layer consisting of methods applicable to all ATSC-M/H receivers and of optional interactivity methods. Below the ATSC-M/H Service Layer there are bearer layers, one of which depicts the ATSC-M/H bearer layer and the other of which depict any optional interactive bearer.

A signaling method of the MCAST system will now be described. An important requirement of mobile broadcasting is high-speed service access. ATSC-MCAST provides two representative ways for high-speed service access: a primary service, and division of ES signaling information for a real-time media service. A high-speed service access method supported by the ATSC-MCAST system will be described later with reference to FIG. 7.

Also, the ATSC-MCAST system can provide an SIC. The SIC may contain essential information Ie for processing of a turbo channel. The SIC may contain essential information indispensable for a user to view a broadcast. For example, the SIC may contain physical decoding information or a brief description of all turbo services which are optional. The SIC must be first processed in order to process other turbo channels. The SIC will be described later with reference to FIG. 10.

A primary service and the SIC are present in a continuous transmission mode, and the SIC may be present in all frames. Although the SIC is an indispensable element, a service provider may determine whether to provide the primary service.

FIGS. 7A-7D illustrate a high-speed service access method supported by an ATSC-MCAST system according to an exemplary embodiment of the present invention. Referring to FIGS. 7A-7D, a primary service is provided according to the high-speed service access method. The primary service is of high priority for a user to receive a broadcast service.

Figure 7A:
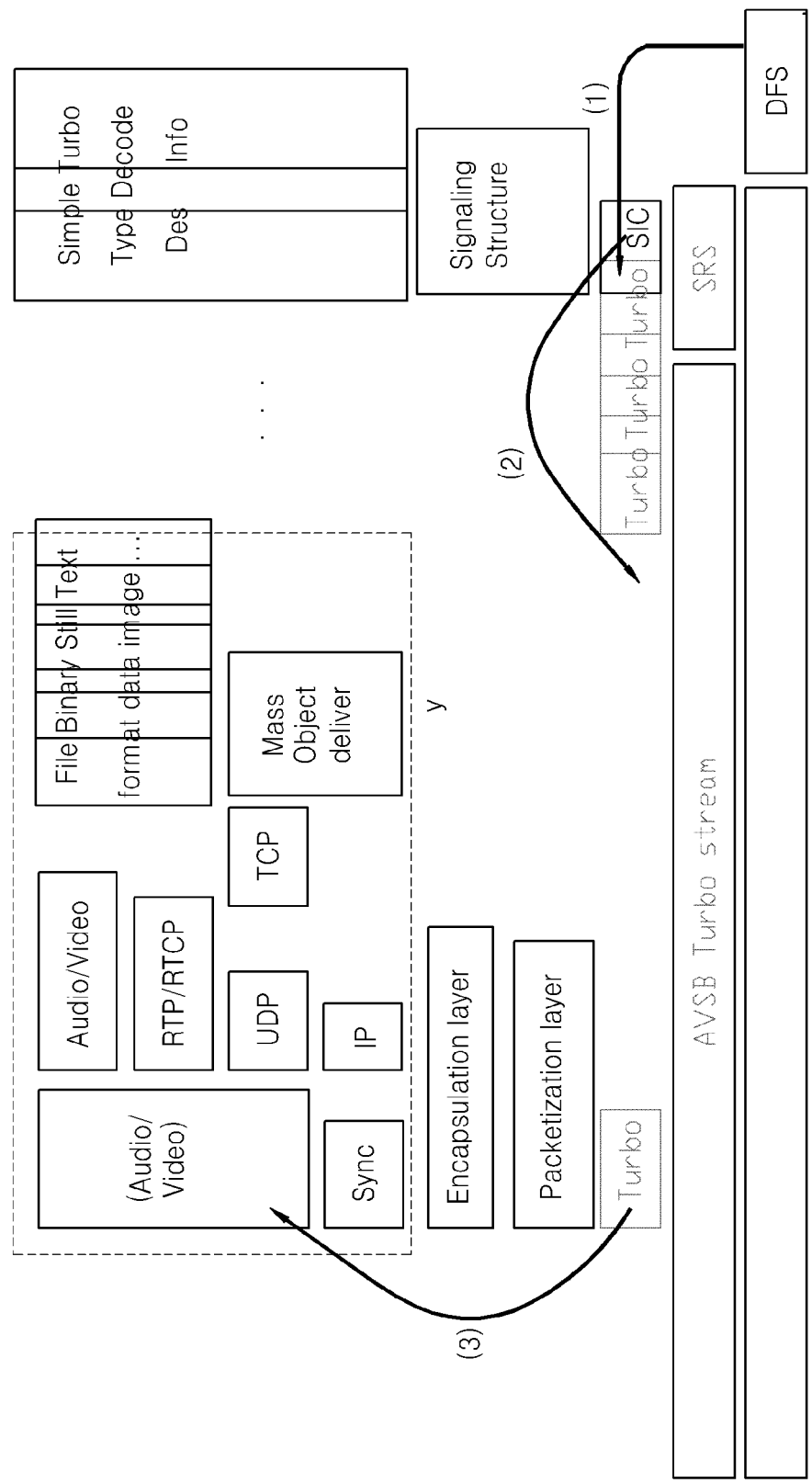
FIGS. 7A through 7D illustrate a high-speed service access method supported by an ATSC-MCAST system according to an exemplary embodiment of the present invention.

Specifically, FIG. 7A illustrates a process of receiving a service in an MCAST system according to an exemplary embodiment of the present invention.

A broadcast receiving apparatus broadcast receiving apparatus checks the location of an SIC by interpreting a DFC. Then, the broadcast receiving apparatus accesses the SIC based on the checked location of the SIC, as indicated with arrow (1). The SIC contains information regarding the number of turbo channels constituting a frame, and information regarding the structure of each of the turbo channels (turbo channel decoding information, meta information, etc.).

The broadcast receiving apparatus accesses a desired turbo channel by using the information contained in the SIC, as indicated with arrow (2), and obtains data of an application layer by processing a turbo stream received via the desired turbo channel, as indicated with arrow (3).

As described above, in order to allow a user to receive a broadcast service, a predetermined waiting time is required since the above processes must be performed after power is supplied to the broadcast receiving apparatus and a broadcast signal is received. In order to solve a problem that a broadcast service is not provided until the SIC is completely interpreted, a service is supported that can be provided as a default before the broadcast receiving apparatus operates and receives the SIC. Such a service is referred to as a primary service. The primary service is provided by a broadcast service provider intended so that a user can first view it.

Figure 7B:
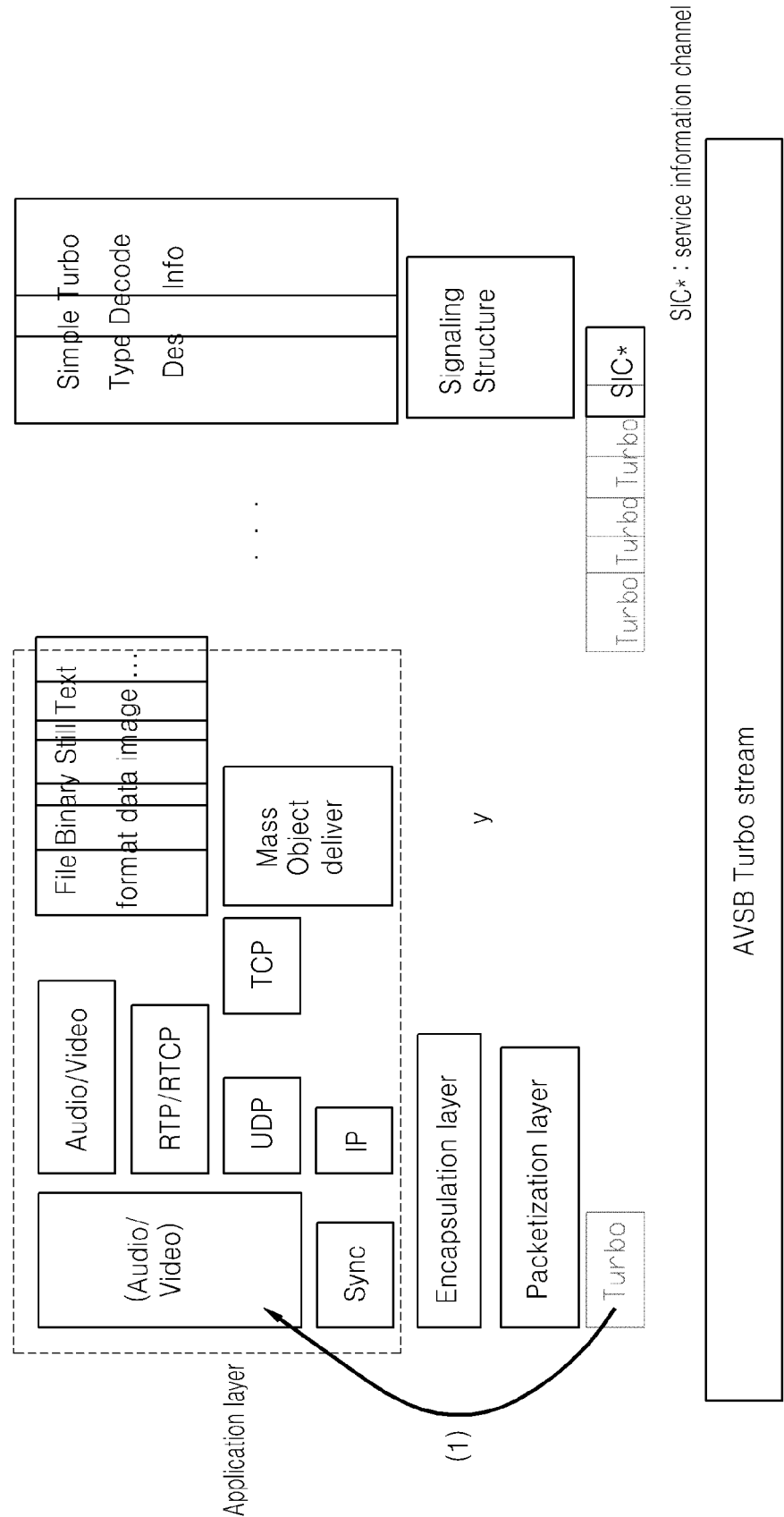

FIG. 7B illustrates a process of providing a primary service by an MCAST system according to an exemplary embodiment of the present invention. In FIG. 7B, access information for accessing a primary service is present in a predetermined location of a transport frame.

In the case of an ATSC transport frame according to the ATSC standard, access information for accessing a primary service may be defined in DFS. Thus, the broadcast receiving apparatus can directly access a turbo stream for the primary service from the DFS without searching for and processing an SIC, as indicated with arrow (1).

Figure 7C:
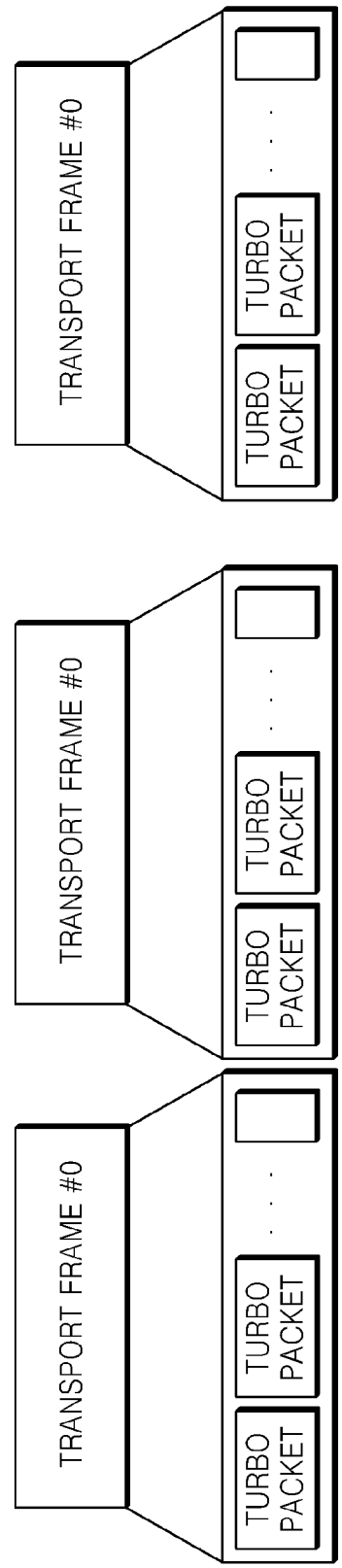

FIG. 7C illustrates a method of transmitting a turbo stream for a primary service according to an exemplary embodiment of the present invention.

A turbo stream for a primary service is formed in the same way that other turbo streams are formed, and may be transmitted while being mapped to a transport frame similar to the other turbo stream. However, a turbo stream for a primary service may be transmitted through a residual data region of a transport frame. In general, the size of a residual data region of a transport frame is smaller than that of a channel for a primary service, and thus, a turbo stream of the primary service is divided according to the size of the residual data region of the transport frame and transmitted via a plurality of transport frames.

Signaling information which will later be described may be transmitted in a similar way. That is, signaling information may be transmitted via either a separate channel, such as an SIC, or a residual data region of a transport frame. A method of allowing a user to obtain signaling information while viewing a primary service will now be described with respect to a case where signaling information is transmitted via a separate channel and a case where signaling information is transmitted via a residual data region of a transport frame.

Figure 7D:
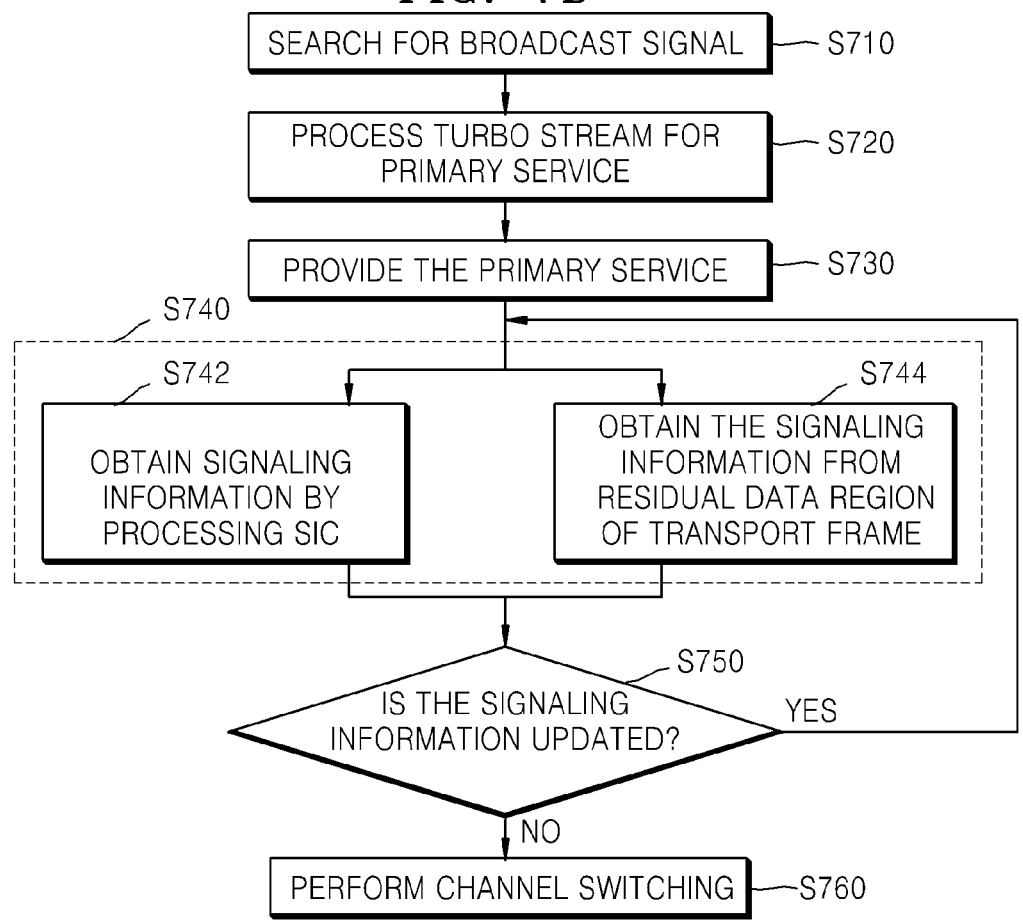

FIG. 7D is a flowchart illustrating a method of obtaining signaling information in an MCAST system according to an exemplary embodiment of the present invention.

In operation S710, a broadcast signal is searched for when power is supplied to a broadcast receiving apparatus.

In operation S720, the broadcast receiving apparatus processes a turbo stream for a primary service. The turbo stream for a primary service may be transmitted in an additional turbo channel, or may be divided into several parts and transmitted in a residual data region of a transport frame.

In operation S730, the broadcast receiving apparatus provides the primary service by using the result of processing in operation S720. Simultaneously with operation S730, operation S740 is performed to obtain signaling information. Information indicating whether the signaling information or the turbo stream for a primary service is transmitted via a separate channel or a residual data region of a transport frame may be stored in a predetermined region of a transport frame, and the signaling information and the turbo stream for a primary service are obtained using this information. In the case of an ATSC system, this information may be stored in DFS.

If the signaling information is transmitted via a separate SIC, operation S742 is performed to obtain signaling information by processing the SIC. If the signaling information is divided into several parts and transmitted via a residual data region of a transport frame, operation S744 is performed to obtain the signaling information from the residual data region of the transport frame.

In operation S750, it is determined whether the signaling information is updated. If the signaling information is updated, operation S740 is performed again to obtain the updated signaling information. If the signaling information is not updated, operation S760 is performed using the signaling information, thereby performing channel switching.

Figure 8A:
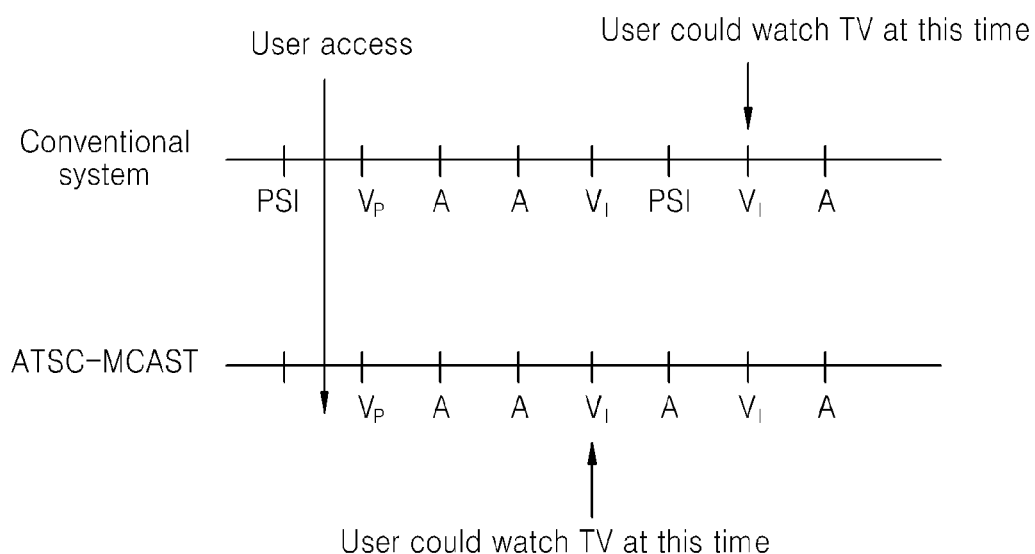
FIGS. 8A and 8B illustrate a high-speed service access method supported by the ATSC-MCAST system according to another exemplary embodiment of the present invention.
Figure 8B:
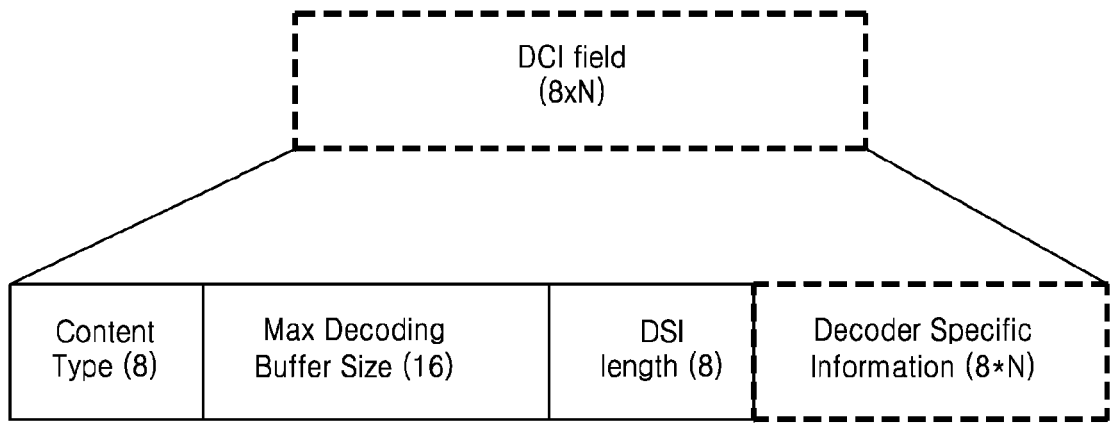

FIGS. 8A and 8B illustrate a high-speed access method supported by an ATSC-MCAST system according to another exemplary embodiment of the present invention. Referring to FIG. 8, signaling information is divided for high-speed service access.

In case of a real-time rich media service, information, such as PSI (PAT, PMT, CAT, or NIT) should be gained first in order to decode multimedia data in a broadcast receiver. A user can watch video after receiving all PSI. Although the receiver acquired a decoding frame, the user has to wait until the receiver receives decoder specific information from the PSI.

ATSC-MCAST has proposed transporting a multimedia decoder specific information descriptor to be included in each multimedia elementary stream (ES). This means that decoder configuration information and multimedia data are transported at the same time. Therefore, the receiver does not need to wait to get the PSI.

More specifically, FIG. 8A is a diagram comparing service access time in ATSC-MCAST according to an exemplary embodiment of the present invention with that in a conventional broadcasting system.

For example, it is assumed that a transmission period of PAT and PMT is 0.5 seconds and a transmission period of an I-frame is delta seconds. In a worst case, it takes 0.5+0.5+delta seconds to see first video since all the PAT, the PMT, and the I-frame must be obtained. However, ATSC-MCAST takes only delta seconds to get a first I-frame to be presented on the receiver. Accordingly, ATSC-MCAST can rapidly process the I-frame upon receiving it. Decoder specific information will be described with respect to FIG. 8B.

FIG. 8B illustrates decoder configuration information (DCI) according to an exemplary embodiment of the present invention. The DCI is included in a 'DCI_field' field.

The 'DCI_field' field illustrated in FIG. 8B is related to real time media in an MCAST encapsulation layer. In a 'decoder specific information' field included in the 'DCI_field' field contains specific information for a media decoder. The 'DCI_field' field can exist in only an encapsulation packet for real-time media.

A 'Content Type' field represents a content type in the stream. Examples of the content type defined according to the value of this field are as follows:

TABLE 1

| Value | Content Type Description |
|---|---|
| 0 | reserved |
| 1 | H.264/AVC |
| 2 | HE AAC |
| 3-255 | TBD |

A 'Max Decoding Buffer Size' field indicates the length of a decoding buffer in bytes. The definition of a buffer depends on the type of a stream.

A 'DSI length' field indicates the length of a 'decoder specific Information' field, which will be described, in bytes.

The 'Decoder Specific Information' field contains decoder specific information. The 'Decoder Specific Information' field depends on the stream type and represents the specifications of the decoder.

Figure 9A:
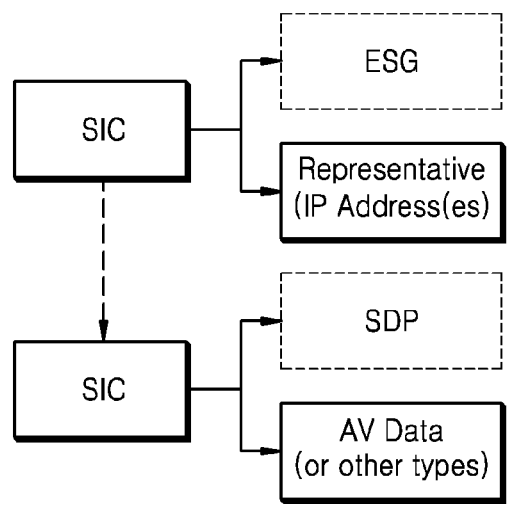
FIGS. 9A and 9B illustrate a high-speed service access method supported by the ATSC-MCAST system according to another exemplary embodiment of the present invention.
Figure 9B:
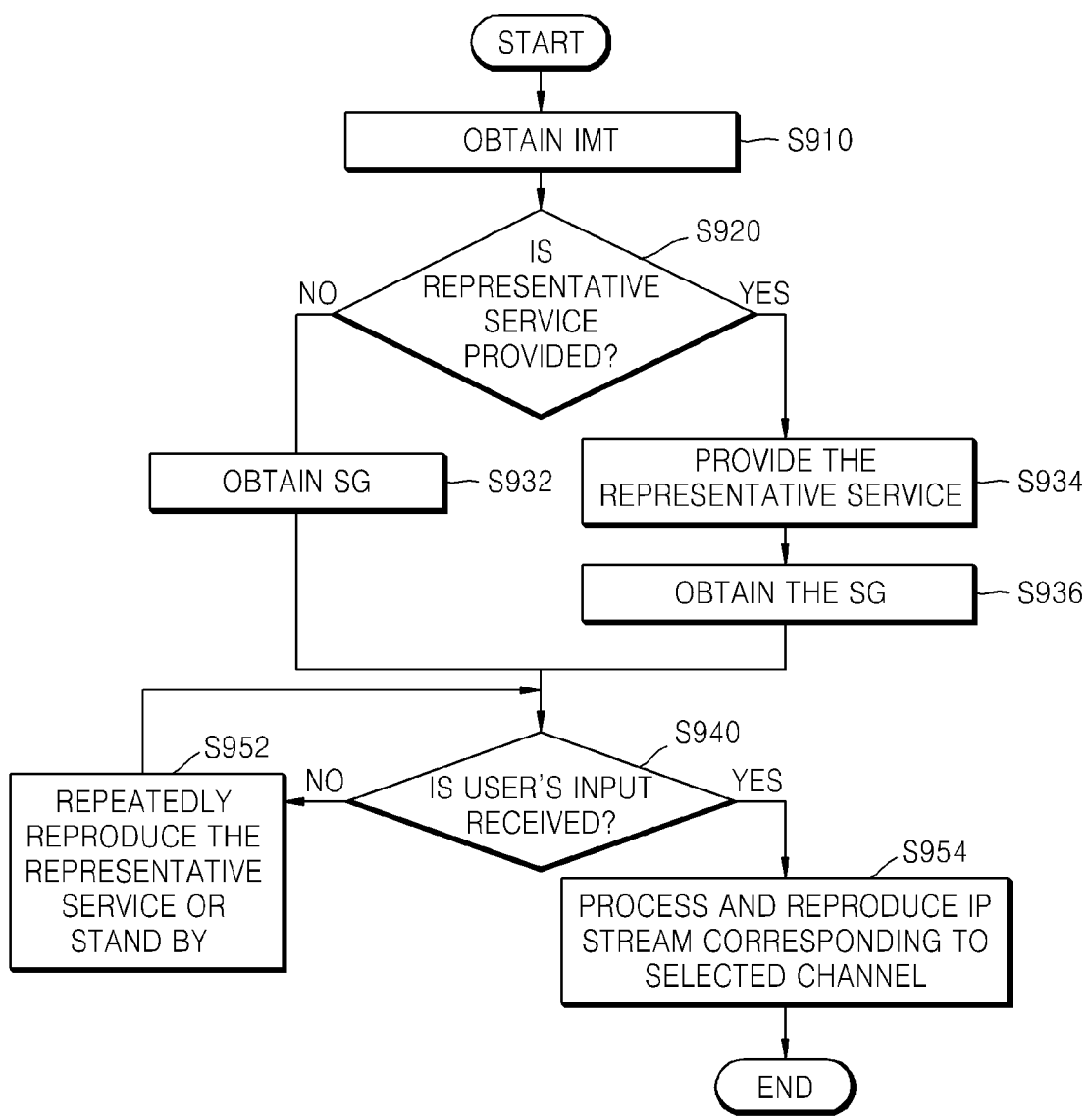

FIGS. 9A and 9B illustrate a high-speed access method supported by an ATSC-MCAST system according to another exemplary embodiment of the present invention.

In FIGS. 9A and 9B, it is assumed that IP data casting or an IP service is provided through MCAST. In general, a service guide (SG) must be provided simultaneously with IP data casting or the IP service in order to provide IP data casting or the IP service. A general broadcast receiver must first obtain the SG in order to obtain IP data casting or the IP service. Hereinafter, an SG defined in OMA-BCAST is used as an example of SG but is not limited thereto. Any type of SG that provides information regarding IP data casting or an IP service or access information for accessing IP data casting or the IP service may be used.

A user must first obtain the SG in order to receive a service through IP data casting, and thus, a broadcast receiving apparatus must stand by until the SG is received, regardless of whether the user wants the SG. To solve this problem, information needed to receive IP data casting or the IP service is transmitted so that the service can first be provided without receiving the SC. Accordingly, high-speed service access is possible in terms of IP data casting or the IP service.

More specifically, FIG. 9A illustrates the structure of transport data used for high-speed service access in IP data casting according to an exemplary embodiment of the present invention.

An SIC contains IP information for receiving an SG, such as the IP address of the SG. It is possible to use a fixed address that has already been known to a broadcast receiving apparatus as the IP address of the SG, or to indicate that the SG is included in the IP information. For example, it is possible to indirectly express transmission of the SG in IP information by using a flag which indicates IP information corresponding to the SG Also, the SIC may contain additional information for providing a user with a service before the broadcast receiving apparatus obtains a part or all of the SG. Hereinafter, for convenience of explanation, a service that can be provided to a user before an SG is partly or completely obtained will be referred to as a 'representative service'. The additional information may contain information for providing either IP data casting corresponding to the representative service or the IP service, or information indicating the location of the information. Also, the additional information may contain an IP address related to the representative service. At a location indicated by the IP address, a stream for providing the representative service or information needed to provide the representative service exists. An example of such information is flute session information, a session description protocol (SDP), or stream processing information.

In an MCAST system, there may be one or a plurality of representative services. If a plurality of representative services are provided, information regarding the representative services is supplied to the broadcast receiving apparatus so that a user can select one of the representative services. When a user selects one of a plurality of representative services, the selected representative service is provided until the broadcast receiving apparatus completely obtains the SG. After the SG is completely obtained, the user can select a desired service again based on the SG Alternatively, only one representative service may be provided, or a selected representative service may be provided without a user's selection even if a plurality of representative services are provided.

Within a turbo channel, an IP stream for providing a representative service and IP streams for providing a general broadcast service are transmitted.

FIG. 9B is a flowchart illustrating a high-speed service access method for IP data casting according to an exemplary embodiment of the present invention.

In operation S910, an IMT is obtained. The IMT represents mapping information between an IP address and a turbo channel, and may be transmitted via an SIC.

In operation S920, it is determined whether a transport system provides a representative service. If a representative service is not provided, operation S932 is performed to obtain an SG. In this case, it is impossible to provide a user with a broadcast service until a predetermined part or all of the SG is obtained. If a representative service is provided, operation S934 is performed to provide the representative service to the user. That is, the representative service is provided by parsing a stream providing it by using information regarding the representative service, which is included in the SIC (or DFS) and an IMT. At the same time, operation S936 is performed to obtain the SG at a background.

After the SG is completely obtained, operation S940 is performed to determine whether the user's input is received. If the user's input is not received, operation S952 is performed to repeatedly reproduce the representative service or stand by until the user's input is received. If the user's input is received, operation S954 is performed to process and reproduce an IP stream corresponding to a channel selected by the user.

FIG. 10A illustrates service configuration information according to an exemplary embodiment of the present invention.

SIC contains signaling information, such as information regarding turbo channel information. In particular, the SIC has service configuration information that contains turbo channel position information regarding each turbo channels in an A-VSB frame, time-slicing information, and information for processing each of the turbo channels. The SIC may be a type of turbo channel, and may be present at a predetermined location in A-VSB frame.

The structure of the service configuration information will now be described with reference to FIG. 10A.

A 'turbo_channel_information_flag' field indicates whether turbo channel information exists. In an exemplary embodiment, the 'turbo_channel_information' field contains turbo channel information which will be described later in detail with reference to FIG. 13.

An 'additional_service_information_flag' field indicates whether description information of a turbo service exists. In an exemplary embodiment, the 'additional_service_information' field contains additional description information of all turbo channels. Additional service information will be described later in detail with reference to FIG. 14.

A 'padding_flag' field indicates whether a padding area exists.

A 'version_indicator_information( )' field indicates the version of the service configuration information and when to update this information. In an exemplary embodiment, the version of 'ServiceConfigurationInformation( )' field and when to update this field are indicated. The 'version_indicator_information( )' field will be described later in detail with reference to FIG. 11.

A 'frame_group_information( )' field indicates the number of a current frame and the total number of frames within a frame group. The 'frame_group_information( )' field will be described later in detail with reference to FIG. 12.

A 'byte' field indicates padding byes and is used by an encoder. It is used to fill a non-allocated region having a value of 0xFF.

A 'CRC field contains a CRC value.

FIG. 10B illustrates service configuration information according to another exemplary embodiment of the present invention.

A 'current_frame_number' field indicates a current frame number. The frame number is incremented by 1 within a frame group.

A 'total_frame_number' field indicates the total number of frames in the frame group.

In an exemplary embodiment, the service configuration information may include information regarding TCC or a broadcast descriptor (BD) according to the current frame number. That is, if the current frame number is an even number, the information regarding the TCC is included and if the current frame number is an odd number, the information regarding the BD is included.

A 'TCC_next_update_offset' field indicates the total number of frames before the version of turbo channel configuration information is updated. In an exemplary embodiment, the 'Turbo_channel_configuration' field contains the turbo channel configuration information.

A 'TCC_version' field consists of three bits and indicates the version number of TCC fields. The version number may be incremented by 1 modulo 8 whenever one of the TCC-related fields changes. A 'number_of_turbo_channel' field indicates the total number of turbo channels carried by A-VSB. The number of scattered SRS channels is also specified in this field.

A 'turbo_channel_configuration' field includes turbo channel configuration information. The 'turbo_channel_configuration' field will be described later in greater detail with reference to FIG. 16.

A 'BD_next_update_offset' field indicates the number of frames before BD is updated.

A 'BD_packet( )' field contains a broadcast descriptor. The 'BD_packet( )' field will be described later in greater detail with reference to FIG. 22.

FIG. 10C illustrates service configuration information according to another exemplary embodiment of the present invention. The service configuration information illustrated in FIG. 10C is similar to that illustrated in FIG. 10B except for a 'wake_up_mode' field.

The 'wake_up_mode' field indicates TCC parsing mode of the following TCC at the 'TCC_next_update_offset' field. For example, if the value of this field is set to be '1', the following TCC may be parsed.

FIG. 11 illustrates the structure of the 'version_indicator_information( )' field illustrated in FIG. 10A according to an exemplary embodiment of the present invention.

In mobile broadcasting, service configuration information is very crucial. A 'version_indicator_information( )' field which will be described includes update information of the service configuration information. Thus, a 'service configuration Information( )' field indicates the exact location and version of a frame that is to be changed.

'A frame_counter' field indicates the total number of frames transmitted before the service configuration information changes. After a transport frame is received, the service configuration information will change.

A 'version' field indicates the version of the service configuration information. Whenever the service configuration information changes, the value of the version is increased by one.

FIG. 12 illustrates the structure of the 'frame_group_information( )' field illustrated in FIG. 10A according to an exemplary embodiment of the present invention.

A frame group is a group of frames created through MCAST frame slicing, and occurs periodically starting in a same frame number. In a transmission system, a technique of including transmission data regarding one service into at least one frame and transmitting the frame in a burst mode is referred to as a frame slicing technique. When using the frame slicing technique, there are frames that do not contain data regarding a target service and a terminal may enter an idle mode without receiving a signal in a section in which such a frame is transmitted, thereby saving power consumption. A burst section indicates a frame group containing data regarding the target service and may be expressed using a frame number which will later be described.

A 'current_frame_number' field indicates the number of a current frame in a frame group. Frame number may be incremented by one within a frame group.

A 'total_frame_number' field indicates the total number of frames in the frame group.

FIG. 13 illustrates the structure of the 'turbo_channel_information( )' field illustrated in FIG. 10A according to an exemplary embodiment of the present invention.

A 'turbo_channel_information( )' field indicates turbo channel information and contains information indispensable to a plurality of turbo channels. Physical decoding information, information indicating whether MCAST frame slicing exists, and the total number of turbo channels are important factors. In particular, when MCAST frame slicing is supported, the 'turbo_channel_information( )' field indicates the number of a current frame and the total number of frames blocks that are to be received for a selected turbo channel.

A 'version' field consists of three bits and indicates the version of the turbo channel information. In an exemplary embodiment, the version may increase by one whenever the 'turbo_channel_information( )' field is changed. When the version is changed, the turbo channel information may be transported in advance.

A 'Turbo_svc' field indicates the total number of turbo channels in an A-VSB system according to an exemplary embodiment of the present invention.

A 'Turbo_svc_id' field indicates the identifier of a current turbo channel.

An 'Is_Enhanced' field indicates whether data is base data or extended data. For example, when a 'scalable' video codec is used, an elementary stream and an extended stream may be contained in a separate turbo channel or sub data channel. If the elementary stream and the extended stream are contained in the separate turbo channel, it is possible to distinguish between the elementary stream and the extended stream by using the 'Is_Enhanced' field.

An 'MCAST_Frame_Slicing_flag' field specifies if a current turbo stream is transmitted in a burst mode.

An 'MCAST_AL_FEC_flag' field specifies if a current turbo stream is supporting application layer FEC (AL-FEC).

A 'turbo_start_position' field indicates a start position of a turbo channel.

A 'turbo_fragments_bits' field indicates the index of turbo channel length.

A 'turbo_arrange_index' field indicates a number. If the number is n, this means that every $n^{th}$ packet includes turbo channel fragment.

A 'coding_rates' field indicates the index of a turbo channel coding rate.

A 'start_frame_number' field indicates a starting frame number of a current turbo service when MAST frame slicing exists.

A 'frame_block_number' field specifies the total number of a current turbo channel.

FIG. 14 illustrates the structure of the 'additional_service_information( )' field illustrated in FIG. 10A according to an exemplary embodiment of the present invention.

An SIC provides a structure for carrying additional information. In an exemplary embodiment, the 'additional_service_information' field contains additional information. The 'additional_service_information' field may be delivered using a plurality of blocks and indicates the current and last indexes of segmented blocks.

A 'current_index' field indicates the index of a current index within the total number of description blocks.

A 'last_index' field indicates the index of a last block within the total number of the description blocks.

A 'length' field indicates the length of additional service information.

A 'user_data' field indicates the syntax of user private data that follows <tag><length><data>. The tag values may be defined in table 2.

TABLE 2

| Tag | Identifier |
| --- | --- |
| 0 | Reserved |
| 1 | Turbo channel information descriptor |
| 2-255 | TBD |

If the tag value is '1', the 'user_data' field contains a turbo channel information descriptor which will be described later with reference to FIG. 15.

FIG. 15 illustrates the structure of a 'Turbo_channel_information_description( )' field according to an exemplary embodiment of the present invention. The structure of the 'Turbo_channel_information_description( )' field is similar to that of the 'turbo_channel_information' field illustrated in FIG. 13.

FIG. 16A illustrates the structure of the 'turbo_channel_configuration( )' field illustrated in FIG. 10B according to an exemplary embodiment of the present invention.

A 'turbo_channel_configuration( )' field contains configuration information indispensable for turbo channels. The 'turbo_channel_configuration( )' field may contain important information, such as physical decoding information, information indicating whether frame slicing exists, and information regarding the total number of turbo channels, similar to the 'turbo_channel_information' field illustrated in FIG. 13.

A 'selector_bits' field indicates whether a frame slicing, a scattered SRS channel, a turbo channel, or a 'turbo_channel_descriptor_loop' field is present. The following Table 3 shows a definition of the 'selector_bits' field according to the value thereof. In Table 3, 'x' may be '0' or '1'.

TABLE 3

| selector_bits Value | Description |
| --- | --- |
| 0B1xx | frame slicing |
| 0Bx1x | scattered SRS channel position |
| 0Bx0x | Turbo channel position |
| 0Bxx1 | turbo_channel_descriptor_loop |

A 'turbo_channel_id' field indicates the identifier of the turbo channel. When a particular descriptor of the turbo channel is included, this field is used for identification of the turbo channel. However, if this field has a predetermined value, e.g., 0x1f, then the descriptor may be applied to all turbo channels. For example, when a field containing information regarding a frame group is updated and the value of the 'turbo_channel_id' field is 0x1f, the information regarding the frame group may be applied to a 'turbo_channel_configuration' field regarding all the channels.

A 'start_frame_number' field indicates the number of a starting frame of a service delivered in a burst mode. The starting frame is a first frame to be received in order to acquire the service.

A 'frame_count' field indicates the total number of frames to be received in order to obtain the service in the burst mode.

A 'reserved' field is a reserved field for future use. The value of the 'reserved' field is set to be '1'. In the present specification, the function of the 'reserved' field is the same and therefore will not be described hereinafter.

A 'turbo_cluster_size' field indicates cluster size of SRS streams scattered in a plurality of sectors.

An 'is_enhanced' field indicates whether a current turbo channel contains enhanced data. If the value of this field is set to be '1', it may mean that the current turbo channel contains enhanced data. In this case, base and enhanced channels should share the same turbo channel ID. A receiver may receive both two channels and provide them as one channel. For example, if 'scalable' video codec is used, the quality of video provided when both two channels are received is higher than when a single channel is received.

An 'adaptive_time_slicing_flag' field indicates whether a current turbo channel supports adaptive time slicing. If the value of this field is set to be '1', it may mean that the current turbo channel supports adaptive time slicing. A physical configuration is changed according to this field.

A 'coding_rates' field indicates the index of a turbo channel coding rate.

A 'full_packet_flag' field indicates whether a first sector of a turbo stream is transmitted via a null packet or a specified PID packet. If the value of this field is set to be '1', then the first sector is carried via a null packet or a specified PID packet without an AF header field. Similarly, if the value of this field is set to '0', the first sector is carried via the AF.

A 'turbo_start_sector' field indicates the physical start position of the turbo stream. A 'turbo_cluster_size' field indicates cluster size of the turbo stream in a plurality of sectors.

A 'turbo_channel_descriptor_loop( )' field provides additional, optional information regarding the turbo channel. This field will be described later in greater detail with reference to FIG. 17.

FIG. 16B illustrates the structure of the 'turbo_channel_configuration( )' field illustrated in FIG. 10B according to another exemplary embodiment of the present invention.

The structure of the 'turbo_channel_configuration( )' field illustrated in FIG. 16B is similar to that of the 'turbo_channel_configuration( )' field illustrated in FIG. 16A except for the 'enhanced_protection_mode' field.

An 'enhanced_protection_mode' field indicates whether to support an enhanced protection mode. There is a case where an error may be easily corrected according to the type of data transmitted or a communication environment. In this case, error correction may be easily performed by reducing the length of payload in a packet and increasing RS byte. If the value of this field is set to be '1', the payload length of a transport packet is 168 bytes long and the RS byte is 40 bytes. However, if the value of this field is set to be '0', the payload length is 188 bytes long and the RS byte is 20 bytes.

FIG. 17 illustrates the structure of the 'descriptor_loop( )' field illustrated in FIG. 16A according to an exemplary embodiment of the present invention.

A 'descriptor_loop( )' field enables signaling of additional information regarding each of turbo channels. A change in information, such as frame group numbers, a duration of time slicing regarding the turbo channels, and the locations of the turbo channels, may be signaled by the 'descriptor_loop( )' field.

A 'next_indicator' field is a 1-bit field and indicates the presence of following 'descriptor_information' field. If the value of this field is set to be $T_{(1)}$ the 'descriptor_information' field follows. If the value of this field is set to be '0', no 'descriptor_information' field is present in the 'descriptor_loop( )' field.

A 'tag' field indicates the identifier of the 'descriptor_information' field as defined in the following Table 4.

TABLE 4

| Tag | Description |
| --- | --- |
| 0 | Frame_Group_Update |
| 1 | Frame_Slicing_Duration_Update |
| 2 | SRS_position_Update |
| 3 | Turbo Channel Position Update |
| 4-127 | reserved for future use |

A 'length' field indicates the total length in bytes of the 'descriptor_information' field.

A 'descriptor_information' field may be differently defined according to the value of the 'tag' field. The 'descriptor_information' field defined in Table 4 will be described later in greater detail with reference to FIGS. 18 through 21.

FIG. 18 illustrates the structure of a 'frame_group_update' field when the value of the 'tag' field illustrated in FIG. 17 is set to be '0' according to an exemplary embodiment of the present invention.

Frame group updating may be used in changing of a period of time slicing. That is, the 'Frame_group_update' field may be used to update the total number of frame groups. The 'Frame_group_update' field may be signaled at least six seconds before updating. The information contained in this field may be applied to the configurations of all turbo channels. When this field is received, a 'selector bits' field may be set to be '0x001' indicating frame group updating and a 'turbo_channel_id' field may be to a predetermined value, e.g., '0x1f, which is determined in order to apply frame group updating to all turbo channels.

A 'next_update_offset' field indicates the total number of frames remaining before the number of new GOFs (Groups Of Frame) is applied. This field has a relative value based on the above 'TCC_next_update_offset' field. Thus, the value of this field is changed when TCC is updated. That is, the value of this field is not changed on a frame-by-frame basis but is changed whenever TCC version changes, thereby reducing a number of times that TCC is updated.

A 'new_GOF' field indicates the total number of new GOFs.

FIG. 19A illustrates the structure of a 'Frame_Slicing_Duration_Update' field when the 'tag' field is illustrated in FIG. 17 set to be '1' according to an exemplary embodiment of the present invention.

A 'Frame_Slicing_Duration_Update' field is used when the number of frames constituting frame slicing is changed in a current turbo channel. The following Equation (1) may be used to calculate a pause duration when frame slicing is applied. In this case, updating is performed in units of the number of frames constituting a frame group.

$$(TCC\_next\_update+start\_frame\_number)*48.4 \text{ ms}+\text{jitter time} \qquad (1)$$

In Equation (1), 'jitter time' means a setup time required for a physical layer and '48.4 ms' means a cycle in which a VSB frame is transmitted. However, the present invention is not limited to the VSB frame, and a period of transmission may be determined by another transport frame and another frame group.

A 'new_start_frame_number' field indicates the number of a new starting frame for frame slicing within a GOF.

A 'new_frame_count' field indicates new end frame number for frame slicing within the GOF.

FIG. 19B illustrates the structure of the 'Frame_Slicing_Duration_Update' field when the value of the 'tag' field illustrated in FIG. 17 is set to be '1' according to another exemplary embodiment of the present invention.

Equation (2) denotes a time required to acquire a first frame for frame slicing in a 'descriptor_information' field, the syntax of which is as illustrated in FIG. 19B:

$$(TCC\_next\_update\_offset + next\_update\_offset) * 48.4 \text{ ms} + \text{jitter time} \qquad (2)$$

The 'descriptor_information' fields illustrated in FIG. 19B are the same as illustrated in FIG. 19A except for a 'next_update_offset' field.

The 'next_update_offset' field indicates the location of a frame to which new frame slicing information is to be applied, based on a 'TCC_next_update_offset' field.

FIG. 20A illustrates the structure of an 'SRS_position_update' field when the value of the 'tag' field illustrated in FIG. 17 is set to be '2' according to an exemplary embodiment of the present invention.

An 'SRS_position_update' field is used when the location of a scattered SRS changes. A point of time when new location information is to be applied may be calculated to be relatively based on the start of a GOF.

A 'start_frame_offset' field indicates the number of a starting frame to which new SRS position is to be applied within a new GOF.

A 'turbo_cluster_size' field indicates the size of a new turbo cluster in a plurality of sectors.

FIG. 20B illustrates the structure of the 'SRS_position_update' field when the value of the 'tag' field illustrated in FIG. 17 is set to be '2' according to another exemplary embodiment of the present invention.

The 'SRS_position_update' field is similar to that as illustrated in FIG. 20A except for a 'next_update_offset' field.

The 'next_update_offset' field indicates a next update position at which the following values are applied.

A point of time when new location information is to be applied may be expressed by summing the values of a 'TCC_next_update_offset' field and the 'next_update_offset' field. Otherwise, the value of the 'next_update_offset' field may be used as a relative value of the value of the 'TCC_next_update_offset' field.

FIG. 21A illustrates the structure of a 'turbo_channel_update' field when the value of the 'tag' field illustrated in FIG. 17 is set to be '3' according to an exemplary embodiment of the present invention.

The 'turbo_channel_update' field is used when the location of a turbo channel is updated. This field may be applied after receiving a 'TCC_next_update_offset' indicating a new GOF is received.

A 'start_frame_offset' field indicates the number of a starting frame within a new GOF. From this frame a new 'turbo_cluster_size' field may be applied.

An 'is_enhanced' field indicates whether a current turbo channel contains enhanced data. If the value of this field is set to be '1', it may mean that the current turbo channel contains enhanced data. In this case, base and enhance channels may have the same turbo channel ID as described above.

A 'coding_rates' field indicates the index of a turbo channel coding rate.

A 'full_packet_flag' field indicates whether a first sector in a turbo stream is transmitted via a null packet or a specific PID packet without using an AF header field. If the value of this field is set to be '1' then the first sector of the turbo stream may be carried by a null packet or a specified PID packet without using the AF header field. If the value of this field is set to be '0', then the first sector may be carried by the AF header field.

A 'turbo_start_sector' field indicates a physical starting position of the turbo stream.

A 'turbo_cluster_size' field indicates the cluster size of the turbo stream in a plurality of sectors.

FIG. 21B illustrates the structure of the 'turbo_channel_update' field when the value of the 'tag' field illustrated in FIG. 17 is set to be '3' according to another exemplary embodiment of the present invention.

The 'turbo_channel_update' field illustrated in FIG. 21B is similar to that illustrated in FIG. 21A, except for a 'next_update_offset' field, an 'adaptive_time_slicing_flag' field and an 'enhanced_protection_mode' field.

The 'next_update_offset' field indicates a update position at which the following values are applied. A point of time when new position information is applied may be expressed by summing the values of a 'TCC_next_update_offset' field and a 'next_update_offset' field. Otherwise, the value of the 'next_update_offset' field may be used as a relative value of the 'TCC_next_update_offset' field.

The 'adaptive_time_slicing_flag' field indicates whether a current turbo channel supports adaptive time slicing. If the value of this field is set to be '1', it may be understood that the current turbo channel supports adaptive time slicing. The physical configuration of the 'turbo_channel_update' field is changed due to this field.

The 'enhanced_protection_mode' field indicates whether the current turbo channel supports an enhanced protection mode. If the value of this field is set to be '1', it may be understood that the current turbo channel supports the enhanced protection mode.

For example, if the value of this field is set to be '1', the length of payload in a transport packet may be 168 bytes and the length of RS byte may be 40 bytes to provide enhanced protection. However, if the value of this field is set to be '0', the length of payload may be 188 bytes and the length of RS byte may be 20 bytes.

FIG. 22A illustrates the structure of a 'BD_Packet' field according to an exemplary embodiment of the present invention.

The 'BD_Packet' field may be used to transport additional information regarding turbo streams, such as an IP mapping table and turbo channel update information. This field may be applied to all turbo channels and may be carried within several fragments.

A 'first_last' field consists of two bits and specifies if a packet is a first or last packet, as defined in Table 5.

TABLE 5

| Value | Description |
| --- | --- |
| 00 | Intermediate packet of a series |
| 01 | Last packet of a series |
| 10 | First packet of a series |
| 11 | The one and only packet |

A 'padding_flag' field indicates whether padding bytes exists.

A 'BD_version' field consists of three bits and indicates the version number of a broadcast descriptor (BD). The version number may be incremented by 1 modulo 8 whenever the BD is updated.

A 'padding_length' field specifies the number of bytes of padding in a 'BD_packet' field.

A 'padding_byte' field has one or more 8 bit values set to be '0xFF' that can be inserted by an encoder. This field is discarded by a decoder.

A 'BD_Fragment' field contains fragmented BDs. That is, a BD is divided into a plurality of fragment pieces and is delivered via the 'BD_Fragment' field. A BD will be explained later in detail with reference to FIG. 23.

FIG. 22B illustrates the structure of a 'BD_Packet' field according to another exemplary embodiment of the present invention.

The 'BD Packet' field illustrated in FIG. 22B is similar to that illustrated in FIG. 22A except for a 'System_time_flag' field and a 'system_time' field.

The 'System_time_flag' field indicates whether system time information is present. In exemplary embodiments of the present invention, a 'system_time' field contains the system time information. If the value of this field is set to be '1', it means that the 'system_time' field is present.

The 'system_time' field indicates system time. The system time may be expressed based on the absolute time, such as UTC, which is the same without respect to place but may be expressed based on time affected by a transmitting system. The system time can be used in correcting time in a terminal. To this end, a difference value (offset time) according to a place may be used. The system time may be used to equalize the time of a service providing side with that of a service receiving side or to correct these times. For example, information such as an electronic service guide (ESG) may contain time information, e.g., times when each service starts or ends. In this case, a broadcast receiving apparatus can start or end a service, which is to be provided to a user, exactly as scheduled, by using system time information.

FIG. 23 illustrates the structure of a broadcast descriptor (BD) according to an exemplary embodiment of the present invention.

The BD is fragmented into several BD fragments and is mapped to a 'BD_packet' field.

A 'number_of_BD' field indicates the total number of 'Broadcast_Descriptor_information' fields which will be later described.

A 'tag' field indicates the type of data contained in the 'Broadcast_Descriptor_information' field. Examples of data type according to the value of this field are as follows:

TABLE 6

| Tag | Description |
| --- | --- |
| 0 | Forbidden |
| 1 | channel_info_update |
| 2 | IP_mapping_descriptor |
| 3-127 | Reserved |

A 'length' field indicates the length of the 'Broadcast_Descriptor_information' field. The type of the data in the 'Broadcast_Descriptor_information' field is determined according to Table 6. The structure of the 'Broadcast_Descriptor_information' field according to data type will be described later with reference to FIGS. 24 and 25.

FIG. 24A illustrates the structure of a 'Channel_info_update( )' field when the 'tag' field illustrated in FIG. 23 has a value of 1 according to an exemplary embodiment of the present invention.

The 'channel_info_update( )' field is used to update turbo channel information. This field indicates time when new turbo channel information should be applied. Version and turbo channel configuration information may be included in this field.

A 'update_frame_counter' field indicates a relative frame number based on the reference frame number to which new TCC may be applied.

A 'new_TCC_version' field indicates the version of the information of TCC. This field should be identical with a TCC_version' field present in an SIC when updating is performed.

A 'number_of_turbo_channel field indicates the number of following new_turbo_channel_configuration( ) fields.

The structure of a 'new_turbo_channel_configuration( )' field may be the same as that of the above 'turbo_channel_configuration( )' field.

FIG. 24B illustrates the structure of the 'Channel_info_update( )' field when the 'tag' field illustrated in FIG. 23 has a value of '1' according to another exemplary embodiment of the present invention.

The 'Channel_info_update( )' field illustrated in FIG. 24B is similar to that illustrated in FIG. 24A except for a 'next_update_offset' field.

The 'next_update_offset' field indicates a frame to which new TCC may be applied. This field has a relative value based on a 'BD_next_update_offset' field.

FIG. 24C illustrates the structure of the 'Channel_info_update( )' field according to another exemplary embodiment of the present invention.

The 'Channel_info_update( )' field illustrated in FIG. 24C is similar to that illustrated in FIG. 24B except for an 'update_frame_counter' field and a 'new_TCC_version' field.

The 'update_frame_counter' field indicates a frame to which new TCC may be applied.

The 'new_TCC_version' field indicates the version information of TCC. The version value may be identical to that of the version of TCC in an SIC.

FIG. 25A illustrates an IP mapping descriptor when the value of the 'tag' field illustrated in FIG. 23 is set to be '1' according to an exemplary embodiment of the present invention.

The IP mapping descriptor provides mapping information between an IP stream and a turbo channel. At least one of turbo channel information, an IP address, a MAC address and a simple description of an IP may be included in the IP mapping descriptor. In an exemplary embodiment, an IP mapping table (IMT) indicates an IP mapping descriptor.

An 'Extended_version' field indicates whether the IMT is updated. If the value of this field is set to be '0', it may be understood that the IMT is not updated even if a 'BD_version_number' field is updated.

A 'Number_of_IP' field indicates the total number of IP streams.

A 'Reference_ch_flag' field indicates whether a current channel is a reference channel. If the value of this field is set to be '1', it may be understood that the current channel is the reference channel. An example of the reference channel may be an aggregated ESG channel. ESG information is a large amount of information, and thus, in general, the ESG information may not be completely included in one channel. In this case, a broadcast receiving apparatus can collect all the ESG information only via the reference channel. Thus, a smaller amount of ESG information may be transmitted via an individual channel than via the reference channel, thereby allocating a higher bandwidth to content.

A 'turbo_channel_id' field indicates the identifier of a current turbo channel.

An 'LMT_index_number' field indicates the locations of the IP streams in a turbo channel. The IP streams are mapped to a sub data channel in the turbo channel.

A 'number_of_IP_ch_descriptor' field indicates the number of 'IP_channel_description' fields that will follow.

An 'IP_channel_description' field contains additional information of the IP channel. This field will be described in detail later with reference to FIG. 26.

FIG. 25B illustrates an IP mapping descriptor according to another exemplary embodiment of the present invention.

The IMT illustrated in FIG. 25B is similar to that illustrated in FIG. 25A except for a 'number_of_channel' field and a 'VMI' field.

The 'number_of_channel' field indicates the total number of turbo channels or sub data channels.

The 'VMI (virtual map ID)' field indicates the identifier of a sub data channel in a turbo channel.

FIG. 26 illustrates the structure of the 'IP_channel_description' field illustrated in FIG. 25A according to an exemplary embodiment of the present invention.

The 'IP_channel_description' field is used to transmit additional information regarding an IP channel as described above.

A 'tag' field is used to identify data included in the 'IP_channel_table' field. The types of data according to the value of this field are as follows:

TABLE 7

| Tag | Description |
|---|---|
| 0 | Forbidden |
| 1 | IP_address_table |
| 2 | MAC_address_table |
| 3 | text_description_table |
| 4-255 | Reserved |

A 'Length' field indicates the length of the 'IP_channel_description' field in bytes.

An 'IP_channel_table( )' field indicates IP channel information, such as an IP address and a port. This field will be described in detail later with reference to FIGS. 27 to 29.

FIG. 27A illustrates the structure of an 'IP_address_table' field when the value of the 'tag' field illustrated in FIG. 26 is '1' according to an exemplary embodiment of the present invention.

An 'IP_version' field indicates IP version-4 or 6 but the present invention is not limited thereto. That is, another version may be reserved.

ITPv4_addresses and IPv6_addresses are described in RFC 791 and RFC 2460 in greater detail. Also, Port_number is described in RFC 793 for TCP and RFC 768 for UDP in greater detail.

FIG. 27B illustrates the structure of an 'IP_address_table' field when the value of the 'tag' field illustrated in FIG. 26 is '1' according to another exemplary embodiment of the present invention.

The 'IP_address_table' field illustrated in FIG. 27B is similar to that illustrated in FIG. 27A except for a 'port_number_usage_flag' field.

The 'port_number_usage_flag' field indicates whether port number exists. In an exemplary embodiment, whether a 'port_number' field exists is indicated in an 'IP_address_table' field.

FIG. 28 illustrates the structure of a 'MAC_address_table' field when the value of the 'tag' field illustrated in FIG. 26 is '2' according to an exemplary embodiment of the present invention.

Mac_address is described in RFC 1042 in detail.

FIG. 29 illustrates the structure of a Text_description_table' field when the value of the 'tag' field illustrated in FIG. 26 is '3' according to an exemplary embodiment of the present invention.

A 'text_description_table' field provides text description regarding an IP channel.

An 'ISO_639_language_code' field indicates that the following text information is identified by the ISO 639-3 language code. In an exemplary embodiment, a 'description' field contains the text information.

The 'description' field provides a text description of the IP channel. The text description is coded in IOS 8859-1 characters.

A multiplexing structure of MCAST system will now be described.

A transport frame contains a plurality of turbo channels and each of the turbo channels contains a plurality of sub channels. Also, each of the sub channels may contain sub data channels. The same type of data is transmitted via the sub channels. The sub data channels may be services themselves or service components.

Various types of data can be multiplexed and transmitted or only a particular type of data can be transmitted through MCAST. As examples of the former case, signaling data, real-time media data, IP data and object data may be multiplexed and transmitted. As examples of the latter case, only signaling data and IP data may be transmitted. In the latter case, the sub data channels may be categorized by difference to IP compression type.

Signaling data is transmitted via a 168 or 188 (or 187)-byte MCAST transport packet. The length of the transport packet is variable. An LMT specifies the locations and numbers of all the sub data channels. Also, the LMT may specify the location of data mapped to the sub data channels or the locations of IP streams in a turbo channel.

The following LMT may be present in a transport packet in a turbo data channel or be periodically or non-periodically present in a packet at a specification location. For example, the LMT may be present in a first signaling sub data channel or an MCAST packet header. Also, the LMT may be present in each of frames but may not be transmitted when the locations of service components are fixed in frames.

An LIT contains service configuration information, and the number and identifier of each of the sub data channels.

A conventional broadcasting system searches for a desired program through PID filtering, whereas an MCAST system can directly provide a user with a desired service by detecting the exact location of data constituting each service on a frame-by-frame basis via a LMT and/or a LIT without performing filtering.

Figure 30A:
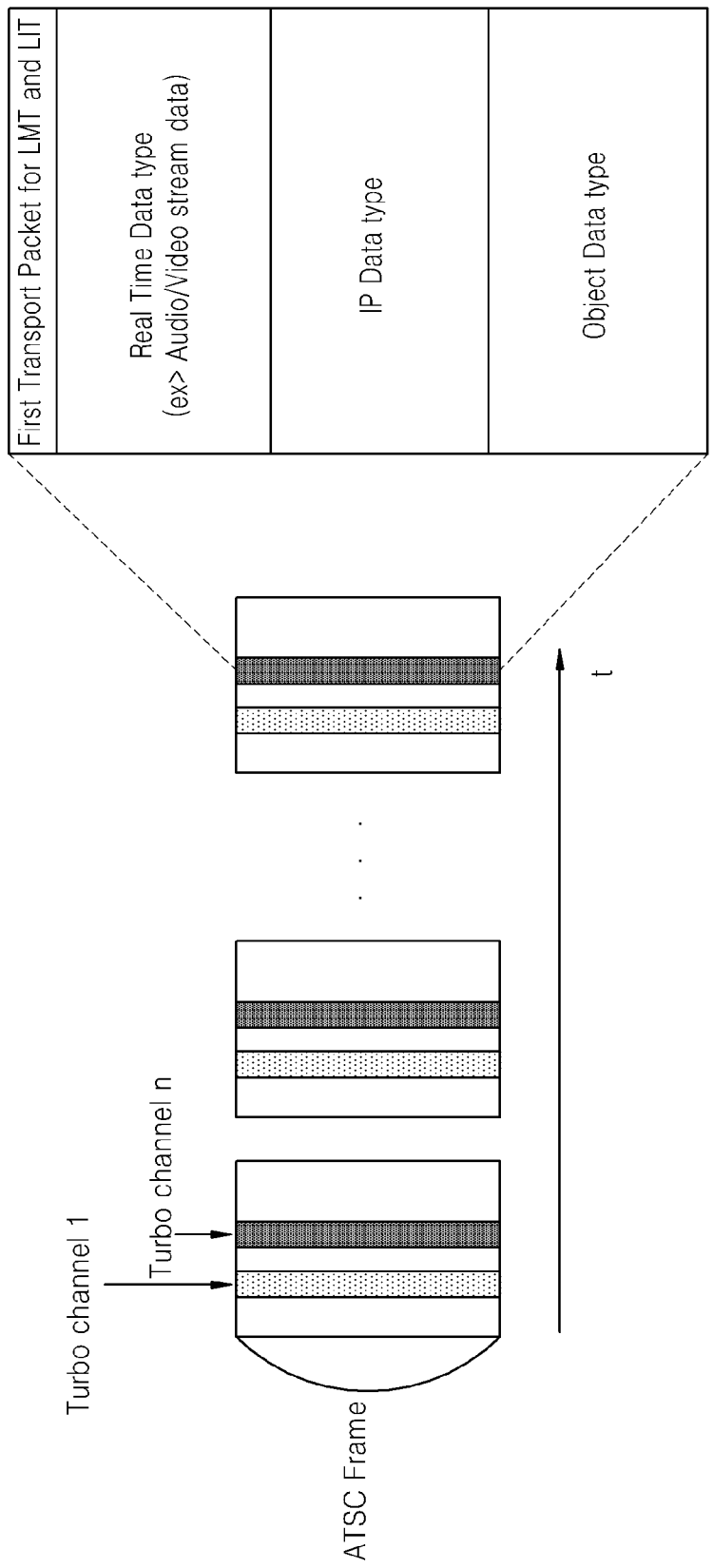
FIG. 30A illustrates an MCAST multiplexing structure according to an exemplary embodiment of the present invention.

FIG. 30A illustrates an MCAST multiplexing structure according to an exemplary embodiment of the present invention.

In detail, FIG. 30A illustrates a case where signaling data, real-time data, IP data and object data are multiplexed. A frame is divided into a service access region for accessing a service, e.g., a LMT or a LIT, and a data region for data transmission. An MCAST transport frame according to an exemplary embodiment of the present invention may be transmitted while being inserted into a transport frame of another broadcasting system, be transmitted separately, or be transmitted while being one-to-one mapped to a transport frame of another broadcasting system. In an exemplary embodiment, an MCAST transport frame is transmitted via an ATSC transport frame.

As described above, the MCAST transport frame is divided into sub channels according to data type. The sub channels are channels subdivided by physically dividing turbo channels transmitting a data stream according to data type. In FIG. 30A, sub channels are subdivided into a sub channel for real-time data type, a sub channel for IP data type, and a sub channel for object data type.

The sub channels may be divided into independent sub data channels. A sub data channel includes more than one transport packet. A sub data channel may consist of a set of 188 bytes (or 168 bytes) MCAST transport packets within an ATSC frame. Packet length may be variable.

Figure 30B:
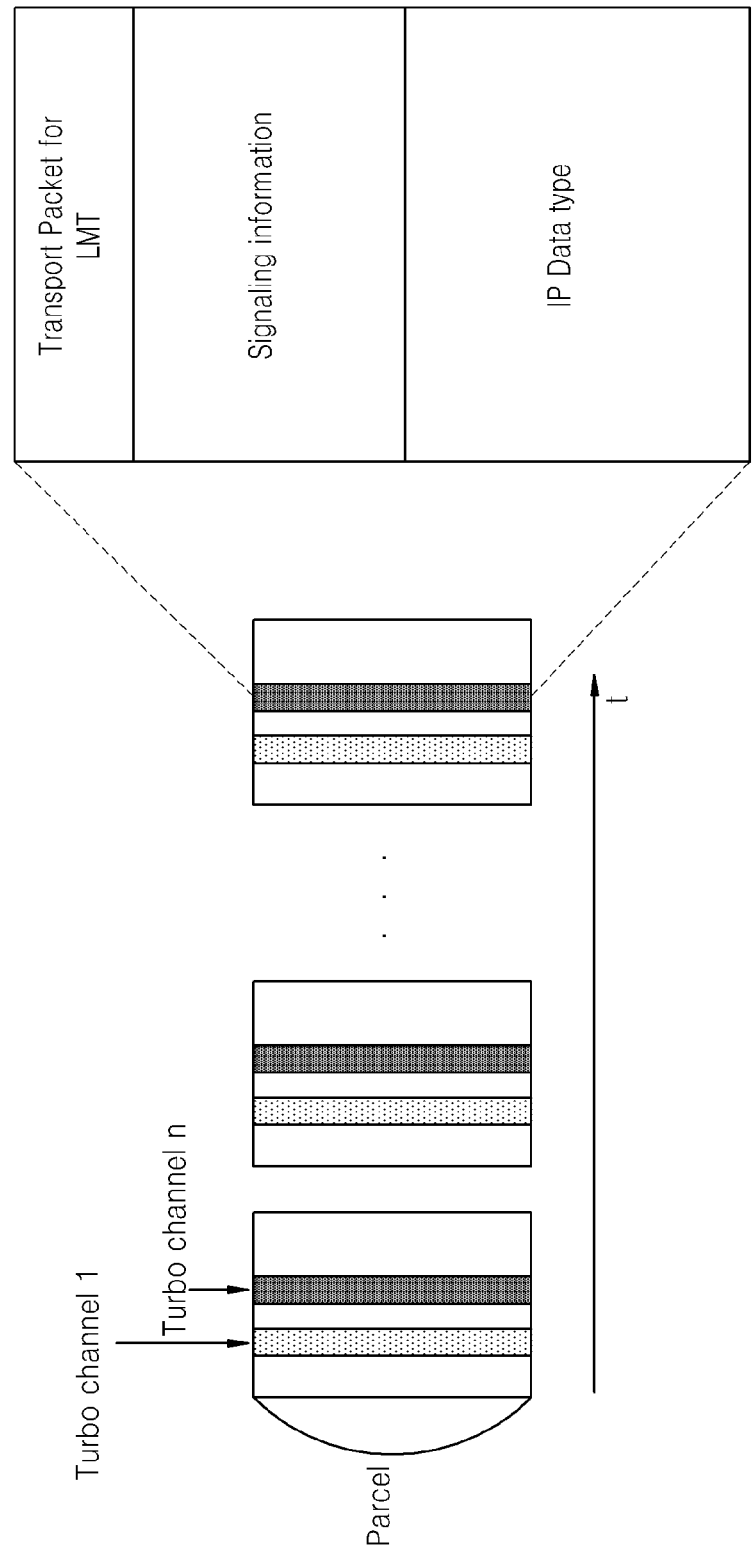
FIG. 30B illustrates an MCAST multiplexing structure according to another exemplary embodiment of the present invention.

FIG. 30B illustrates an MCAST multiplexing structure according to another exemplary embodiment of the present invention.

In detail, FIG. 30B illustrates a case where only signaling data and IP data are multiplexed. LMT information may be transmitted while being included in an SIC or an IP data type sub channel.

Figure 31A:
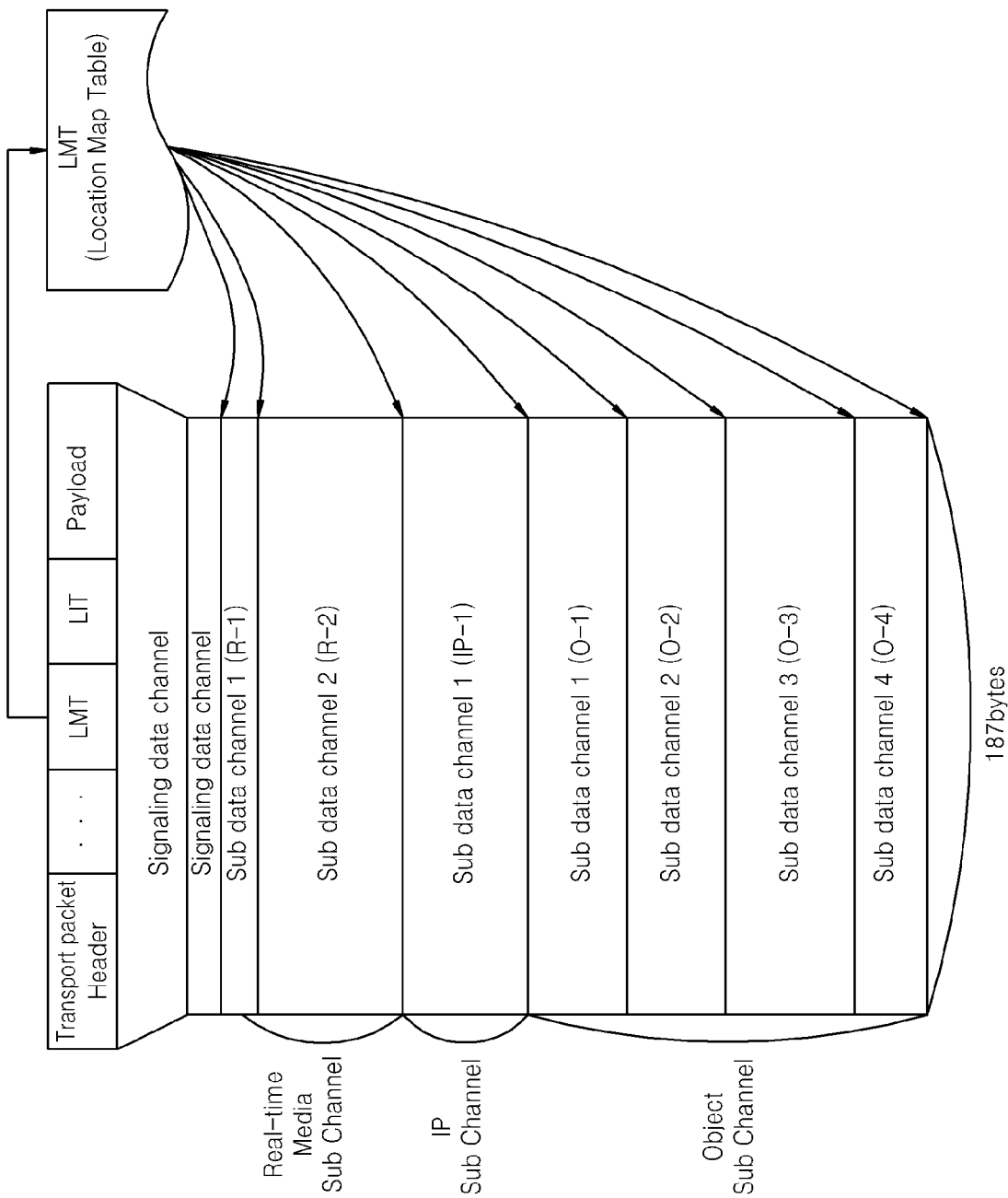
FIG. 31A illustrates an MCAST frame structure and an LMT according to an exemplary embodiment of the present invention.

FIG. 31A illustrates an MCAST frame structure and a LMT according to an exemplary embodiment of the present invention.

FIG. 31A illustrates in more detail the sub channel illustrated in FIG. 30A. Referring to FIG. 31A, an MCAST transport frame consists of a signaling sub channel, a real-time media sub channel, an IP sub channel and an object sub channel. That is, at least one of three types of data, such as real-time media data, IP data, and object data, is transmitted via the MCAST transport frame.

Each of the sub channels includes a sub data channel.

The real-time media sub channel transmits real-time media data, such as an A/V stream. In an exemplary embodiment, the real-time media sub channel consists of a sub data channel 1 (R-1) and a sub data channel 2 (R-2). The IP sub channel transmits IP data, and includes a sub data channel (IP-1) in an exemplary embodiment. The object sub channel transmits object data that is used in real time or is used after being received and stored in a broadcast service receiving apparatus. In an exemplary embodiment, the object sub channel includes a sub data channel 1 (O-1), a sub data channel 2 (O-2), a sub data channel 3 (O-3) and a sub data channel 4 (O-4).

One service consists of more than one service component. Thus, all service components of a service must be received in order to provide the service. A sub data channel is a path via which only one service component is transmitted. Thus, in order to access one service, the locations of all sub data channels respectively transmitting service components must be known.

Service access information, such as a LMT or a LIT, for accessing service components constituting a service is included in a header part of a transport packet. The transport packet may include at least one of a 'header' field, an 'LMT' field, an 'LIT' field, and payload.

An LMT field provides the structure of the sub data channel and physical location information, which will be described in detail later with reference to FIG. 34.

Figure 31B:
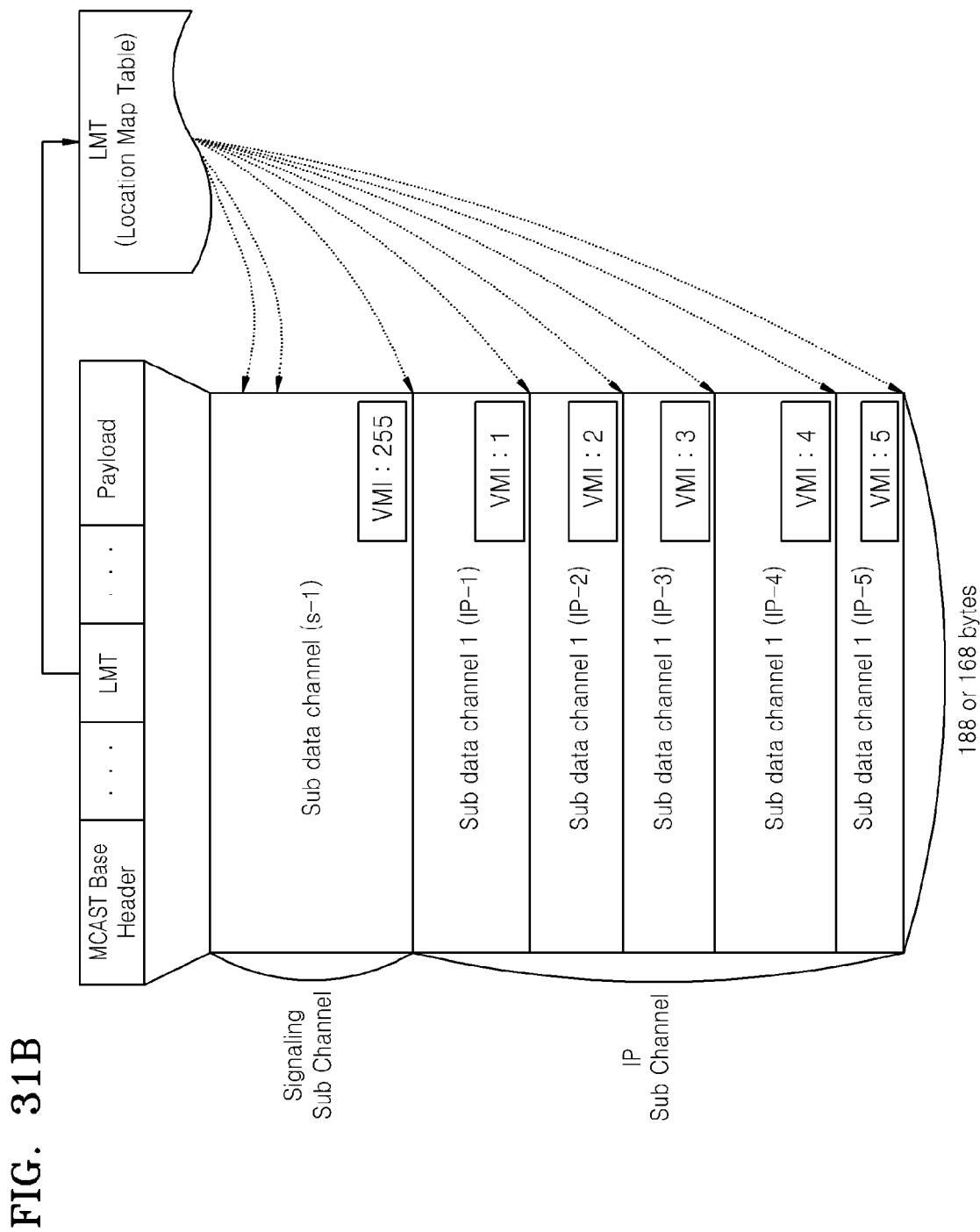
FIG. 31B illustrates an MCAST frame structure and an LMT according to another exemplary embodiment of the present invention.

FIG. 31B illustrates an MCAST frame structure and a LMT according to another exemplary embodiment of the present invention.

Referring to FIG. 31B, only IP data is transmitted via an MCAST frame and VMI information is included in order to identify a sub data channel.

It is very important to detect the location of a sub data channel in an MCAST frame, and such information is included in a LMT as described above. The location of the sub data channel is detected using an offset in the frame. However, when there is a change in the sub data channel, e.g., when a sub data channel is added or canceled, it is necessary to recognize this change. If sub data channels can be identified by virtual map identification (VMI), it is possible to easily check a change in the sub data channels. The VMI will be described in detail with reference to FIG. 32.

Figure 32:
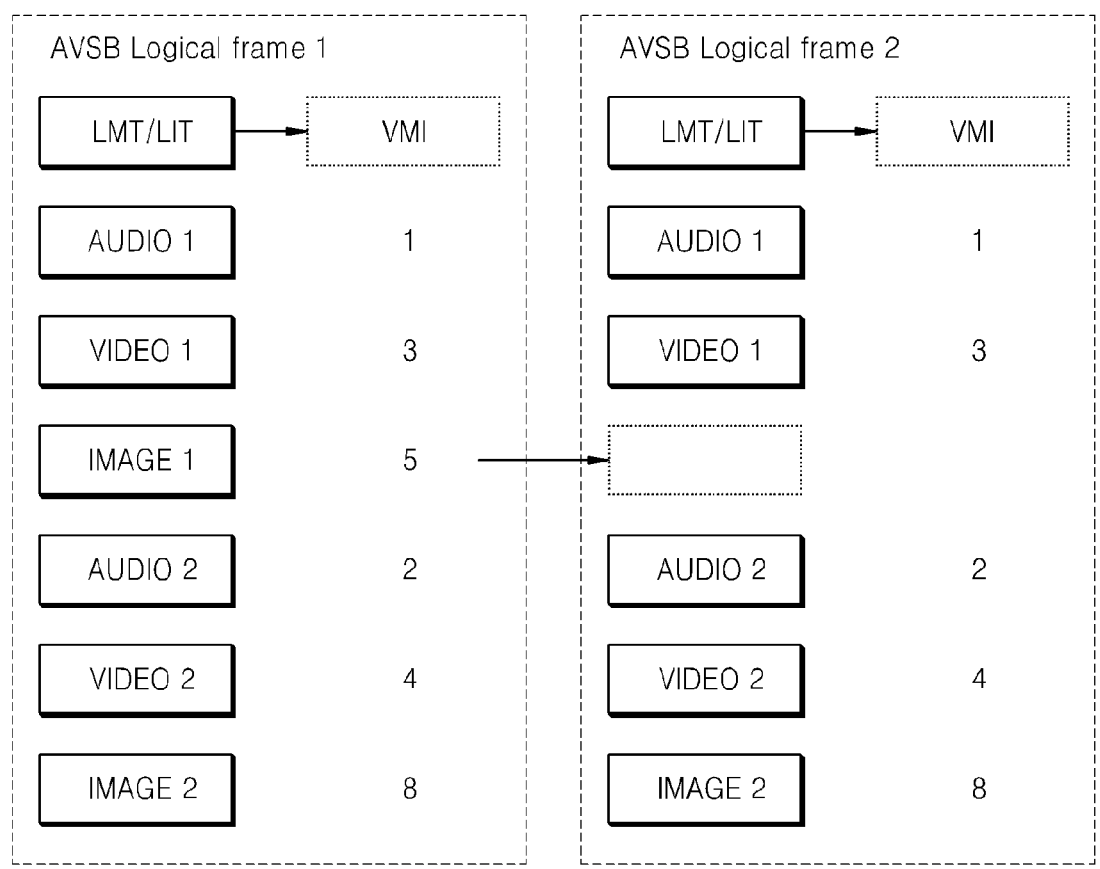
FIG. 32 illustrates a method of checking a change in a sub data channel by using virtual map identification (VMI) according to an exemplary embodiment of the present invention.

FIG. 32 illustrates a method of checking a change in a sub data channel by using virtual map identification (VMI) according to an exemplary embodiment of the present invention The VMI according to an exemplary embodiment of the present invention is included in signaling information such as a LMT, a LIT, or an IMT. The VMI is an identifier identifying sub data channels. It is possible to determine whether a sub data channel is changed by using the VMI.

Referring to FIG. 32, in a previous frame, sub data channels constituting a service 1 are audio 1, video 1 and an image 1. Values of 1, 3, and 5 are respectively allocated to these sub data channels as VMI values.

In a subsequent frame, the sub data channel corresponding to the image 1 is canceled. If the location of a sub data channel is indicated with only an offset in a frame, it is not reasonable to use an offset as an identifier since offsets of sub data channel are different on a frame basis. However, if VMIs are respectively allocated to sub data channels as a unique identifier, a sub data channel in which a change occurs can be exactly recognized.

Figure 33:
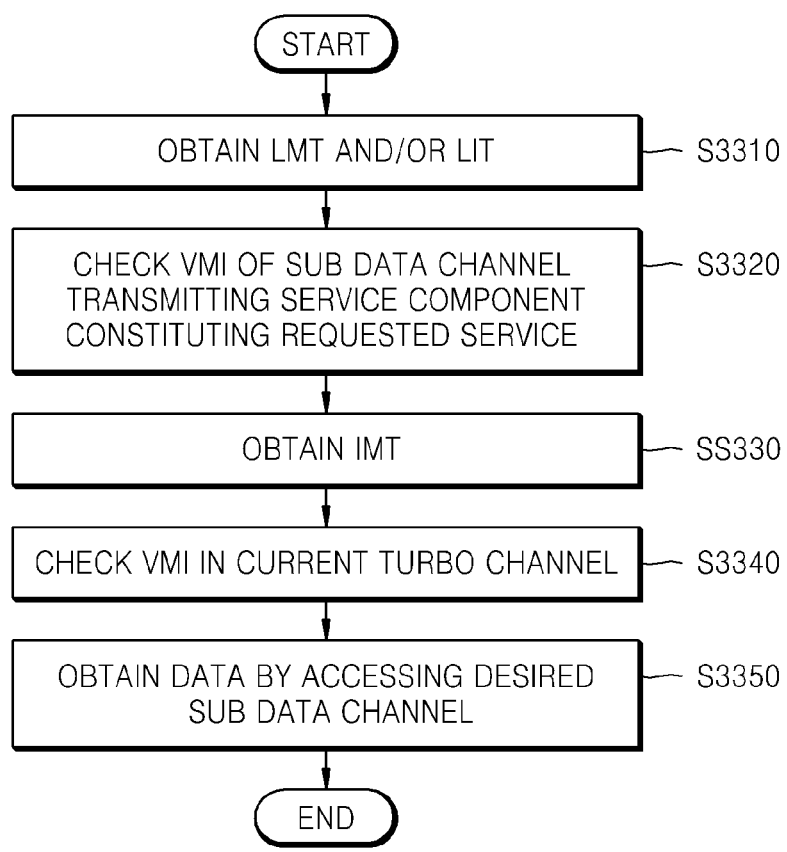
FIG. 33 is a flowchart illustrating a method of acquiring a service by using VMI according to an exemplary embodiment of the present invention.

FIG. 33 is a flowchart illustrating a method of acquiring a service by using VMI according to an exemplary embodiment of the present invention.

In operation S3310, an LMT and/or an LIT is obtained.

In operation S3320, the VMI of a sub data channel transmitting a service component constituting a requested service is checked.

In operation S3330, an IMT is obtained.

In operation S3340, VMI in a current turbo channel is checked.

In operation S3350, data is obtained by accessing a desired sub data channel.

Figure 34A:
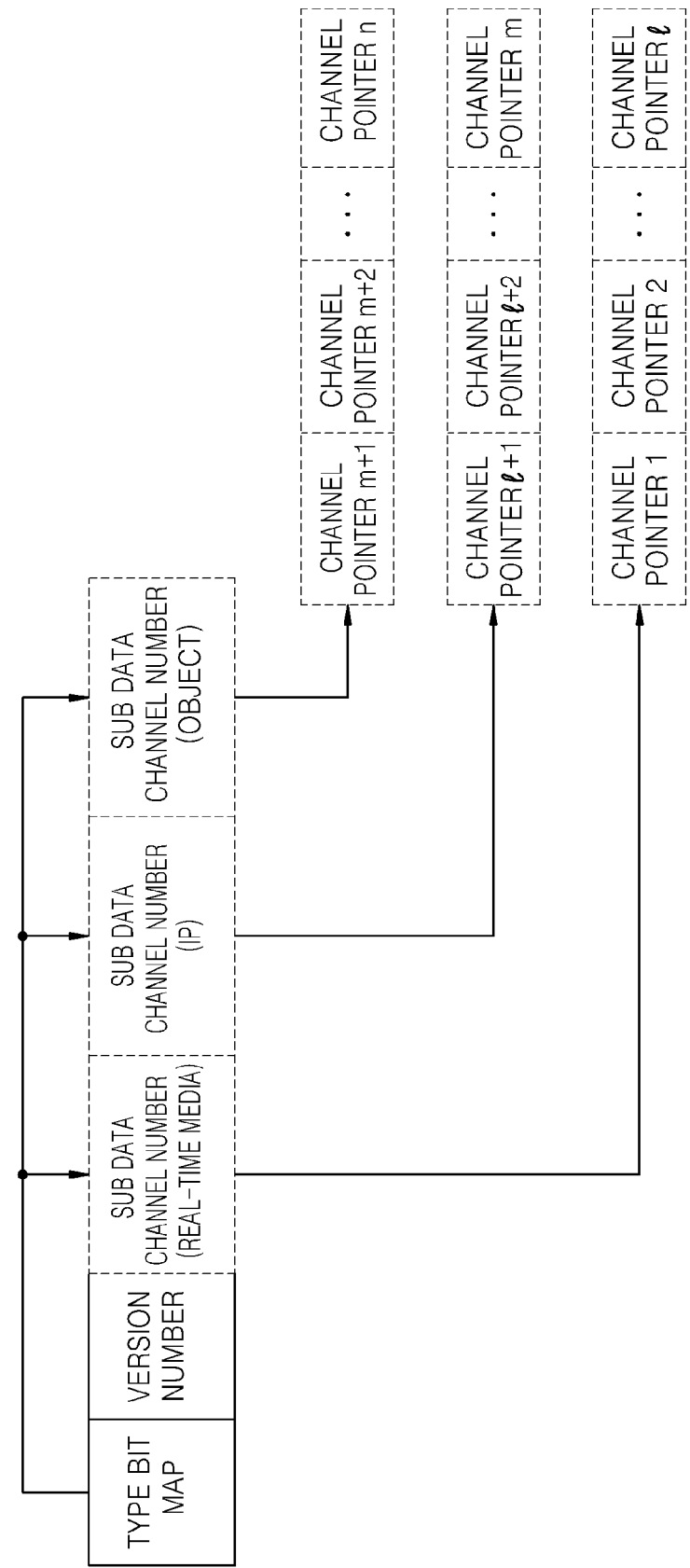
FIG. 34A illustrates the structure of a location map table (LMT) according to an exemplary embodiment of the present invention.

FIG. 34A illustrates the structure of a LMT according to an exemplary embodiment of the present invention.

An LMT according to an exemplary embodiment of the present invention includes a 'type bitmap' field, a 'version number' field and at least one 'sub data channel number' field.

The 'type bitmap' field indicates the type of data included in an MCAST transport frame transmitted at predetermined intervals of time. It may be assumed that object data, real-time media data and IP data are transmitted via the MCAST transport frame.

The 'type bitmap' field consists of three bits, each of which may indicate whether a type of data is present. For example, it is assumed that a first bit indicates whether real-time media data is present in the frame, a second bit indicates whether IP data is present in the frame, a third bit indicates whether object data is present in the frame, and there is data corresponding to a case where bit value is '1'. Thus, if the value of the 'type bitmap' field is '111', it means that all types of data are present and if the value of the 'type bitmap' field is '011', it means that IP data and object data are present.

The 'version number' field indicates the version of the LMT.

The 'sub data channel number' field indicates the total number of sub data channels for each type of data. The value of this fields corresponds to total number of 'channel pointer' fields indicating the physical address of a sub data channel.

Referring to FIG. 34A, since there are I 'channel pointer' fields correspond to real-time media data, there are I sub data channels transmitting real-time media data.

Each of the 'channel pointer' fields indicates the physical location of a sub data channel. Index numbers may be sequentially allocated to the 'channel pointer' fields. The numbers being sequentially allocated to the 'channel pointer' fields in the LMT are referred to as 'LMT index numbers'. The LMT index numbers may not be included in the 'channel pointer' fields but be sequentially allocated to the 'channel pointer' fields when a broadcast receiving apparatus interprets an 'LMT' field. The LMT index numbers are allocated in order to refer to the channel pointers of sub channels constituting respective services in the LIT.

Figure 34B:
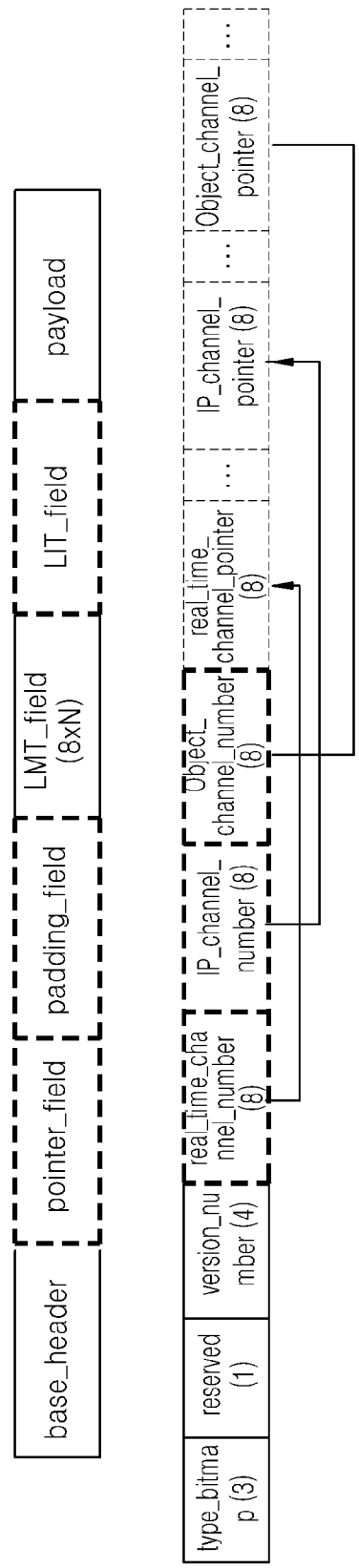
FIG. 34B illustrates in detail the structure of the LMT of FIG. 34A according to an exemplary embodiment of the present invention.

FIG. 34B illustrates in detail the structure of the LMT according to FIG. 34A.

If it is assumed that the value of the 'type bitmap' field is '011', the value of the 'sub data channel number' field for IP data is '2' and the value of the 'sub data channel number' field is '3', the 'channel pointer' fields 1 and 2 indicate the locations of sub data channels for IP data and the 'channel pointer' fields 3 through 5 indicate the locations of sub data channels for IP data. If LMT index numbers are sequentially allocated to these 'channel pointer' fields, LMT index numbers of 1 to 5 are respectively allocated to the 'channel pointer' fields 1 to 5.

Figure 35A:
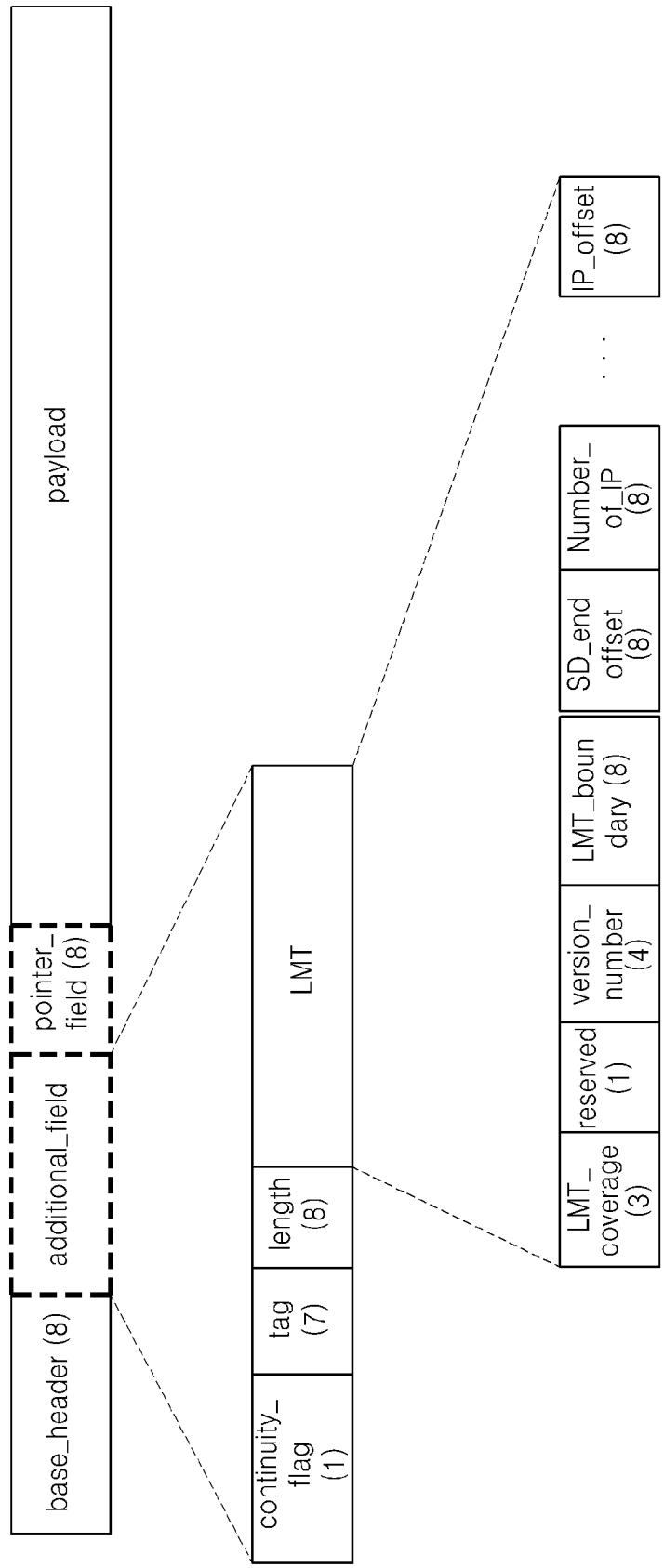

FIGS. 35A and 35B illustrate the structures of a LMT according to exemplary embodiments of the present invention.

A 'tag' field indicates whether LMT information will be included. In an exemplary embodiment, LMT information is actually included in an 'LMT_information' field.

A 'length' field consists of eight bits and indicates the length of an 'LMT_information' field.

The 'LMT_information' field specifies the locations of sub data channels in a sub channel and signaling data (SD) in a signaling sub channel. The 'LMT_information' field will be described with reference to FIG. 36.

FIG. 36 illustrates the structure of the 'LMT_information' field illustrated in FIG. 35 according to an exemplary embodiment of the present invention.

An 'LMT_coverage' field indicates the number of following LMTs that are identical to a current LMT. For example, if the value of a 'version_number' field which will later be described is '1' and the value of the 'LMT_coverage' field is '001', it means that a LMT whose version is '1' is present. Similarly, if a following LMT is not identical to the current LMT, the value of this field is set to be '0'.

A 'version_number' field consists of four bits and indicates the version of the LMT. The version number may be incremented by 1 modulo 16 whenever one of LMT-related fields changes.

An 'LMT_boundary' field indicates the locations of packets covered by a current LMT. The value of the 'LMT_boundary' field is not limited if it can represent the packets covered by the current LMT. For example, the value of this field may indicate the offsets or the total number of the covered packets covered by a current LMT.

An 'SD_end_offset' field is an 8-bit field indicating the end position of a signaling sub channel. If no signaling data is contained in the signaling sub channel, then the value of this field should be set to be '0'.

A 'number_of_IP' field indicates the number of IP sub data channels.

An 'IP_end_offset' field is an 8-bit field indicating the end positions of IP sub data channels within an IP sub channel. If no IP data is contained in a first IP sub data channel, then the value of this field should be set to be '0'.

Figure 37A:
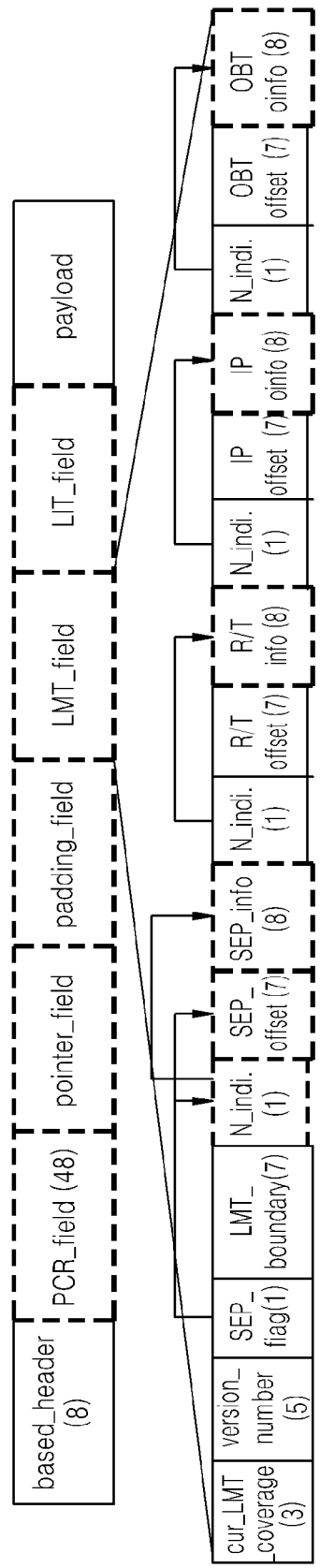

FIGS. 37A and 37B illustrate the structure of an LMT and an 'LMT_information' field according to another exemplary embodiment of the present invention.

Referring to FIG. 37A, the LMT indicates the ending offset information of sub data channels. Sub data channels respectively transmit four types of data: signaling data, real-time media data, IP data and object data, and the locations of the sub data channels according to type are expressed with ending offsets.

A starting value of each of the sub data channels is always '1' and numbers are individually allocated to the sub data channels according to sub data type. However, if there is no first sub data channel, the value of a 'next_indicator( )' field is set to be '0'.

If a valid data packet does not temporarily exist in one or more parcels, the offset of a corresponding sub data channel is equal to that of a previous packet. The offset of the first sub data channel is set to be '0'.

Each of the fields is defined with reference to FIG. 37B.

A 'SEP_flag' field indicates whether a signal encapsulation packet (SEP) exists.

A 'SEP_end_offset' field is an 8-bit field indicating the end position of a SEP sub data channel when the value of the 'SEP_flag' field is A first 'next_indicator' field indicates whether a 'real_time_end_offset' field is further present. If the value of this field is '0', there is no 'real time end offset' field anymore, and if the value of this field is '1', it means that a 'real_time_end_offset' field is further present.

The 'real-time_end_offset' field is a seven-bit field indicating the end position of real-time sub data channel transmitting real-time media data. If a current MCAST parcel does not have real-time data, the value of this field may be set to be '0' or this field may not exist.

A second 'next_indicator' field indicates whether another 'IP_end_offset' field is further present. If the value of this field is '0', a current 'IP_end_offset' field is the last one and if the value of this field is '1' another IP_end_offset' field is present.

An 'IP_end_offset' field is a seven-bit field indicating the ending position of an IP sub data channel transmitting IP data. If no IP sub data channel is present in the current MCAST parcel, the value of this field may be set to be '0' or this field may not exist.

A third 'next_indicator' field indicates whether another 'object_end_offset' field is further present. If the value of this field is '0, a current 'object_end_offset' field is the last one and if the value of this field is '1', an 'object_end_offset' field follows.

An 'object_end_offset' field is a seven-bit field indicating the ending position of an object sub data channel transmitting object data. If no object sub data channel exists in the current MCAST parcel, the value of this field may be set to be '0' or this field may not exist.

FIG. 38 illustrates the structure of a LMT according to another exemplary embodiment of the present invention.

An 'LMT_coverage' field indicates the number of subsequent LMTs that are identical to a current LMT. If a subsequent LMT is not identical to the current LMT, the value of this field is set to be '0'.

A 'version_number' field is a two-bit field indicating the version of the LMT. The version number may be incremented by 1 modulo 4 whenever one of LMT-related fields changes.

A 'selector_bits (SEP, reversed, IP)' field indicates the type of an existing sub data channel. In FIG. 38, since it is assumed that only IP data is transmitted via an MCAST frame, a second bit is a reserved bit. If a first bit is '1', it means that a SEP sub data channel exists and if a third bit is '1', it means that an IP sub data channel exists.

An 'LMT_length' field indicates the length of a LMT field.

An 'LMT_boundary' field indicates the number of offsets of packets covered by a current LMT.

A 'number of SEP' field is an eight-bit field indicating the total number of SEP sub data channels.

A 'VMI' field indicates the identifiers of sub data channels, which is unique in a turbo channel.

An 'SEP_end_offset' field is an eight-bit field indicating the end position of an SEP sub channel.

A 'num_of_IP' field indicates the number of IP sub data channels.

An 'IP_end_offset' field is an eight-bit field indicating the end position of an IP sub data channel. Both the 'Sep_end_offset' field and the 'IP_end_offset' field are calculated by counting packets based on a packet containing the LMT. In another exemplary embodiment of the present invention, an offset may be calculated in bytes.

Figure 39:
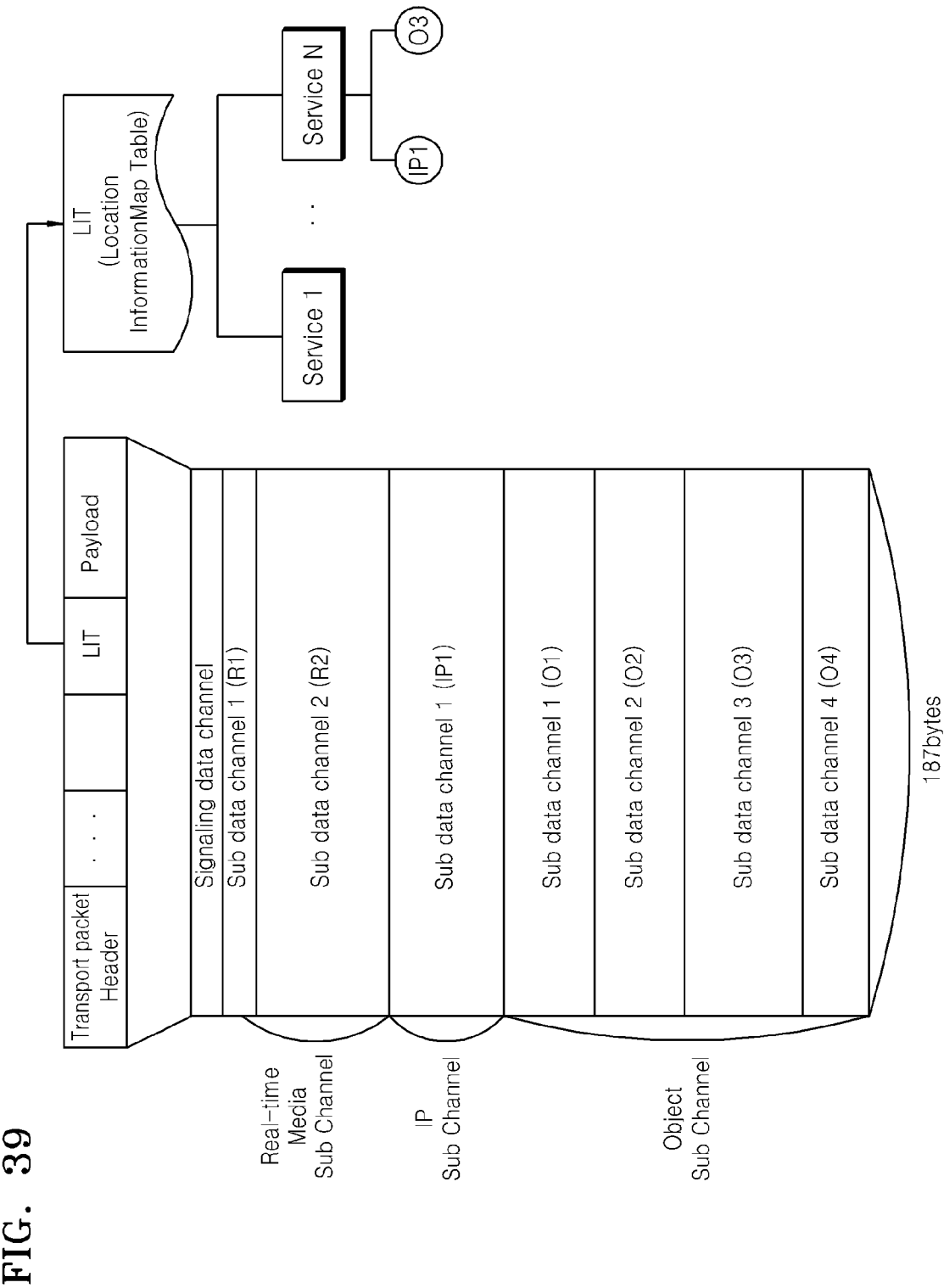
FIG. 39 illustrates the structures of an MCAST frame and a linkage information table (LIT) according to an exemplary embodiment of the present invention.

FIG. 39 illustrates the structures of an MCAST frame and a LIT according to an exemplary embodiment of the present invention.

An LIT may be located on a signaling sub channel that is first positioned in a turbo channel containing data within an ATSC frame. Every service consists of one or more service components and the LIT indicates a list of the service components. That is, the LIT may specify service composition information. The position of a sub data channel is detected from the above LMT.

The LIT is closely related to the LMT and may be present in each frame.

Figure 40:
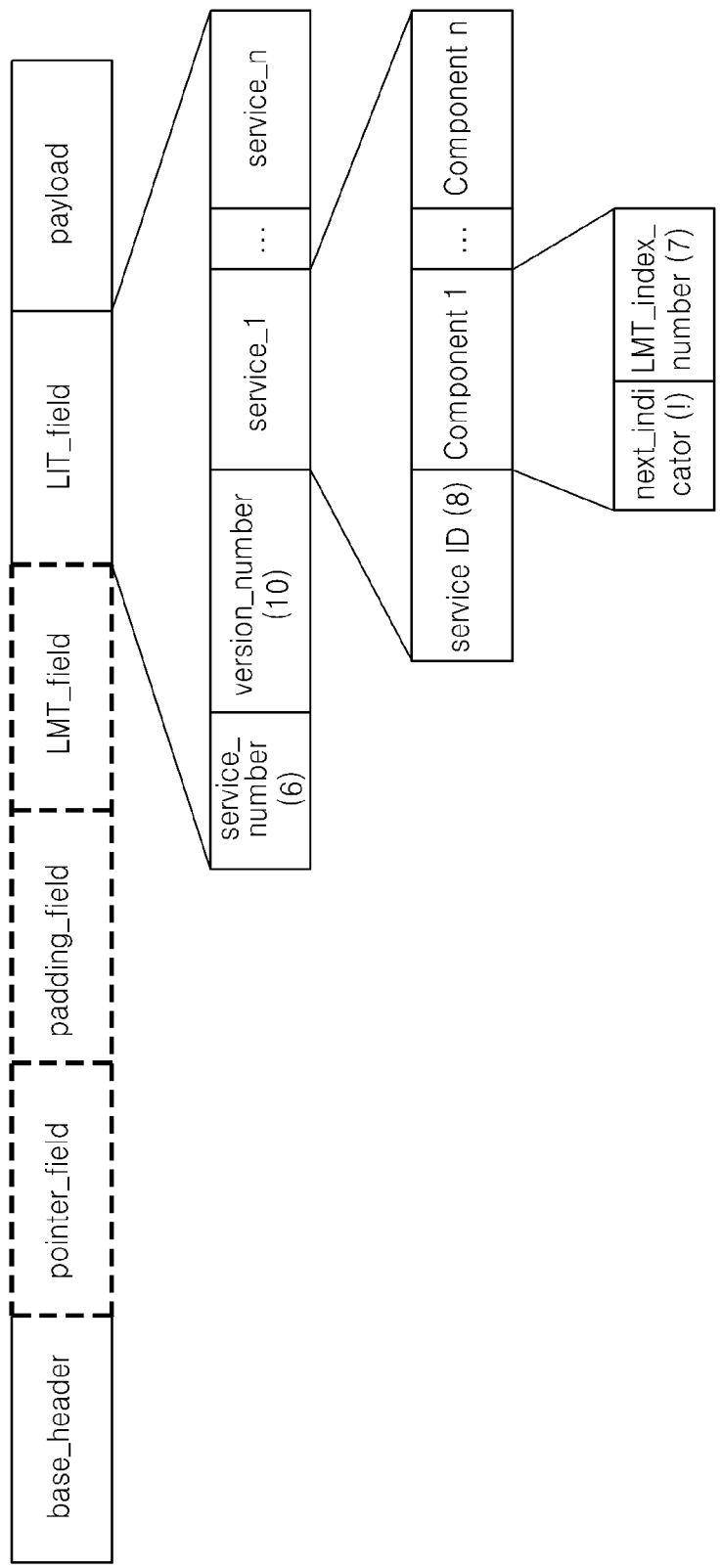
FIG. 40 illustrates the structure of an LIT according to an exemplary embodiment of the present invention.

FIG. 40 illustrates the structure of a LIT according to an exemplary embodiment of the present invention.

A 'service_number' field indicates the number of services included in an MCAST frame according to exemplary embodiments of the present invention.

A 'version_number' field indicates the version of the LIT. Each service field consists of a 'service identifier' field and at least one 'LMT index number' field. The 'LMT index number' is allocated to a 'channel pointer' field as described above in FIG. 34B. Thus, a broadcast receiving apparatus is capable of detecting the physical address of a sub data channel for a desired service in a transport frame by interpreting the LIT.

Figure 41A:
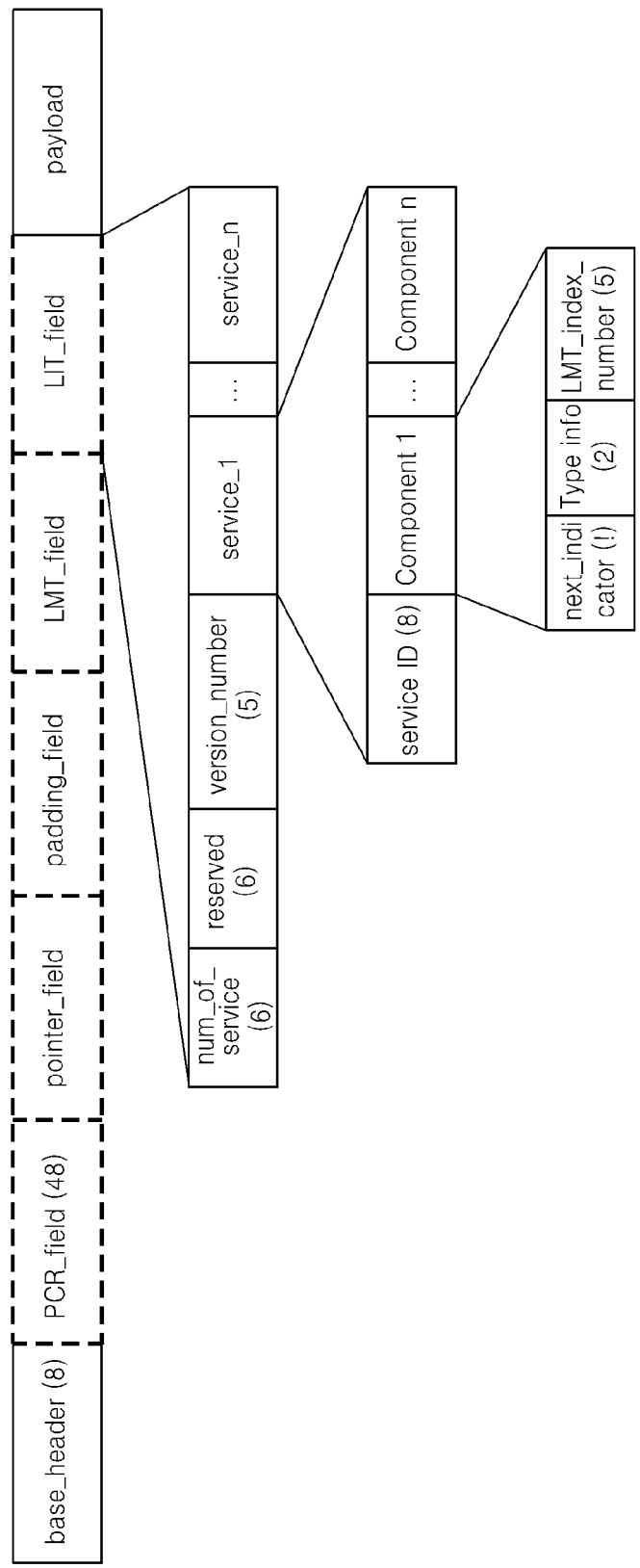

FIGS. 41A and 41B illustrate the structure of an LIT according to another exemplary embodiment of the present invention.

When a plurality of sub data channels form one service, the LIT specifies the structure of the service. The locations of the sub data channels can be determined by the offset information of the sub data channels included in the LMT. That is, each component can be identified via an accumulator counter of each of the sub data channels.

A 'num_of_service' field is a six-bit field indicating the number of available services in a current frame.

A 'version_number' field is a 10-bit field indicating the version number of LIT-related fields. The version number may be incremented by one whenever one of the LIT-related fields changes.

A 'service_ID' field is an eight-bit field identifying a service in a turbo channel.

A 'next_indicator' field is a one-bit field indicating whether additional 'next_indicator' and an 'LMT_index_number' fields are present. If the value of this field is '1', it means that the additional 'next_indicator' and 'LMT_index_number' fields are present, and if the value of this field is '0', the 'next_indicator' field and the 'LMT_index_number' field do not exist anymore.

A 'type_info' field indicates the type of a sub data channel indicated by the 'LMT_index_number' field, which is defined according the value of this field as follows:

TABLE 8

| Value | Description |
| --- | --- |
| 00 | reserved |
| 01 | real time data |
| 10 | IP data |
| 11 | object data |

An 'LMT_index_number' field is a seven-bit field indicating an array index of each LMT. The value of this field is individually increased according to the 'type_info' field. That is, referring to FIG. 40, the LMT index number is sequentially increased irrespective of the type of sub data channel. However, referring to FIG. 41, the LMT index number is individually increased according to the type of sub data channel.

For example, it is assumed that two channel pointers corresponding to an IP sub data channel and three channel pointers corresponding to an object sub data channel are present in an MCAST frame. In this case, referring to FIG. 40, LMT index numbers of 1 to 5 are sequentially allocated to the channel pointers, and thus, LMT index numbers of 3 to 5 are respectively allocated to the channel pointers corresponding to the object sub data channel. However, referring to FIG. 41, the LMT index numbers are individually increased according to the type of sub data channel, and thus, LMT index numbers of 1 to 3 are respectively allocated to the channel pointers corresponding to the object sub data channel.

Figure 42A:
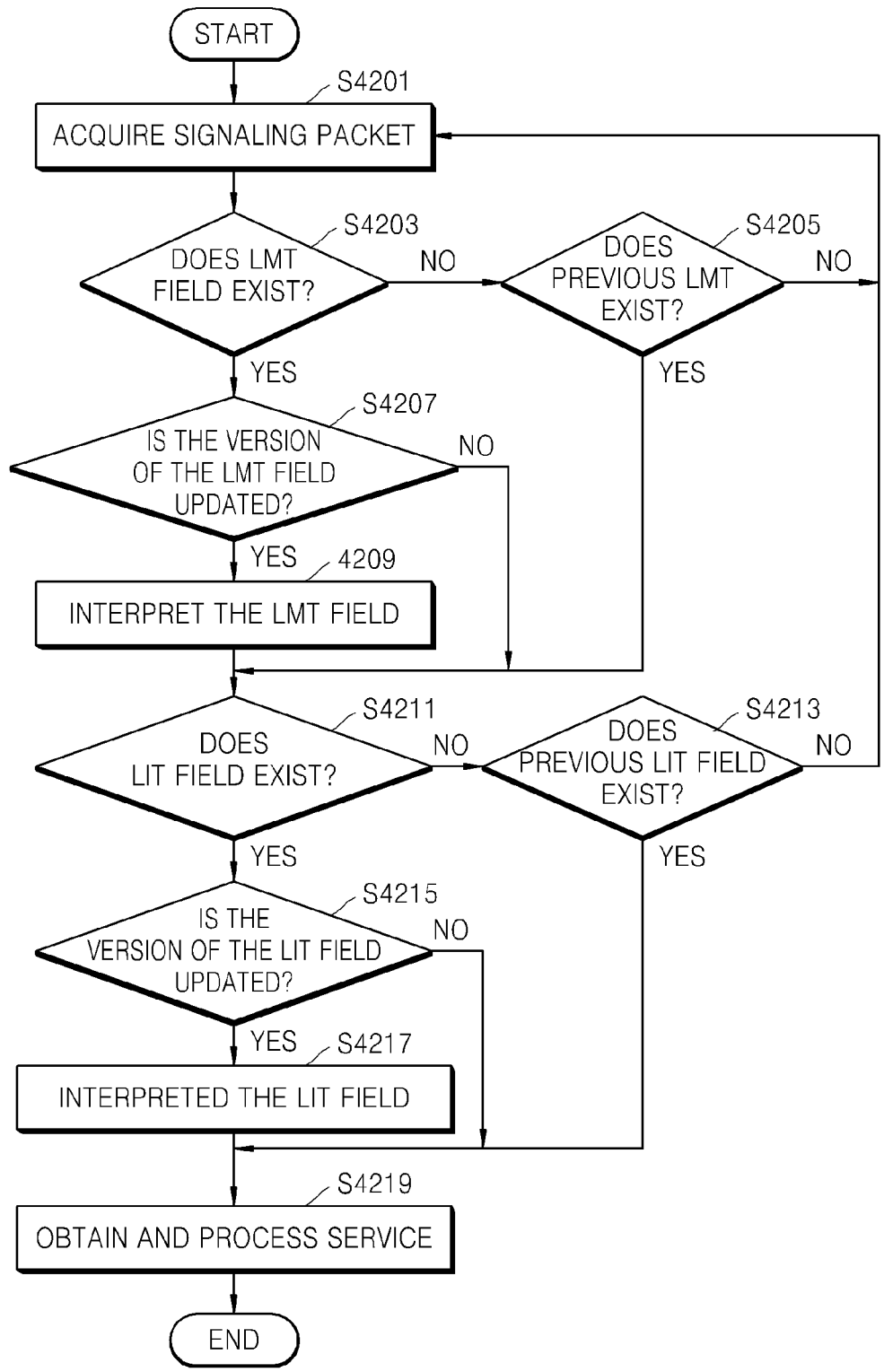
FIG. 42A is a flowchart illustrating a method of providing a service using an LMT and an LIT according to an exemplary embodiment of the present invention.

FIG. 42A is a flowchart illustrating a method of providing a service by using a LMT and a LIT according to an exemplary embodiment of the present invention.

Referring to FIG. 42A, an LMT field is transmitted at regular intervals and located in a predetermined area of an MCAST frame. In operation S4201, when receiving a transport frame, a broadcast service receiving apparatus acquires and interprets a signaling packet including service access information, which is located in a predetermined area of the transport frame.

In operation S4203, the broadcast service receiving apparatus determines whether a LMT field exists in the signaling packet. If it is determined in operation S4203 that no LMT fields exist in the signaling packet, it is determined whether a previous LMT field has been stored in the broadcast service receiving apparatus, in operation S4205. If it is determined in operation S4205 that a previous LMT field exists in the broadcast service receiving apparatus, the method proceeds to operation S4211.

If it is determined in operation S4203 that a LMT field exists in the signaling packet, the broadcast service receiving apparatus determines whether the version of the LMT field has been updated by using version information included in the LMT field, in operation S4207. If it is determined in operation S4207 that the version of the LMT field has been updated, the LMT field is interpreted in operation S4209. By interpreting the LMT field in operation S4209, information about the locations of sub-data channels is obtained.

In operation S4211, the broadcast service receiving apparatus determines whether an LIT field exists in the signaling packet. If it is determined in operation S4211 that no LIT fields exist, it is determined whether a previous LIT field exists in the broadcast service receiving apparatus, in operation S4213. If it is determined in operation S4213 that a previous LIT field exists, the method proceeds to operation S4219.

If it is determined in operation S4211 that a LIT field exists in the signaling packet, it is then determined whether the version of the LIT field is updated, in operation S4215. By interpreting the LIT field in operation S4217, linkage information about each of services, that is, service configuration information, is obtained.

In operation S4219, the services are obtained from the results of the interpretations of the LMT field and LIT field, and then processed.

Figure 42B:
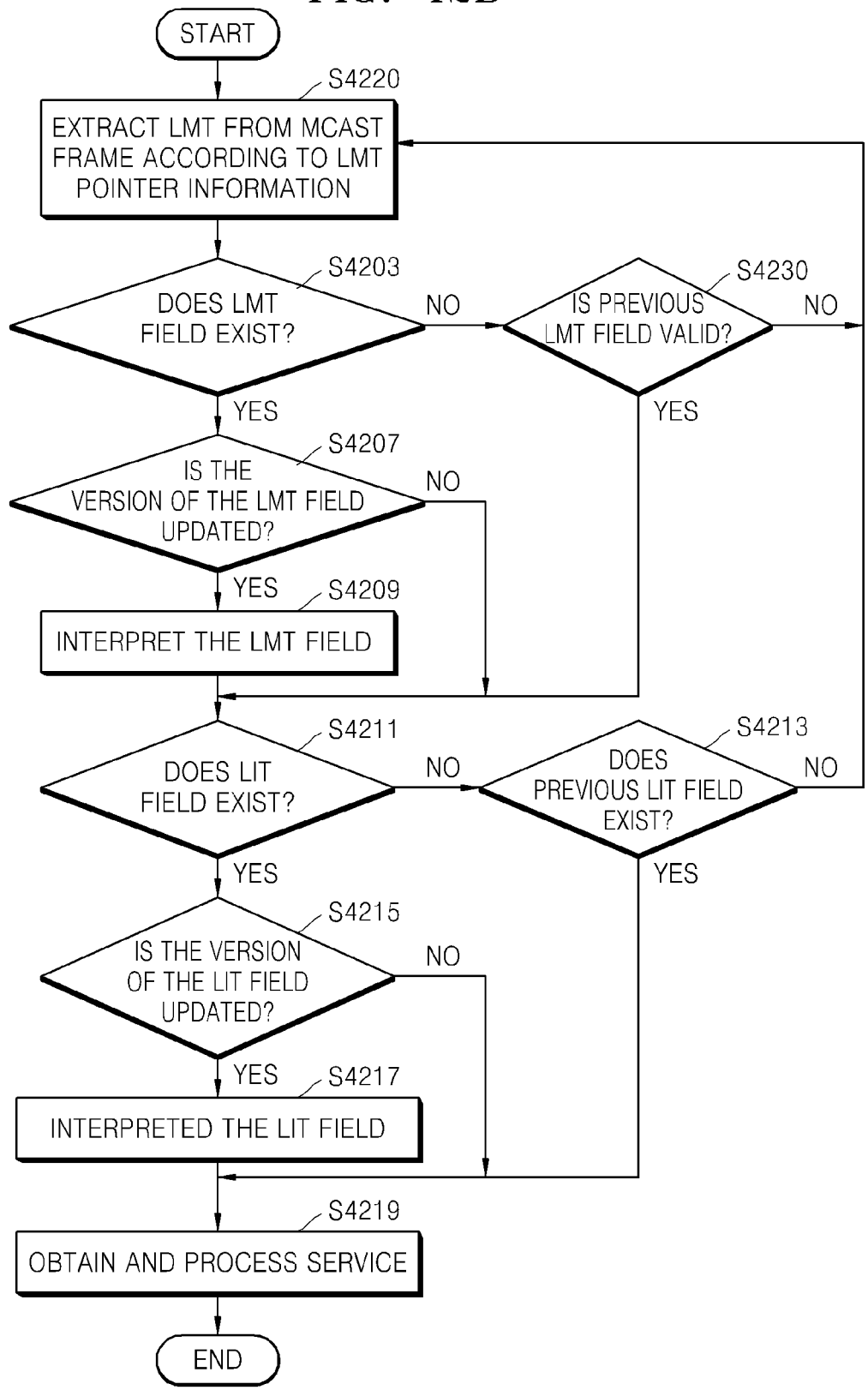
FIG. 42B is a flowchart illustrating a method of providing a service using an LMT and an LIT according to another exemplary embodiment of the present invention.

FIG. 42B is a flowchart illustrating a method of providing a service by using an LMT and an LIT according to another exemplary embodiment of the present invention.

Referring go FIG. 42B, an LMT contains an 'LMT_coverage' field, and thus, the location of a subsequent LMT can be detected even if a packet containing the LMT cannot be received due to an error or LMTs are not inserted periodically. Accordingly, the location of the LMT and a cycle in which the LMT field is inserted into a transport field vary. Operations in FIG. 42B indicated by the same reference numbers as those in FIG. 42A are the same as those in FIG. 42A, and thus, detailed descriptions thereof will be omitted.

Referring to FIG. 42B, in operation S4220, an LMT is extracted from an MCAST frame according to LMT pointer information extracted from a previous LMT. The LMT pointer information points out the location of a subsequent LMT. Accordingly, even when the LMT fails to be inserted into a predetermined area of the transport frame, the LMT can be easily extracted from the transport frame.

In operation S4203, it is determined whether an LMT field exists at a location indicated by the LMT pointer information. If it is determined in operation 4203 that an LMT field exists, the method proceeds to operation S4207. If it is determined in operation 4203 that an LMT field does not exist, the method proceeds to operation S4230. Where no LMT field exists in the location indicated by the LMT pointer information implies a case where the LMT field is omitted and a case where an error is generated in the LMT field.

In operation S4230, it is determined whether the previous LMT field is valid, based on information regarding the total number of LMTs whose version is the same, which is included in the previous LMT field. The fact that the previous LMT field is valid means that it can be continuously used. If it is determined in operation S730 that the previous LMT field is valid, the method proceeds to operation S4211.

The structure of transport information according to data type will now be described.

First, in the case of real-time rich service, PSI of MPEG-2 and ATSC must be obtained and decoded in order to decode multimedia elementary streams in a broadcasting system. Then, a decoder must wait to receive a frame that is to be first decoded. Thereafter, a user can view video. In MCAST, important decoding information is encoded into an information descriptor included in each of the multimedia elementary streams.

In this case, decoder configuration information (DCI) and multimedia data may be simultaneously transmitted for high-speed access, as described above. That is, the DCI is inserted into an I-frame and then transmitted. The DCI has been described above with reference to FIG. 4.

FIG. 43 illustrates the structure of object transmission information according to an exemplary embodiment of the present invention.

Referring to FIG. 43, an 'Object_Delivery_information' field contains signaling information for transmitting an object. The 'Object_Delivery_information' field includes the expiry date of the object, parameters for AL-FEC, and an additional descriptor. Directory components are objects or other directories.

An 'Object_Delivery_information' field may be transmitted via a signaling encapsulation packet (SEP).

A 'directory_information_flag' field indicates whether a directory exists.

Object information can be expressed in a tree with a directory. If the value of the 'Directory_information_flag' field is '1' it may be understood that a directory exists.

A 'number_of_objects' field indicates the total number of objects transmitted via the 'object_delivery_information' field.

A 'number_of_directory' field indicates the total number of directory information. In an exemplary embodiment, a 'directory_information' field contains directory information.

The 'directory_information' field contains directory information, which will be described later in detail with reference to FIG. 44.

An 'object_id' field which indicates the identifier of the object.

An 'expire_time_flag' field whether the object has an expiry time.

An 'LMT_index_number' field indicates the index numbers of sub data channels categorized according to data type.

An 'object_extension_id' field is used as an additional identifier of a plurality of objects when the objects are transmitted in the same sub data channel.

An 'AL-FEC_mode' field indicates an AL-FEC mode. Examples of the AL-FEC mode according to the value of this field are as follows:

TABLE 9

| value | Mode |
| --- | --- |
| 0 | MCAST_AL_FEC |
| 1-15 | Reserved |

A 'total_length' field indicates the length of the object in bytes.

A 'time_table' field contains time information allowing objects not to be used after their expiry times. This field will be described later in detail with reference to FIG. 45.

An 'encoding_mode' field indicates an encoding mode used by AL-FEC. Examples of the encoding mode according to the value of this field are as follows:

TABLE 10

| Value | Description (n, k) |
| --- | --- |
| 0 | (2880, 2304) |
| 1 | (1920, 1536) |
| 2 | (960, 768) |
| 3-15 | Reserved |

A 'padding_length' field indicates padding length in a last source block of the object.

A 'number_of_descriptors' field indicates the number of subsequent 'descriptor' fields.

A 'tag' field indicates data types of objects. In an exemplary embodiment, this field indicates the type of data included in the 'descriptor' field. Examples of data type according to the value of this field are as follows:

TABLE 11

| Value | Description |
|---|---|
| 0 | Forbidden |
| 1 | content_name_description |
| 2 | mime_type_description |
| 3-15 | Reserved |

A 'length' field indicates the lengths of 'descriptor' fields in bytes.

A 'descriptor' field indicates descriptors according the value of the 'tag' field. The 'descriptor' field according to the value of the 'tag' field will be described later in detail with reference to FIGS. 46 and 47.

FIG. 44 illustrates the structure of the 'directory_information' field illustrated in FIG. 43 according to an exemplary embodiment of the present invention.

A 'number_of_directory' field indicates the number of directories.

A 'directory_id' field indicates the identifier of the directory.

A 'directory_name_length' field indicates the length of the name of the directory in bytes.

A 'directory_name' field indicates the name of the directory encoded in ISO 8859-1 characters.

A 'number_of_components' field indicates the number of components included in each of the directories.

An 'object_id_directory_id' field indicates the identifiers of objects or other directories.

FIG. 45 illustrates the structure of a 'time_table' field illustrated in FIG. 43 according to an exemplary embodiment of the present invention.

A 'years' field indicates a year. It is possible to express how much time has passed since a particular point of time. For example, if the year of 1970 is a reference year and the value of this field is '0', the year of 1970 is represented.

A 'months' field indicates a month from among January through December.

A 'days' field indicates a date.

An 'hours' field indicates an hour from among one through twenty-four hours.

A 'minutes' field indicates a minute from among one through sixty minutes.

FIG. 46 illustrates the structure of a 'content_name_descriptor' field when the value of the 'tag' field illustrated in FIG. 43 is '1' according to an exemplary embodiment of the present invention.

A 'content_name_length' field indicates the length of content name in bytes.

A 'content_name' field indicates the name of content encoded in ISO 8859-1 characters.

FIG. 47 illustrates the structure of a 'mime_type_description' field when the value of the 'tag' field illustrated in FIG. 43 is '2' according to an exemplary embodiment of the present invention.

A 'mime_type_length' field indicates the length of mime type in bytes, ("mime" denotes Multipurpose Internet Mail Extensions)

A 'mime_type' field indicates mime type. This field is set to the strings encoding of any media type registered with IANA. For more detailed information see RFC 2045, RFC 2046, and http://www.iana.org/assignments/media-tvps.

Figure 48:
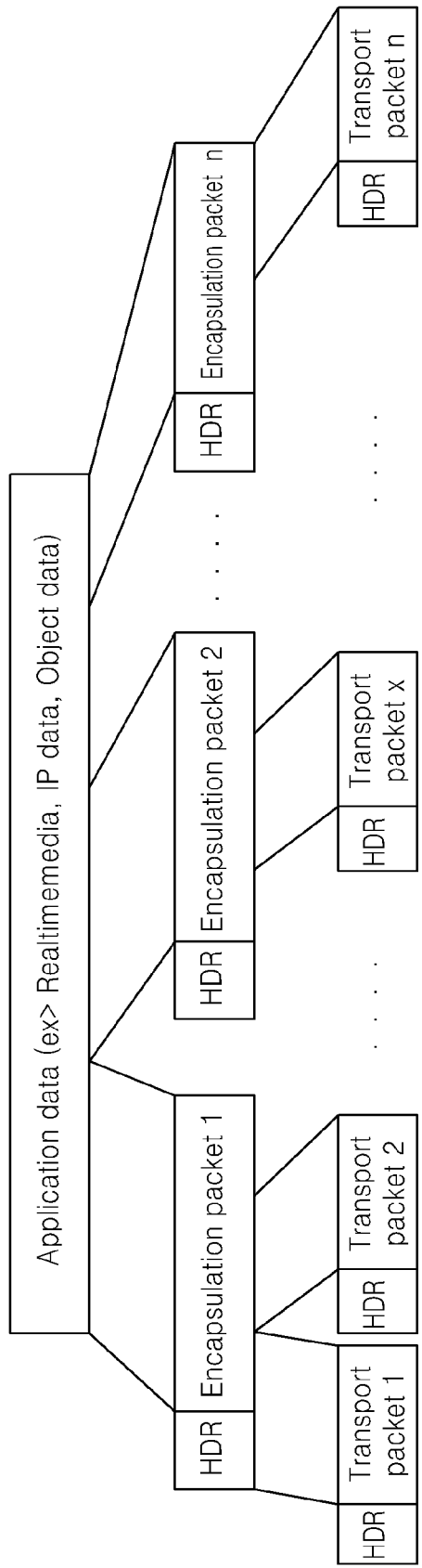
FIG. 48 illustrates the relationship between an encapsulation packet and a transport packet in an MCAST system according to an exemplary embodiment of the present invention.

FIG. 48 illustrates the relationship between an encapsulation packet and a transport packet in an MCAST system according to an exemplary embodiment of the present invention.

In the MCAST system, a transport layer is divided into an encapsulation layer and a packetization layer. The encapsulation layer is responsible for fragment of application data and the transport layer divides the encapsulation packet into MCAST transport packets.

More specifically, the encapsulation layer encapsulates all types of application data to be adapted to an A-VSB transmission method. That is, an encapsulation packet having a structure adaptive to application data is created to be suitable for the format of application data. The application data includes real-time media data, IP data, object data and signaling data. The encapsulation packet has a specific structure according to application type.

The packetization layer divides an encapsulation packet generated from an encapsulation layer into at least one transport packet. The size of the transport packet may be variously determined, for example, 168 or 188 bytes.

The payload of the MCAST packet may be concatenately transmitted. That is, a part of or all of two or more encapsulation packets may be included within one MCAST packet. According to exemplary embodiments of the present invention, a 'first_last' field and a 'pointer_field' field are used in order to indicate this situation while saving bits.

The 'first_last' field and the 'pointer_field' field present in a header region of a transport packet, which will later be described, may be defined as follows:

TABLE 12

| | | Description | |
|---|---|---|---|
| first_last field | Pointer Field | First Encapsulation packet | Second Encapsulation packet |
| 00 | 1 | starts in previous TP and ends in this TP | starts in this TP and does not end in this packet |
| 01 | 1 | | starts in this TP and ends in this packet |
| 10 | 1 | starts and in this TP | starts in this TP and does not end in this packet |
| 11 | 1 | | starts in this TP and ends in this packet |

The 'pointer_field' field indicates whether an MCAST transport packet includes two or more encapsulation packets. If the value of this field is '1', it means that two or more encapsulation packets are present in the MCAST transport packet. In an exemplary embodiment, the value of this field is '1', and thus, two or more encapsulation packets are contained in the MCAST transport packet.

The 'first_last' field indicates whether the start and end of the encapsulation packets are included in the MCAST transport packet. For convenience of explanation, a preceding packet and a subsequent packet will be respectively referred to as a first encapsulation packet and a second encapsulation packet from among two or more continuous encapsulation packets. If two or more encapsulation packets are included in the MCAST transport packet, the end of the first encapsulation packet and the start of the second encapsulation packet may be included in the MCAST transport packet.

A first bit of the 'first_last' field indicates whether the start of the first encapsulation packet is included in the MCAST transport packet, and a second bit thereof indicates whether the end of the second encapsulation packet is included in the MCAST transport packet. For example, if the value of this field is '10', both the start and end of the first encapsulation packet are included in the MCAST transport packet and only the start of the second encapsulation packet is included in the MCAST transport packet.

FIGS. 49 through 55 illustrate examples of an encapsulation packet according to an exemplary embodiment of the present invention.

Figure 49A:
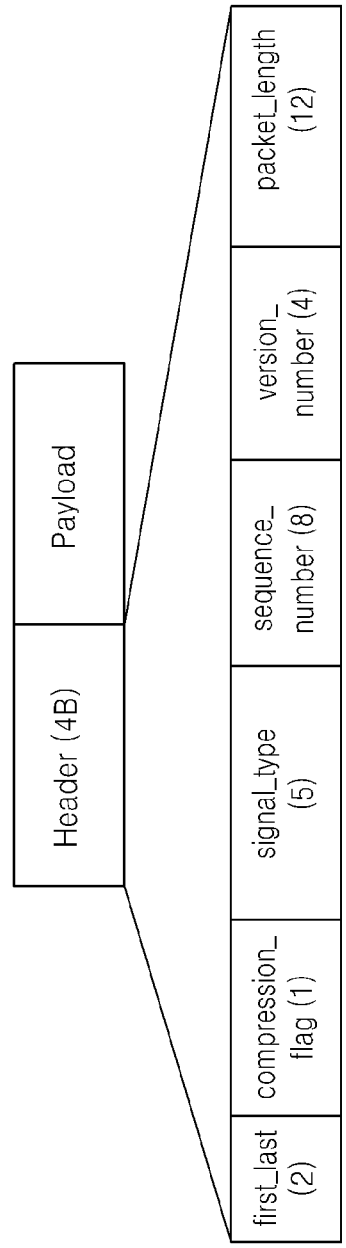

FIGS. 49A and 49B illustrate the structure of an encapsulation packet for signaling according to an exemplary embodiment of the present invention.

The packet illustrated in FIG. 49A includes a four-byte header and a payload. The payload may include a description of or metadata of an application, such as an ESG and an electronic program guide (EPG). Also, the payload includes optional data, such as an IP mapping information table and meta data information of an object.

A 'first_last' field is a two-bit field specifying whether an encapsulation packet is a first or last one. This field may be defined according to the value thereof, as shown in Table 5.

A 'compression_flag' field is a one-bit field specifying whether payload data is compressed or not. If the value of this field is '1', it may mean that the payload data is compressed.

A 'signal_type' field indicates the type of the payload data. The type of the payload data according to the value of this field may be as illustrated in Table 13 or 14.

TABLE 13

| Value | Description |
| --- | --- |
| 0 | Forbidden |
| 1 | [TBD] |
| 2 | Object Delivery Information |
| 3-31 | Reserved |

TABLE 14

| Value | Description |
| --- | --- |
| 0 | Forbidden |
| 1 | IP_mapping_Table |
| 2-31 | Reserved |

A 'sequence_number' field is an eight-bit field indicating a value incrementing within the same data type of an encapsulation packet. The value of this field wraps around to '0' if it reaches a maximum value. The 'sequence_number' field is used for an object fragmentation identifier during retransmission.

A 'version_number' field is a four-bit field indicating the version number of a signaling encapsulation packet (SEP). The version number is incremented by one whenever encapsulation payload version is changed.

A 'packet_length' field indicates in bytes the length of the payload in the packet.

A 'data_byte' field is an eight-bit field. The type of data transmitted via the payload depends on the value of the 'signal_type' field.

Figure 50A:
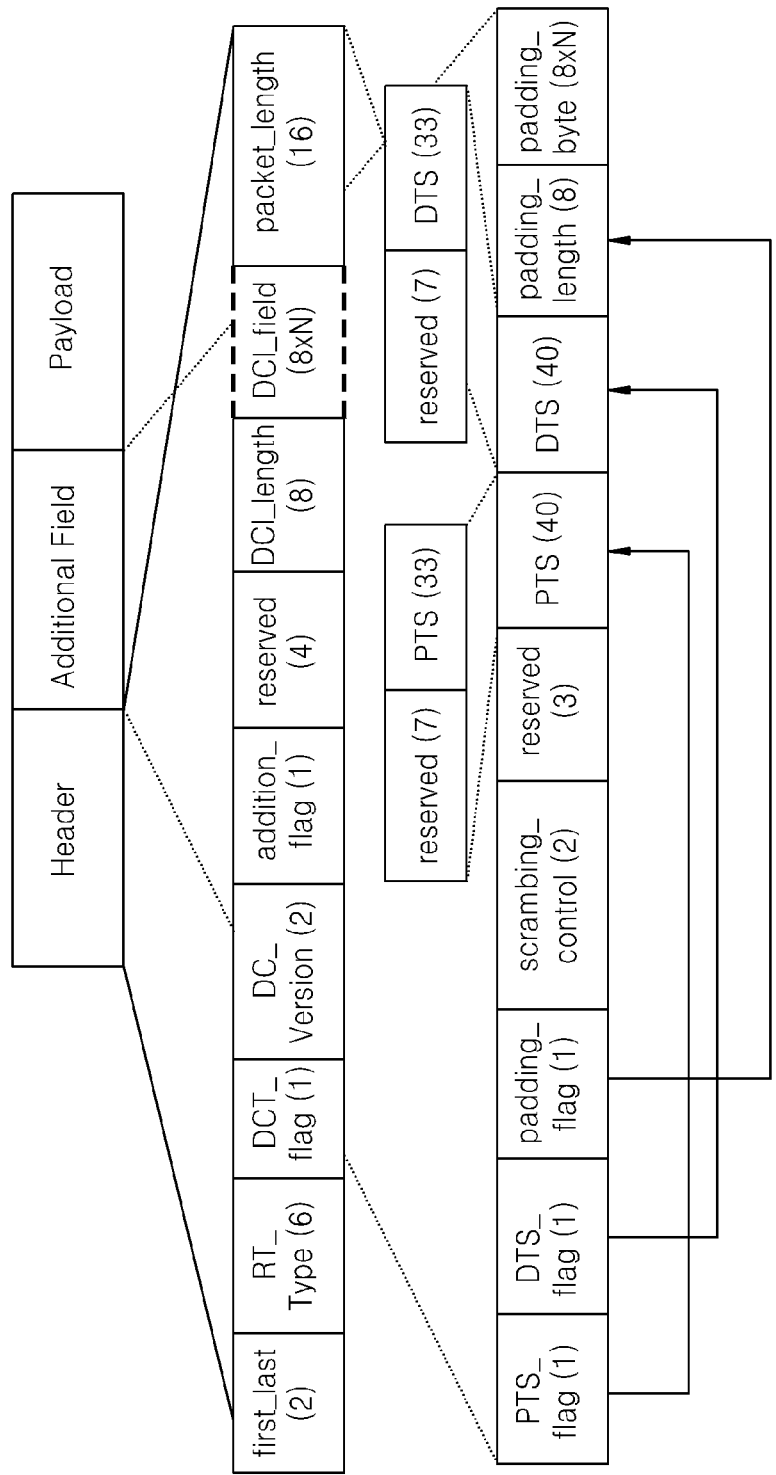

FIGS. 50A and 50B illustrate the structure of an encapsulation packet for real-time data according to an exemplary embodiment of the present invention.

The packet illustrated in FIG. 50 is an encapsulation packet for real-time data type, and includes a header, an additional field, and a payload.

A 'first_last' field is a two-bit field specifying whether an encapsulation packet is a first or last one. This field may be defined according to the value thereof, as shown in Table 5.

A 'RT_type' field is a six-bit field indicating the type of data transmitted via the payload. An example of data type according to the value of this field may be as follows:

TABLE 15

| Value | Description |
| --- | --- |
| 0 | Audio |
| 1 | Video |
| 3-63 | Reserved |

A 'DCI_flag' field indicates whether decoder configuration information (DCI) exists in the header of the encapsulation packet. In an exemplary embodiment, the 'DCI_field' field contains DCI.

A 'DC_version' field indicates the version of the DCI. The value of this field is closely related to and may be set to be equal to that value of the DC field (or the DCI_field) of a transport packet.

An 'addition_flag' field indicates whether additional information is present in the header of the encapsulation packet. In an exemplary embodiment, the 'additional_field' field includes additional information.

A 'DCI_length' field indicates in bytes the length of the 'DCI_field' field in the header of the packet.

The 'DCI_field' field indicates the DCI. The 'DCI_field' field (or a 'Decoder_Configuration_information' field) has been described above with reference to FIG. 4.

A 'packet_length' field indicates in bytes the length of the payload of a packet following the 'packet_length' field.

A 'PTS_flag' field indicates whether PTS information is present in the header of the encapsulation packet. In an exemplary embodiment, a 'PTS' field contains PTS information.

A 'DTS_flag' field indicates whether DTS information is present in the header of the encapsulation packet. In an exemplary embodiment, a 'DTS' field contains DTS information.

A 'padding_flag' field indicates whether padding bytes are present in the header of the encapsulation packet.

A 'scrambling_control' field signals a scrambling mode of the payload of the encapsulation packet payload.

The 'PTS' field is a 33-bit field indicating a presentation time stamp (PTS) as defined in the ISO/IEC 13818-1.

The 'DTS' field is a 33-bit field indicating a decoding time stamp (DTS) as defined in the ISO/IEC 13818-1.

A 'padding_length' field indicates in bytes the length of padding data in the packet. In an exemplary embodiment, a 'padding_byte' field contains padding data. The 'padding_byte' field has an eight-bit value equal to '0xFF' and can be inserted by an encoder. This field is discarded by a decoder.

A 'data_byte' field may consist of eight bits.

FIG. 51 illustrates the syntax of an encapsulation packet for real-time data according to another exemplary embodiment of the present invention. The fields in the encapsulation packet illustrated in FIG. 51 are the same as those in FIG. 50.

Figure 52A:
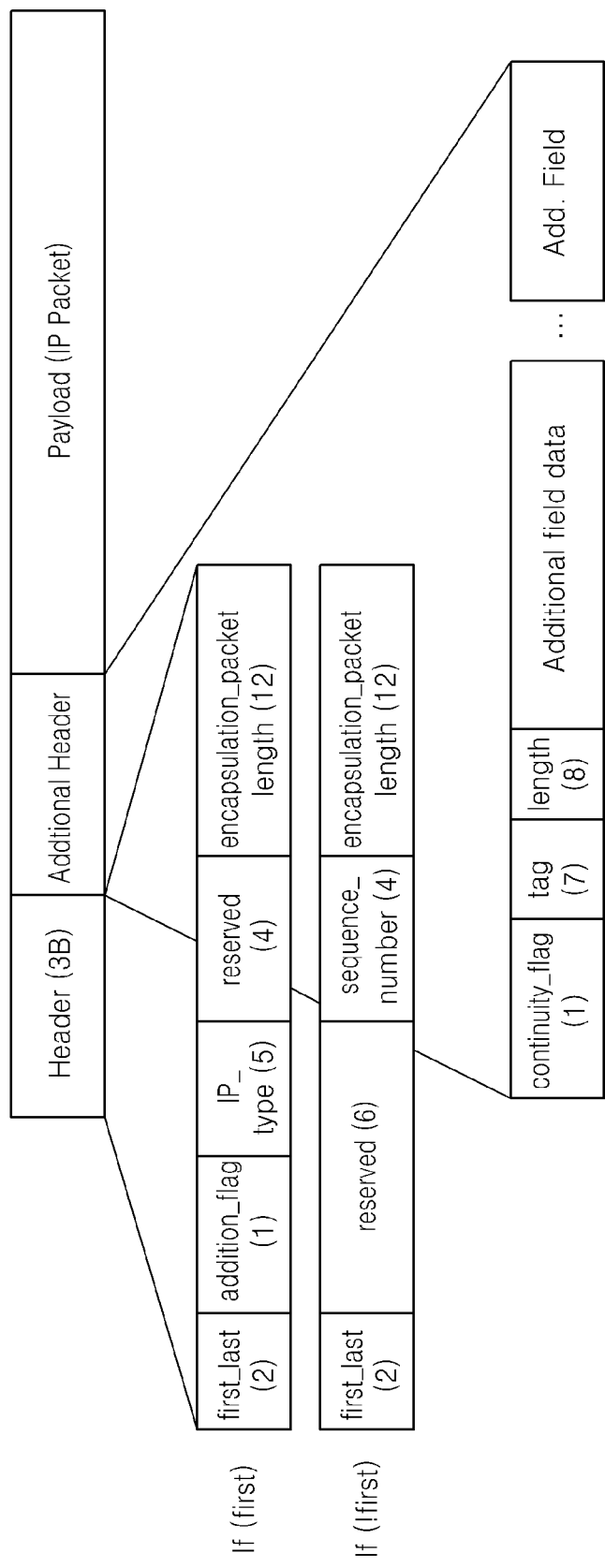

FIGS. 52A and 52B illustrate the syntax of an encapsulation packet for IP data according to an exemplary embodiment of the present invention.

The packet illustrated in FIG. 52 is used to transmit an IP datagram. The IP datagram may be divided into a plurality of encapsulation packets and then transmitted. There is a need to represent whether a current packet is a last packet, and a 'first_last' field which will later be described may be used in this case. Alternatively, if the value of a 'first_last' field is set to be '0x01' or '0x03', a current IP encapsulation packet may be determined to be a last one.

If a target encapsulation packet is a first one, a header field contains information indicating whether this encapsulation packet is a first or last packet, information indicating whether additional information exists, information regarding the format of IP data included in a payload region, and information regarding the length of the encapsulation packet.

If the target encapsulation packet is not a first packet, the header field includes information indicating whether this encapsulation packet is a first or last packet, sequence number information, and information regarding the length of the encapsulation packet.

An additional header field contains information indicating whether subsequent additional information exists, information regarding the type of additional information, information regarding the length of the additional information, and the additional information.

A 'first_last' field is a two-bit field indicating whether a current packet is a first or last one. This field may be defined according to the value thereof, as illustrated in Table 5.

An 'addition_flag' field is a one-bit field indicating whether additional information is present. In an exemplary embodiment, an 'additional_data' field contains additional information. If the value of this field is '1' it may be understood that the 'additional_data' field exists.

An 'IP_type' field is a five-bit field indicating the type of data transmitted via an IP payload. For example, this field may be used to distinguish between IPv4 and IPv6.

A 'sequence_number' field consists of four bits and increments by 1 within the same data type of encapsulation packet. The value of this field wraps around to '0' if it reaches a maximum value. This field is used as an IP fragmentation identifier during retransmission.

An 'encapsulation_packet_length' field consists of 12 bits and indicates the length of the payload in bytes.

A 'continuity_flag' field consists of one bit and indicates whether '{tag, length, additional_data}' fields will follow. If the value of this field is '0', it may be understood that a current field is a last field containing additional information.

A 'tag' field is a seven-bit field indicating the type of an 'additional_data' field. This field acts as a container that can contain various type of information to be additionally needed for transmission of IP data. The type of the information that is to be additionally needed is not limited.

A 'length' field indicates the length of the 'additional_data' field in bytes.

The length of the 'additional_data' field can be variously determined. The 'additional_data' includes information according to the 'tag' field.

A 'payload' field can be variously determined and includes IP packet data as defined in the 'IP_type' field.

Figure 53:
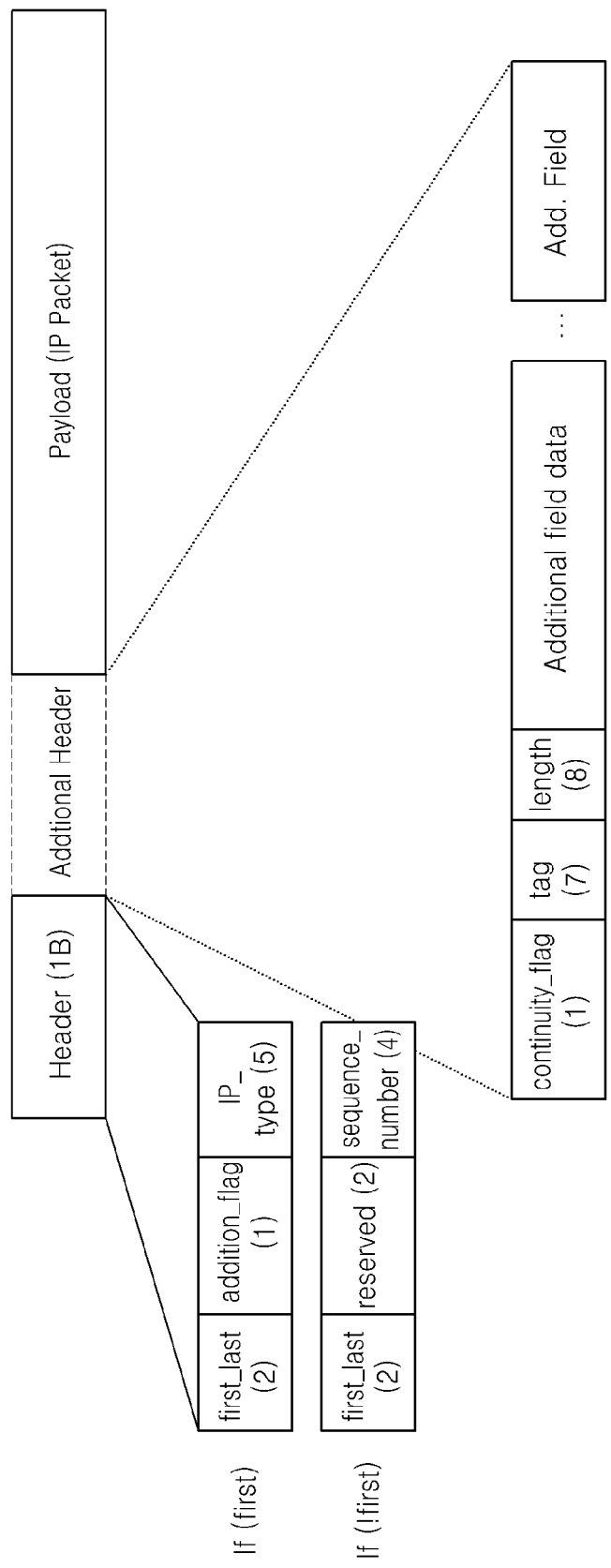
FIG. 53 illustrates the syntax of an encapsulation packet for IP data according to another exemplary embodiment of the present invention.

FIG. 53 illustrates the syntax of an encapsulation packet for real-time data according to another exemplary embodiment of the present invention.

The packet illustrated in FIG. 53 is similar to that in FIG. 52 except that a header is changed.

Figure 54A:
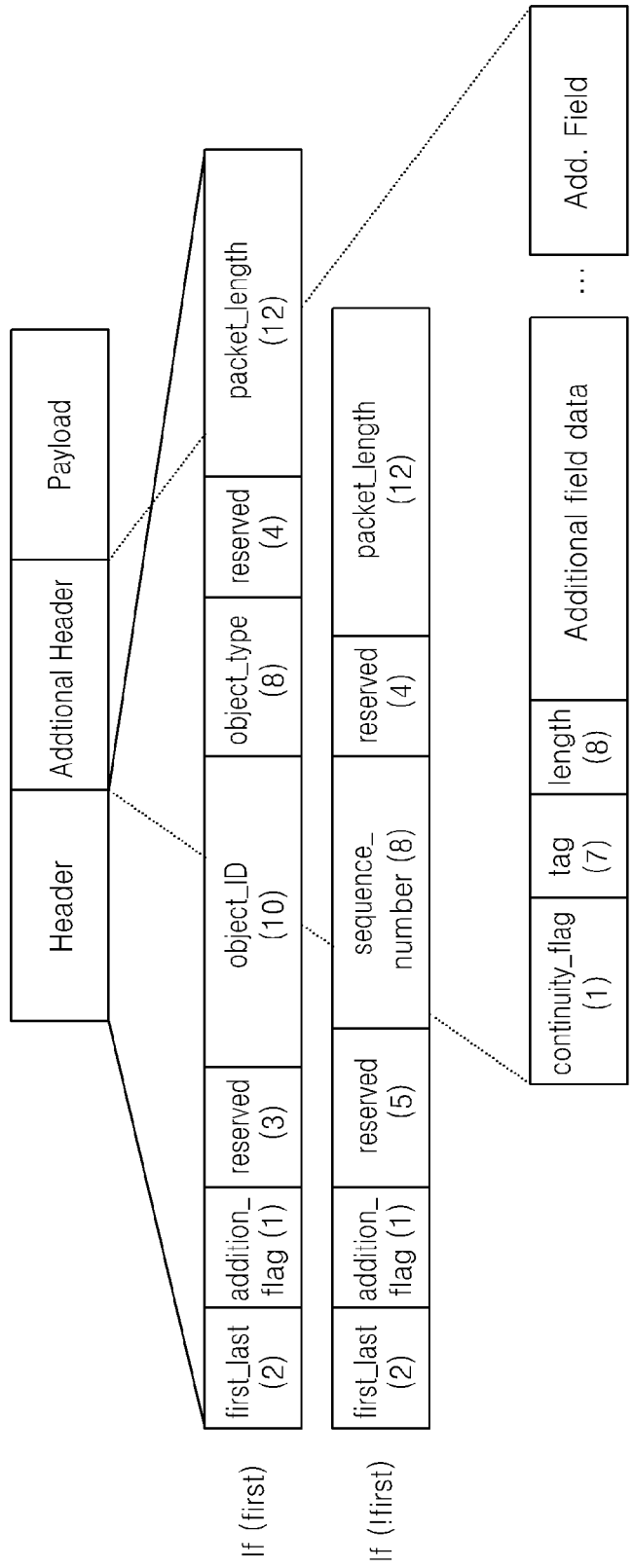

FIGS. 54A and 54B illustrate the structure of a packet for object data according to an exemplary embodiment of the present invention.

The packet illustrated in FIG. 54A is an encapsulation packet for transmitting object data type. The packet includes a plurality of transport packets via which object data type is transmitted. The packet is divided into a header, additional information, and a payload. An additional header field contains additional information regarding the payload.

Object data is transported via an object sub data channel according to two methods which will be described in detail later with reference to FIG. 56.

If an encapsulation packet is a first packet, a header field contains information indicating whether this packet is a first or last one, information indicating whether additional information exists, identification information of the object data that is delivered via a payload field, information regarding the type of the object data, and information regarding the length of the packet.

If an encapsulation packet is not a first packet, the header field contains information indicating whether this packet is a first or last one, information indicating whether additional information exists, sequence number information, and information regarding the length of the packet.

The additional header field contains information indicating whether subsequent additional information is present, information regarding the type of the additional information, information regarding the length of the additional information, and the additional information.

A 'first_last' field indicates whether a current packet is a first or last encapsulation packet. This field may be defined according to the value thereof, as illustrated in Table 5.

An 'addition_flag' field indicates whether additional information is present in the header of the encapsulation packet. In an exemplary embodiment, an 'additional_field' field contains the additional information.

An Object_ID' field is used to identify all objects delivered via the same sub data channel.

An 'object_type' field specifies the type of object data, e.g., jpeg (compressed or not), text (compressed or not), or mp3.

A 'sequence_number' field indicates fragmentation information.

A 'packet_length' field indicates the length of subsequent data.

A 'continuity_flag' field specifies whether an 'additional_field' will follow. If the value of this flag is set to '1', it means that the 'additional_field' field will follow, and if the value of this field is set to be '0', it means that a current 'additional_field' field is last one.

A 'tag' field indicates the type of object decoder specific information. This field shows subdivision of the type of the object data specified in the 'object_type' field. For example, if the 'object_type' field indicates text (compressed), data type may be sub divided according to a compression method. In this case, data type may be expressed as 'GZIP compressed text' via the 'tag' field.

A 'length' field expresses the length of the 'additional_field_data' field in bytes.

An 'additional_field_data' field contains the object decoder specific information.

A 'payload' field contains the object data.

FIGS. 55A and 55B illustrate the structure of a packet for object data according to another exemplary embodiment of the present invention.

A 'First_last' field is a two-bit field indicating whether a packet is a first or last encapsulation packet. The definition of this field according to a value thereof is as illustrated in Table 5.

An 'object_delivery_mode' field indicates a source block mode. If the value of this field is '0', a source block number may not be used, and if the value of this field is '3', it is reversed for future.

An 'object_extention_id' field is used as an additional identifier of a plurality of objects when the objects are transmitted within the same sub data channel.

A 'source_block_number_8' field consists of eight bits and indicates the number of a source block number. The value of this field represents the number of a source block to which a current OEP belongs.

A 'source_block_number_16' field consists of 16 bits and indicates the number of a source block. The value of this field represents the number of a source block to which a current OEP belongs.

A 'version' field indicates the version number of object data. The version number is increased by one whenever the object data is changed. A change in an object means that the object is updated. For example, when a name is added to a map file, an object that is the map file is changed.

A 'fragment_number' indicates fragmentation information of a field source block or an object when the length of the source block or the object exceeds a maximum length of packet.

A 'packet_length' field indicates packet length in bytes.

Figure 56:
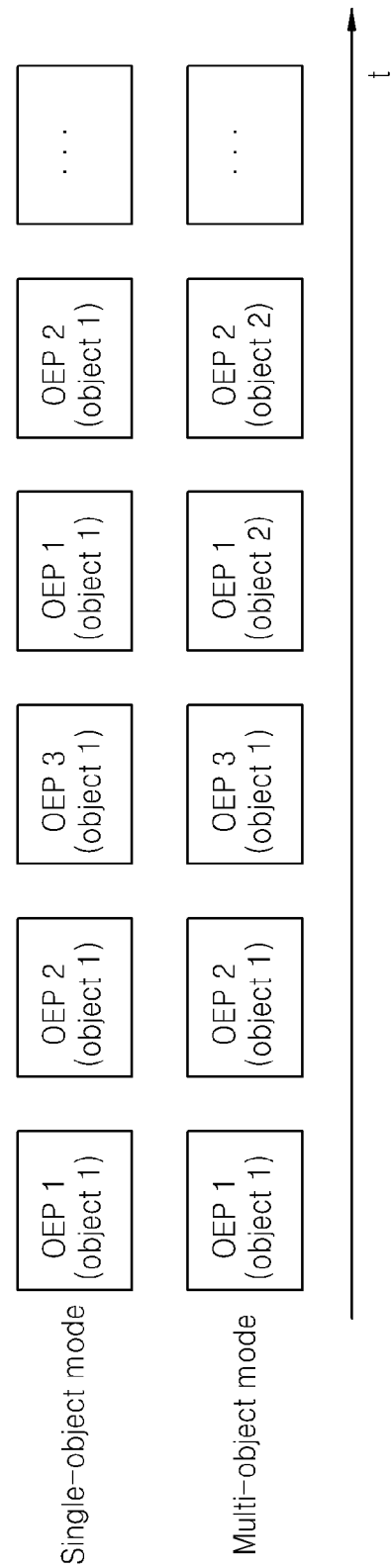
FIG. 56 illustrates a method of transmitting object data according to an exemplary embodiment of the present invention.

FIG. 56 illustrates a method of transmitting object data according to an exemplary embodiment of the present invention.

One or more pieces of object data are delivered at a time via one sub data channel. A case where one piece of object data is delivered via a sub data channel is referred to as a single object mode, and a case where a plurality of pieces of object data are delivered via a sub data channel is referred to as a multi object mode.

In the multi object mode, identifiers must be respectively allocated to a series of object data in the sub data channel. Alternatively, a plurality of pieces of object data transmitted via the same sub data channel can be identified using object ID. Otherwise, when a packet contains an 'additional_field' field for transmitting additional information such as characteristic information of object data, a series of objects in the same sub data channel can be identified by inserting an 'object_extension_id' field into an 'additional_field' field.

Figure 57:
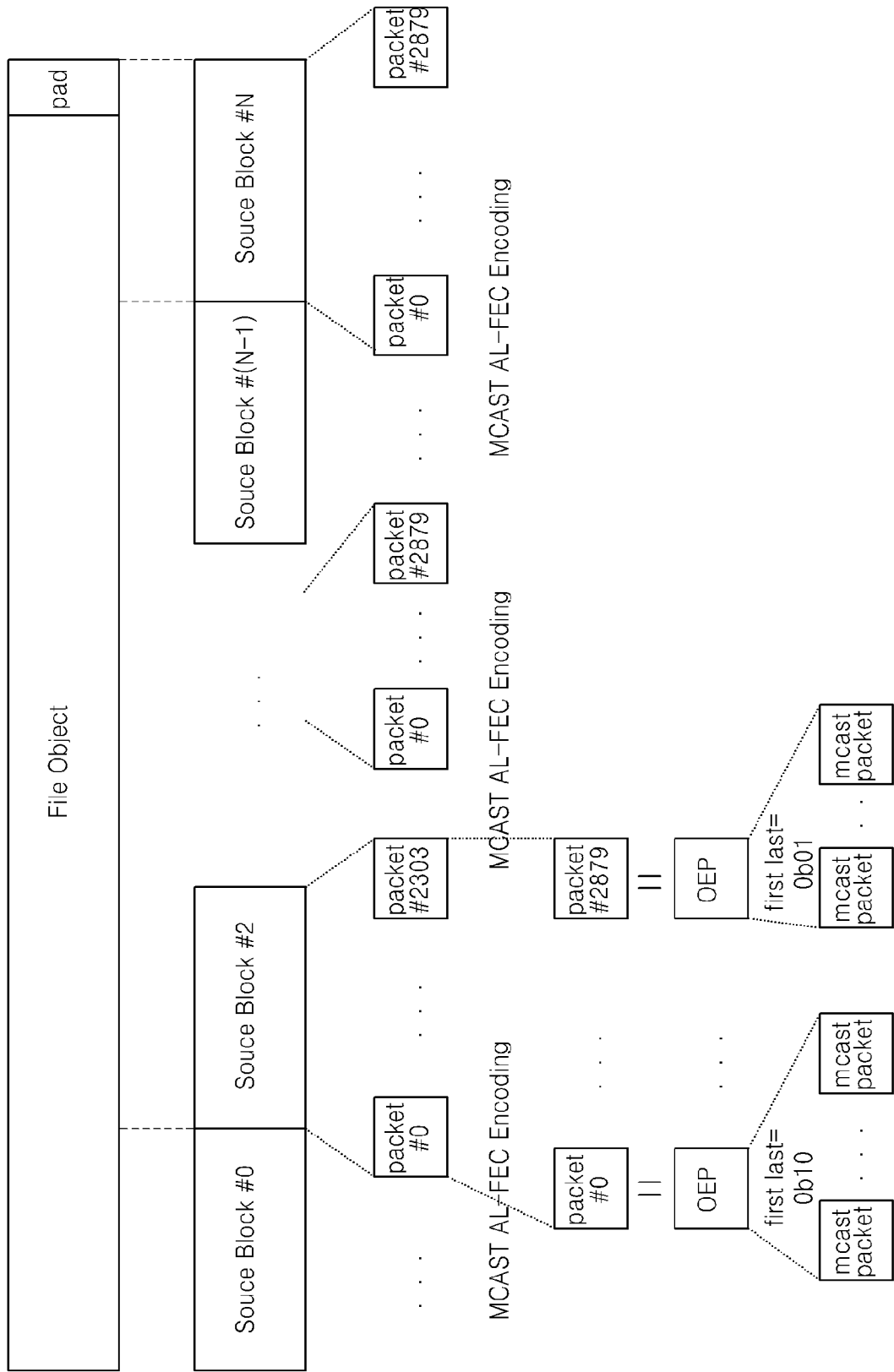
FIG. 57 illustrates application of application layer forward error correction (AL-FEC) according to an exemplary embodiment of the present invention.

FIG. 57 illustrates application of AL-FEC according to an exemplary embodiment of the present invention.

An OEP packet contains a header and a payload and consists of a plurality of transport packets. An SEP provides usage information of AL-FEC and specific parameters. A method of arranging an AL-FEC layer and objects will now be described with reference to FIG. 57.

When MCAST AL-FEC is applied, objects are fragmented into a plurality of source blocks. Each of the source blocks consists of packets having a predetermined length. The length and numbers of packets are determined by an MCAST AL-FEC encoding mode. After MCAST AL_FEC encoding is performed, a redundant packet is added. Error correction may be performed within the range of the redundant packet.

An MCAST transport packet will be hereinafter described.

Figure 58A:
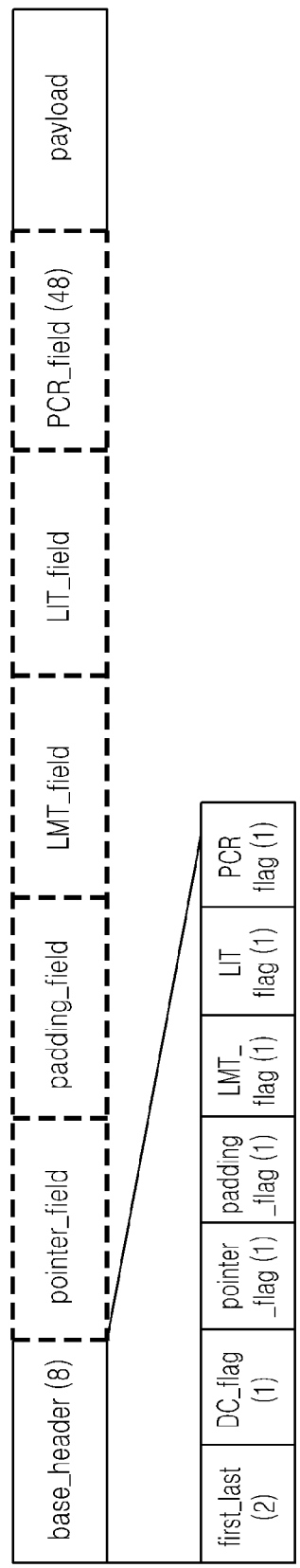
FIGS. 58A, 58B, 58C and 58D illustrate header structures of a transport packet and a transport packet according to exemplary embodiments of the present invention.
Figure 58B:
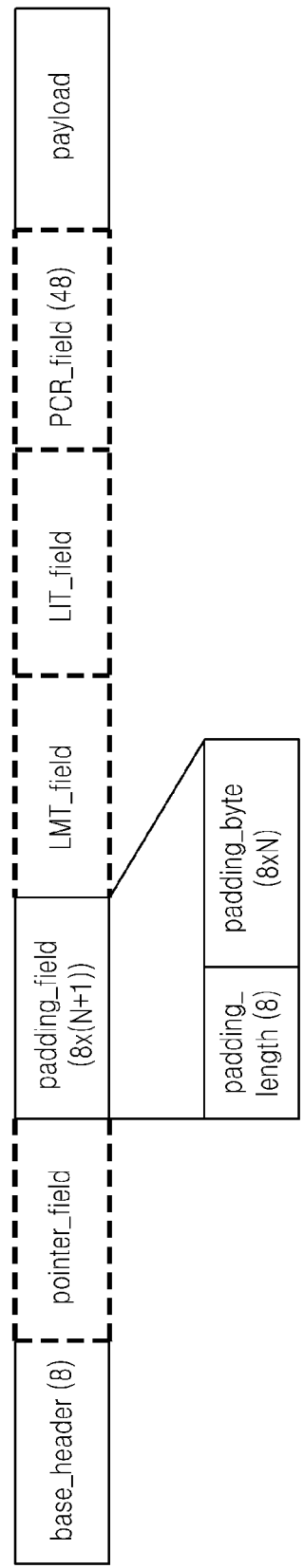

FIGS. 58A and 58B illustrate a transport packet and a header structure of the transport packet according to exemplary embodiments of the present invention. Referring to FIG. 58A, a transport packet according to an exemplary embodiment of the present invention includes a base header field, a PCR information field, a pointer field, a padding field, a LMT field, a LIT field, and a payload field.

The base header field contains information indicating whether a transport packet is a first or last encapsulation packet, information indicating whether a PCR is present, information indicating whether DCI is present in a header field of the encapsulation packet, information indicating whether a padding region exists, information indicating whether a LMT exists, and information indicating whether a LIT exists. These fields will be described in detail later with reference to FIG. 59.

FIG. 58B illustrates the structure of a padding field of a transport packet according to an exemplary embodiment of the present invention.

The padding field of the transport packet according to an exemplary embodiment of the present invention may include padding length information and padding bytes.

An LMT field and an LIT field in the transport packet are as described above with reference to FIGS. 34 through 41.

Figure 58C:
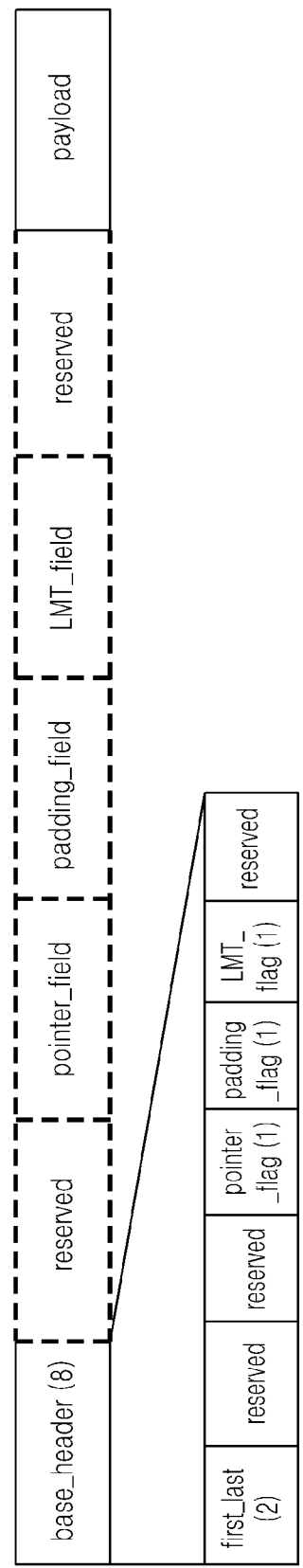
Figure 58D:
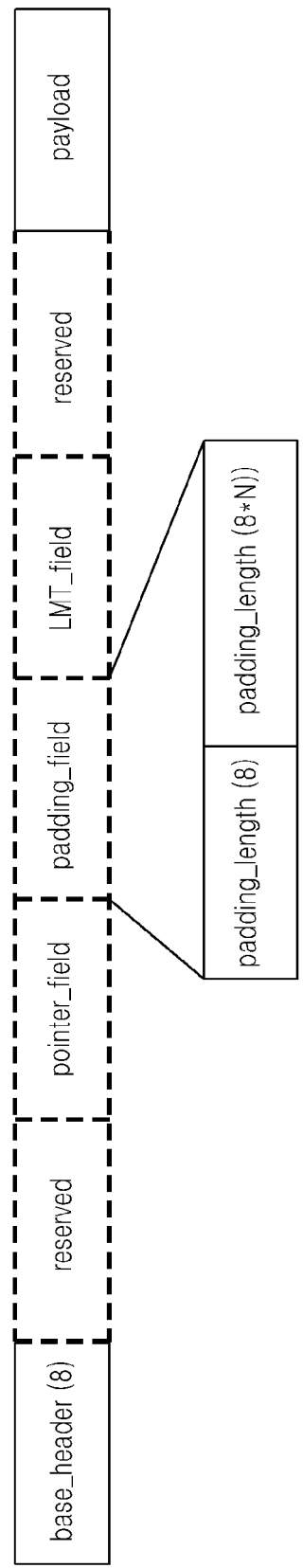

FIGS. 58C and 58D illustrate a transport packet and a header structure of the transport packet according to another exemplary embodiment of the present invention.

The packet illustrated in FIGS. 58C and 58D can be used when only one type of data is transmitted, e.g., when only IP data is transmitted via a MAST system.

FIGS. 59A-1 and 59A-2 illustrates the syntax of a transport packet according to an exemplary embodiment of the present invention.

A 'first_last' field indicates whether a transport packet is a first or last encapsulation packet. The definition of this field according to the value thereof is as shown in Table 5.

A 'DC-flag' field indicates whether DCI is present in the header of an encapsulation packet. In an exemplary embodiment, a 'decoder_configuration information' field includes the DCI.

A 'pointer_flag' field indicates whether a 'point_field' field exists in the header of a transport packet.

A 'padding_flag' field indicates whether a 'padding' field exists in the header of the transport packet. An 'LMT_flag' field indicates whether an 'LMT_field' field exists in the header of the transport packet.

An 'LIT_flag' field indicates whether an 'LIT_field' field exists in the header of the transport packet.

A 'PCR_flag' field indicates whether the transport packet includes a 'PCR_field' field. If the value of this field is '1' it may be understood that the transport packet includes the 'PCR_field' field.

A 'pointer_field' indicates the starting position of a second payload when two encapsulation packets are present in one transport packet.

A 'padding_length' field indicates in bytes padding size within a packet.

A 'padding_byte' field has a eight-bit value that is equal to '0xFF' that is inserted by an encoder. The 'padding_byte' field is discarded by a decoder.

From a 'type_bitmap' field to an 'object_channel_pointer' field, a similar structure as the LMT illustrated in FIG. 34 is found, and thus will be described briefly.

The 'type_bitmap' field indicates the type of data delivered via a transport packet. Each bit of this field has a unique meaning. A first bit of this field means that a real-time data channel exists, a second bit of this field means that an IP data channel exists, and a third bit of this field means that an object data channel exists.

A 'version_number' field indicates the version number of a LMT. The version number is increased by 1 modulo 16 whenever LMT data is changed.

A 'real_time_channel_number' field indicates the number of sub data channels in a real-time media type channel.

An 'IP_channel_number' field indicates the number of sub data channels in an IP type channel.

An 'object_channel_number' field indicates the number of sub data channels in an object type channel.

A 'real_time_channel_pointer' field indicates the location of a sub data channel of real-time data type in a data channel.

An 'IP_channel_pointer' field indicates the location of a sub data channel of IP data type in the data channel.

An 'object_channel_pointer' field indicates the location of a sub data channel of object data type in the data channel.

From a 'service_number' field to an 'LMT_index_number' field, a similar structure as the LIT illustrated in FIG. 40 is found, and thus will be briefly described here.

A 'service_number' field indicates the number of services that can be used within a data channel.

A 'version_number' field indicates the version number of a LIT field. The version number is increased by one whenever signaling data is changed.

A 'service_ID' field identifies a service in a turbo channel. ID has a unique value in the turbo channel.

A 'next_indicator' field indicates the presence of a subsequent 'next_indicator' field and a subsequent 'LMT_index_number' field. For example, when the value of this field is '0', it means that no more 'next_indicator' and 'LMT_index_number' fields exist.

The 'LMT_index_number' field indicates the location of a sub data channel in an LMT.

An 'index_number' field indicates the sequence number of an elementary channel associated with a service.

A 'Program_clock_reference_base7'Program_clock_reference_extension' field includes a 42-bit PCR being divided into two parts and then coded. The first part is a 33-bit field whose value is a base given from the same equation which is defined in section 2-1 on page 14 in MPEG-2 13818-1 spec. The second part is a nine bit field whose value is given from the same equation which is defined in section 2-2 on page 14 in MPEPG-2 13818-1 spec.

A 'data_byte' field consists of eight bits and includes encapsulation packet data.

FIG. 59B illustrates the structure of a transport packet according to another exemplary embodiment of the present invention.

The fields in the transport packet illustrated in FIG. 59B are similar to those in the transport packet illustrated in FIG. 59A.

FIG. 59C illustrates the structure of a transport packet according to another exemplary embodiment of the present invention. The structure of the transport packet illustrated in FIG. 59C is similar to that of the transport packet in FIG. 19A except for an 'Error_flag' field.

The 'Error_flag' field indicates whether an error exists in a current packet. If the value of this field is '1' an error exists in this packet when the packet is depacketized.

FIG. 59D illustrates the structure of a transport packet according to another exemplary embodiment of the present invention.

The fields in the transport packet illustrated in FIG. 59D are the same as those in the transport packet illustrated in FIG. 59A.

Figure 60A:
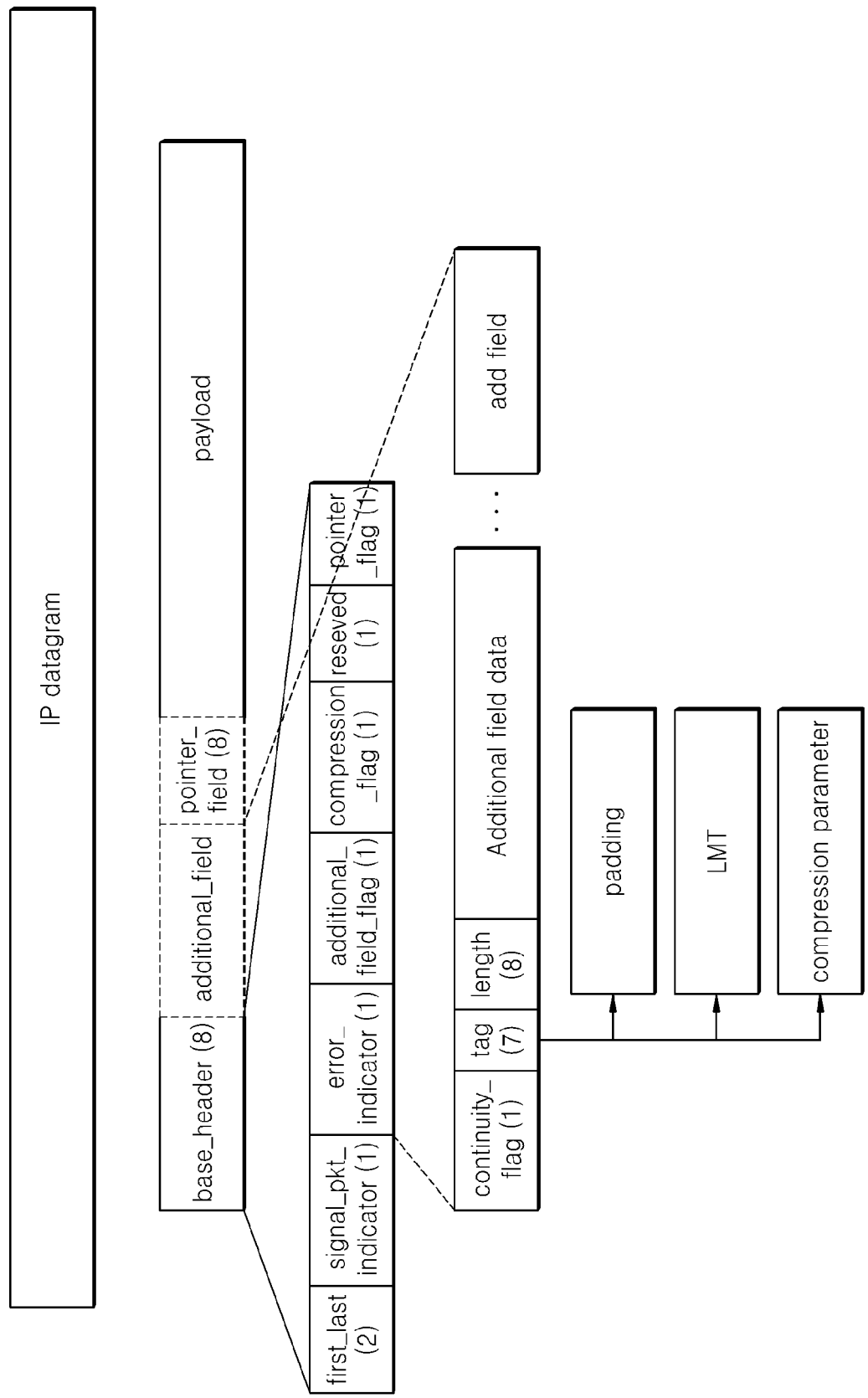

FIGS. 60A and 60B illustrate the structures of a transport packet, a base header and an additional field according to another embodiment of the present invention.

The transport packet illustrated in FIG. 60A includes a plurality of header fields and a payload field. Each of the header fields includes base header information, information indicating whether a pointer exists, LMT information, additional information, and a payload. An IP datagram and signaling packets are delivered via the payload field.

In detail, FIG. 60A illustrates the syntax of a transport packet according to another exemplary embodiment of the present invention.

A 'first_last' field is a 2-bit field specifying if a packet is the first or last encapsulation packet, as defined in Table 5.

A 'signal_pkt_indicator' field indicates whether payload data is signaling data. If the value of this field is '1', it may be understood that data delivered via a 'payload' field is signaling data.

An 'error_indicator' field indicates whether a packet includes an error.

An 'additional_flag' field is a one-bit field indicating whether additional information exists. In an exemplary embodiment, an 'additional_field' field contains additional information. If the value of this field is '1', it may be understood that the 'additional_field' field exists.

A 'compression_flag' field indicates whether the IP datagram is compressed. If the value of this field is '1', it means that an IP datagram delivered via the 'payload' field is compressed.

A 'pointer_flag' field indicates whether another IP datagram or signaling data exists. If the value of this field is '1', it may be understood that another IP datagram or signaling data exists.

A 'continuity_flag' field is a one-bit field indicating whether a '<tag><length><additional field data>' field exists. That is, if the '<tag><length><additional field data>' field is referred to as the 'Add.Field' field, it may be understood that the 'Add.Field' field exists when the value of the 'continuity_flag' field is '1' and the 'Add.Field' field does not exist when the value of the 'continuity_flag' field is '0'.

A 'tag' field defines the data type of additional information, as follows:

TABLE 16

| Tag | Description |
| --- | --- |
| 0 | padding_field |
| 1 | LMT_field |
| 2 | compression parameter_field |
| 3-127 | Reserved |

A 'length' field indicates the length of subsequent additional information. In an exemplary embodiment, an 'additional_field' field contains additional information, and thus, the 'length' field indicates the length of the 'additional_field' field.

The 'addition_field' field contains the additional information.

A 'pointer_field' field is an eight-bit field indicating an offset from the beginning of the transport packet to the first byte of a second encapsulation packet in the transport packet when the transport packet includes two or more encapsulation packets.

A 'data_byte' field contains an IP datagram or signaling data. The data may be fragmented.

Figure 61A:
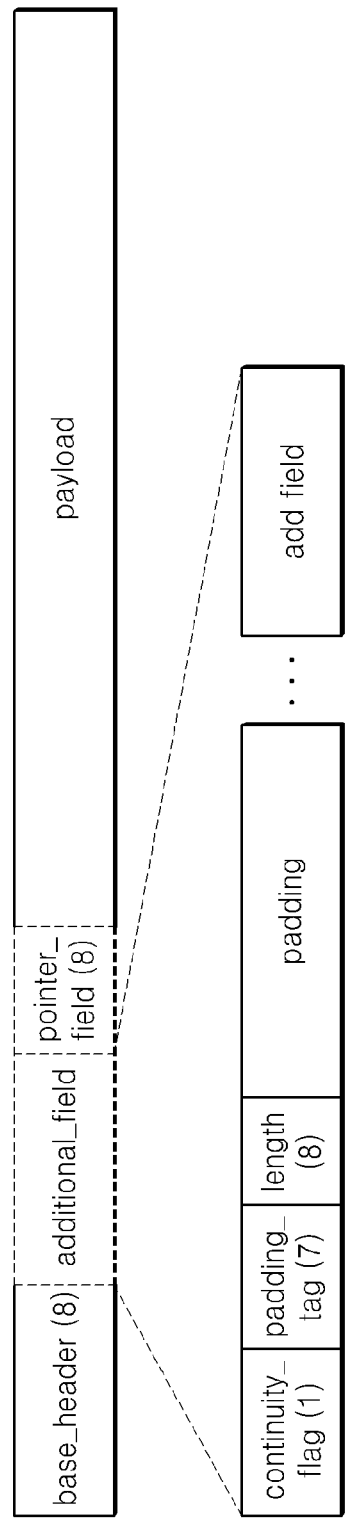

FIGS. 61A and 61B illustrate the structure of a 'padding_field' field when the value of the 'tag' field illustrated in FIG. 60 is '0' according to an exemplary embodiment of the present invention.

The 'tag' field indicates that a padding field will follow.

A 'length' field is an eight-bit field indicating the length of the padding field. In an exemplary embodiment, a 'padding_byte' field contains padding data, and thus, the 'length' field indicates the length of the 'padding_byte' field.

The 'padding_byte' field has an eight-bit value that is equal to '0xFF' and can be inserted by an encoder. This field is discarded by a decoder.

FIG. 62 illustrates the structure of a 'LMT_field' field when the value of the 'tag' field illustrated in FIG. 60 is '1' according to an exemplary embodiment of the present invention.

A 'tag' field indicates that LMT information will follow. In an exemplary embodiment, a 'LMT_information' field contains LMT information.

A 'length' field is an eight-bit field indicates in byes the length of a 'LMT_information' field.

The 'LMT_information' field contains position information of all IP data within an IP sub data channel and position information of all signaling data within a signaling sub data channel. This field has been described above with reference to FIGS. 34 to 39.

FIG. 63 illustrates the structure of a 'compression_field_parameter' field when the value of the 'tag' field illustrated in FIG. 60 is '2' according to an exemplary embodiment of the present invention.

A 'tag' field indicates whether information regarding compression parameters will follow. In an exemplary embodiment, a 'compression_parameter' field contains information regarding compression parameters.

A 'length' field is an eight-bit field specifying in bytes the length of a 'compression_type' field and the 'compression_parameter' field.

The 'compression_type' field indicates compression type. Additional information regarding compression type may be carried by an 'additional_field' field. An example of compression type according to the value of the 'compression_type' field is as follows:

TABLE 17

| 'compression_parameter' | Description |
|---|---|
| 0 | No compression |
| 1 | ROHC |
| 2-255 | Reserved |

The 'compression_parameter' field contains parameters related to compression of payload data. The parameters vary according to compression type.

Figure 64A:
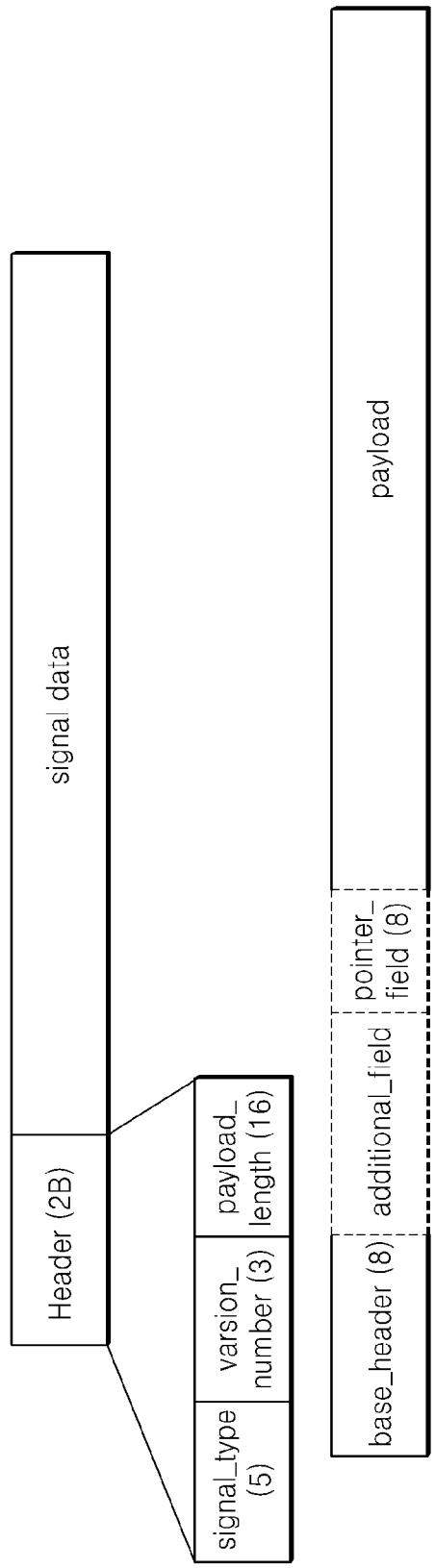

FIGS. 64A and 64B illustrate the structure of a signaling packet according to an exemplary embodiment of the present invention. Signaling data is carried via a payload of an MCAST transport packet.

The signaling data contains additional information regarding an IP datagram. IMT information carried via a signaling packet includes linkage information between IP streams and IP sub data channels.

A 'signal_type' field indicates the type of data delivered by the payload, as follows:

TABLE 18

| Value | Description |
|---|---|
| 0 | Forbidden |
| 1 | IP_mapping_table |
| 2-31 | Reserved |

A 'version_number' field is a three-bit field indicating the version number of a signaling packet. The version number is incremented by one whenever signaling data transmitted via the payload is changed.

A 'payload_length' field is a 16-bit field indicating the length of following signaling data.

A 'data_byte' field contains signaling data according to a 'signal_type' field. A method of supporting OMA-BCAST through MCAST, and the relationship between OMA-BCAST and MCAST according to an exemplary embodiment of the present invention will now be described.

An ATSC_M/H terminal supports not only IPv6 but also IPv4 for general encapsulation and network packet transmission. An ATSC-M/H system can also use both IPv6 and IPv4. Internet protocol allows a bearer layer and a management layer to be abstractly and logically distinguished from each other. IP datagrams are encapsulated into an MCAST transport packet. For MCAST transmission, mapping information between an IP datagram and a turbo channel is needed, and such IP address mapping signaling may be performed through the above IMT.

A linkage between an OMA BCAST service and MCAST will now be described. Most important factors of this linkage are signaling, discovery of an entry point of a service guide, and discovery of transmission sessions. To this end, IP streams and transport channels must be linked to one another and be signaled. For access to an OMA BCAST service, an entry point of service announcement information must be first secured. The service announcement information may be delivered via more than one turbo channel. In MCAST, the location information of a turbo channel of the entry point of the service is transmitted using an IMT transmitted via an SIC. Also, an IMT containing location information of IP streams included in turbo channels may be present at a predetermined location of each of the turbo channels. For convenience of explanation, mapping information transmitted via an SIC is referred to as 'i-IMT and mapping information in a turbo channel transmitting data is referred to as 'IMT.

In order to provide an OMA-BCAST service guide, a service guide announcement channel and a service guide delivery channel are included in turbo channels. In particular, one of the turbo channels can deliver large amount of information regarding service fragments for a service guide in all the turbo channels, such as an aggregated ESG. Also, this channel can provide a service announcement channel. The aggregated ESG channel provides location information of IP streams included in other turbo channels, thereby allowing access to the other turbo channels in order to obtain a specific IP stream.

Figure 65:
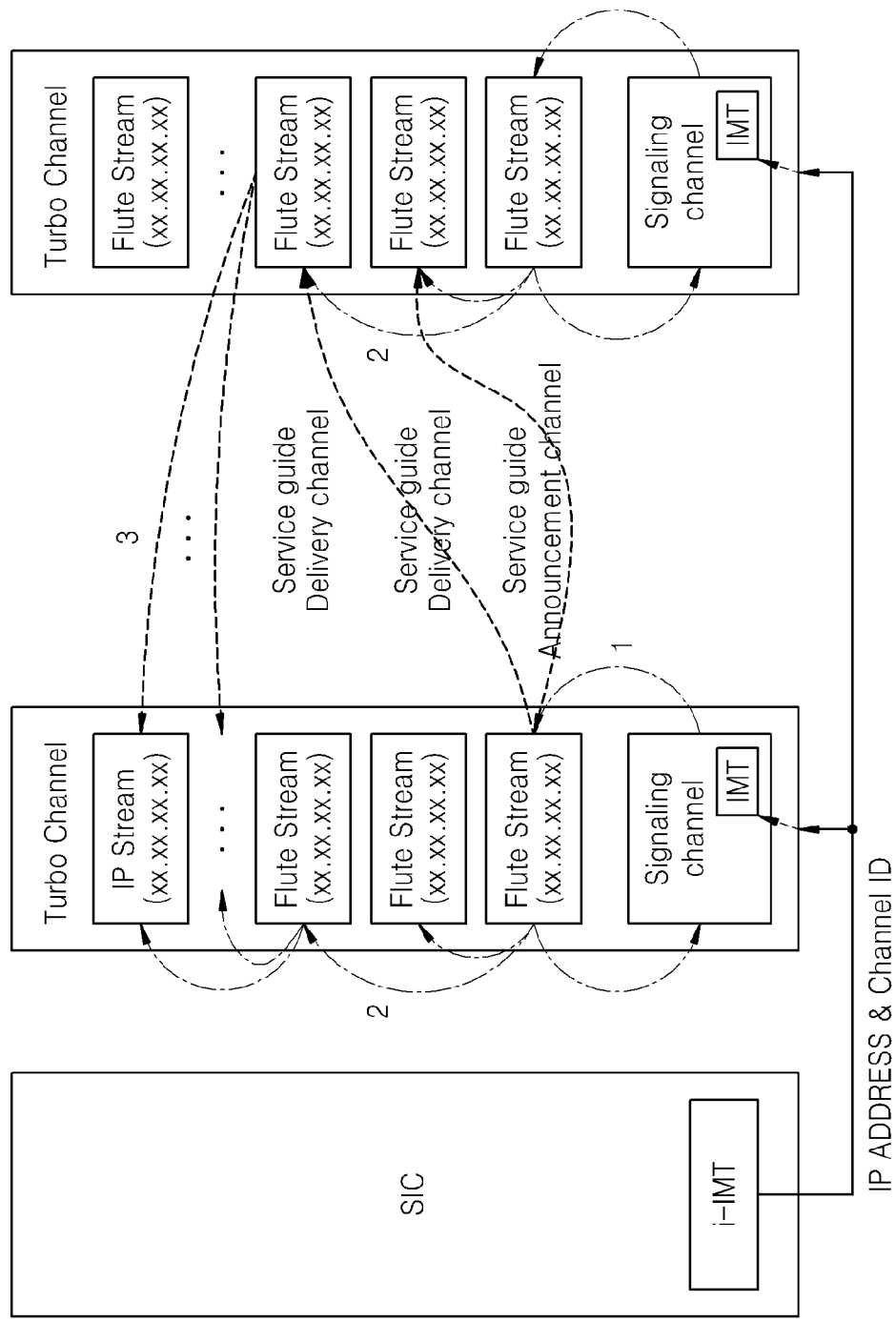
FIG. 65 illustrates a process of providing OMA BCAST service in an MCAST transmission system according to an exemplary embodiment of the present invention.

FIG. 65 illustrates a process of providing an OMA BCAST service by an MCAST transmission system according to an exemplary embodiment of the present invention.

Referring to FIG. 65, an SIC includes an i-IMT containing a list of all service entry points. The service entry points describe a particular service guide or aggregated service guide channel. The i-IMT contains location information of IP streams in turbo channels.

A broadcast receiving apparatus obtains the i-IMT from the SCI. The i-IMT includes location information of a channel including the particular service guide or aggregated service guide channel. The broadcast receiving apparatus accesses a turbo channel containing a desired service from among the turbo channels, based on the location information included in the i-IMT.

In each of the turbo channels, a signaling sub data channel transmitting signaling data is present, and an IMT may be present in the signaling sub data channel. The IMT may have location information of at least one of a service guide announcement channel included in a corresponding broadcast channel, a service guide delivery channel, and IP streams. The broadcast receiving apparatus obtains a service guide based on the location information included in the IMT. The broadcast receiving apparatus can access a particular service based on the information in the service guide. A method of allowing a user to receive a service will be described in detail later with reference to FIG. 66.

Figure 66:
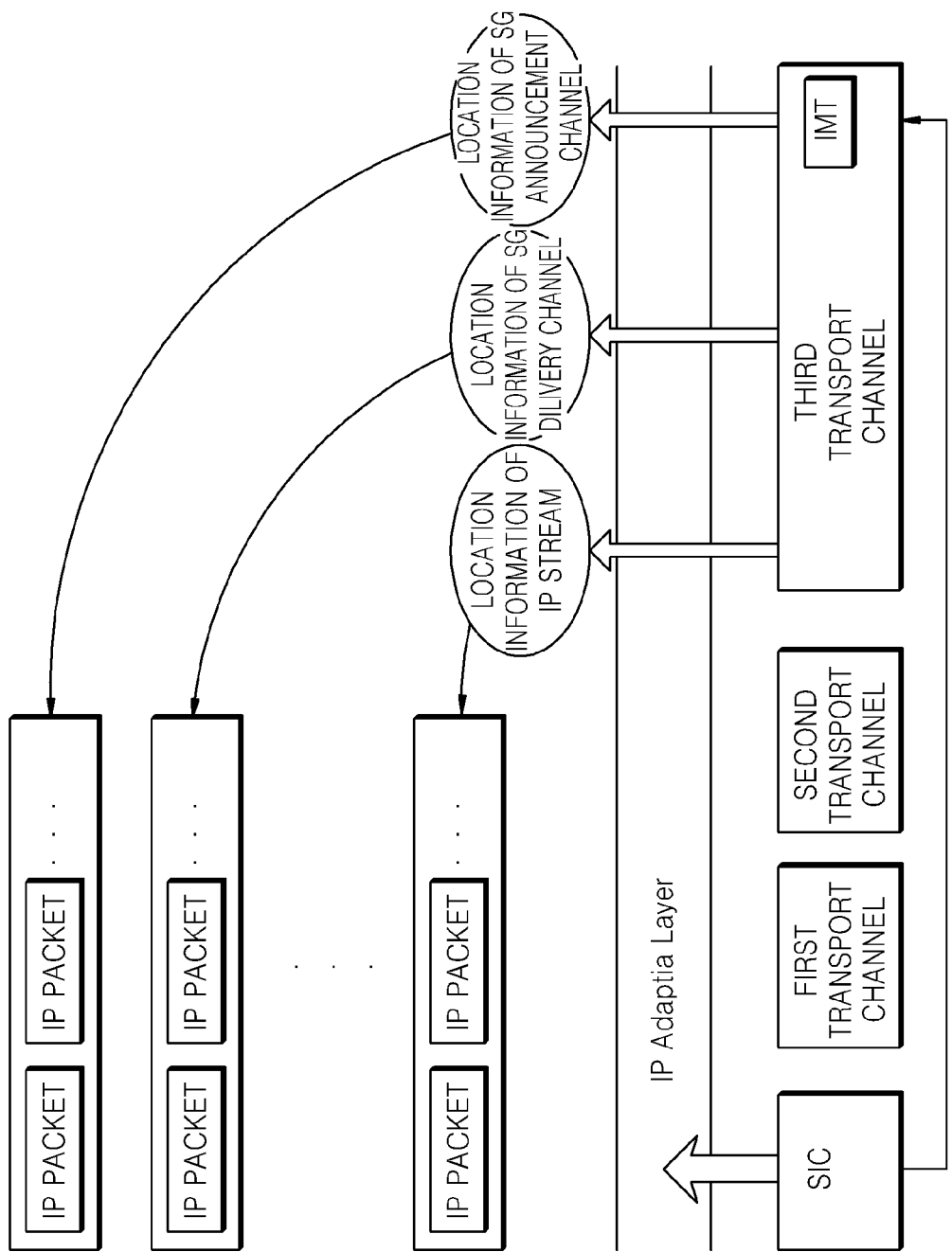
FIG. 66 illustrates a method of providing a service by using MCAST that supports OMA-BCAST according to an exemplary embodiment of the present invention.

FIG. 66 illustrates a method of providing a service by using MCAST supporting OMA-BCAST according to an exemplary embodiment of the present invention.

First, in order to support OMA BCAST, a service guide (SG) announcement channel and a SG delivery channel must be delivered via more than one channel. The broadcast receiving apparatus must sequentially access the SG announcement channel and the SG delivery channel. The SG delivery channel transmits fragments of a service guide, and the service guide provides meta data regarding broadcast services, e.g., arrangement of broadcast services. The SG announcement channel provides information for processing the SG delivery channel.

The broadcast receiving apparatus first accesses an SIC in order to check a turbo channel via which the SG announcement channel is delivered. An i-IMT contains the IP address of the SG announcement channel, or location information of the SG announcement channel or a channel including IP streams. For example, the i-IMT may contain mapping information between the IP address of the SG announcement channel and the number of a turbo channel.

The broadcast receiving apparatus may display information regarding the channel included in the i-IMT so that a user can select a specific channel or an announcement channel may be randomly selected as default without the user's input. If the user selects the specific channel, the selected channel is accessed using the IP address of the selected channel and the information included in the i-IMT. In this way, it is possible to additionally provide the user with a service guide or a service.

In a turbo channel, a signaling sub data channel transmitting signaling data is present. In a signaling sub data channel, an IMT containing location information of streams delivered via a current turbo channel is present. For example, mapping information between the IP addresses of IP streams delivered via a current turbo channel and a sub data channel may be included.

The broadcast receiving apparatus can obtain the location information of the SG announcement channel from the IMT. A sub data channel including the SG announcement channel is accessed using the IP address of the SG announcement channel obtained from the i-IMT and the IMT. The broadcast receiving apparatus obtains the location information of the SG delivery channel by processing the SG announcement channel. For example, the IP address of the SG delivery channel may be obtained by processing the SG announcement channel. Since mapping information between IP addresses and sub data channels is present in the previously obtained IMT, the broadcast receiving apparatus accesses the SG delivery channel by using the IP address of the SG delivery channel and the IMT, and obtains a service guide from the SG delivery channel.

The service guide is meta data regarding a broadcast service that is to be provided, such as an ESG and an EPG, as described above. The broadcast receiving apparatus may provide a user with the service guide so that the user can select a desired broadcast service, or provide a broadcast service designated as default. If the user selects a desired broadcast service, the selected broadcast service is provided using the service guide. For example, the service guide may include the IP addresses of IP streams providing services. Since the previously obtained IMT includes the mapping information between the IP addresses and the sub data channels, an IP stream is obtained using the IP addresses of the IP streams providing broadcast services, which are obtained from the service guide, and the IMT. The broadcast receiving apparatus provides the selected broadcast service by using the obtained IP stream.

An OMA BCAST service layer will now be briefly described.

A service guide allows services and contents, which are created by service/content providers via both a broadcast channel and an interactive channel or are provided through subscription or purchasing, to be described. Also, the service guide describes a method of accessing services. In terms of a terminal user, the service guide is an access point for discovery of services or contents that can be currently used or are to be used. Furthermore, the service guide provides a data entry point for a random, directional service.

The service guide has the following functions. First, service guide data modeling creates a service, a schedule, content, data provision related to purchasing, accessing, and interactive data in a service guide fragment form.

Second, service guide discovery enables discovery of an entry point of an initial boot strap and the service guide.

Third, service guide delivery is performed not only via an optional, interactive channel but also via a broadcast channel.

Lastly, service guide update, management and completeness ensure that the service guide is up-to-date and complete enough to be provided to a user for viewing.

An ATSC-M/H terminal may support the mandatory parts of OMA BCAST Service Guide for the Service Guide functionality. Further, the parts associated with interactive methods, delivery and use of Service Guide may be interpreted as optional in this specification, even when those are specified mandatory. Next, a transmission path and transmission according to data format will be described.

First, real-time A/V stream transmission through broadcasting will be described.

To realize real-time delivery of audio-visual broadcast services for ATSC-M/H the RTP/UDP as transport protocol may be used. The different audio and video formats encapsulate to RTP via specific RTP payload formats, each defined for a specific codec. The stream delivery aspects are augmented with optional use of reception reporting.

The ATSC-M/H terminal may support the mandatory parts of OMA BCAST File and Stream Distribution for real-time audio-visual stream delivery. Further, the terminal may support the associated delivery procedures of OMA BCAST File and Stream Distribution.

Next, transmission of an A/V stream requested via a bidirectional channel will be described.

The RTP/UDP transport protocol is used also for delivery of audio-visual streams over the interactive channel for on-demand services. As the interactive mode is optional, the ATSC-M/H terminal may support the interactive parts of OMA BCAST Stream Distribution as specified in the specification.

Next, non real-time content transmission via a broadcast channel will be described.

To this end, to realize delivery of non-real-time content over a broadcast channel, FLUTE/UDP is used as a transport protocol. The robustness of file delivery can be enhanced in two ways—by applying application layer FEC or by applying post delivery (error correction) procedures that operate over optional return channel.

The ATSC-M/H terminal may support the mandatory parts of OMA BCAST File and Stream Distribution, specification for non-real-time content delivery. Further, the terminal may support the associated delivery procedures of OMA BCAST File and Stream Distribution.

Next, non real-time content transmission via an interactive channel will be described.

As the interactive mode is optional, the ATSC-M/H terminal may support the interactive parts of OMA BCAST File Distribution as specified in the specification. Note that in this case only the mandatory parts of the specification may be supported.

Lastly, the ATSC-M/H terminal may support auxiliary data, advertisement, and notification as defined in the specifications.

Protection of a service and content through OMA BCAST will now be described.

Figure 67:
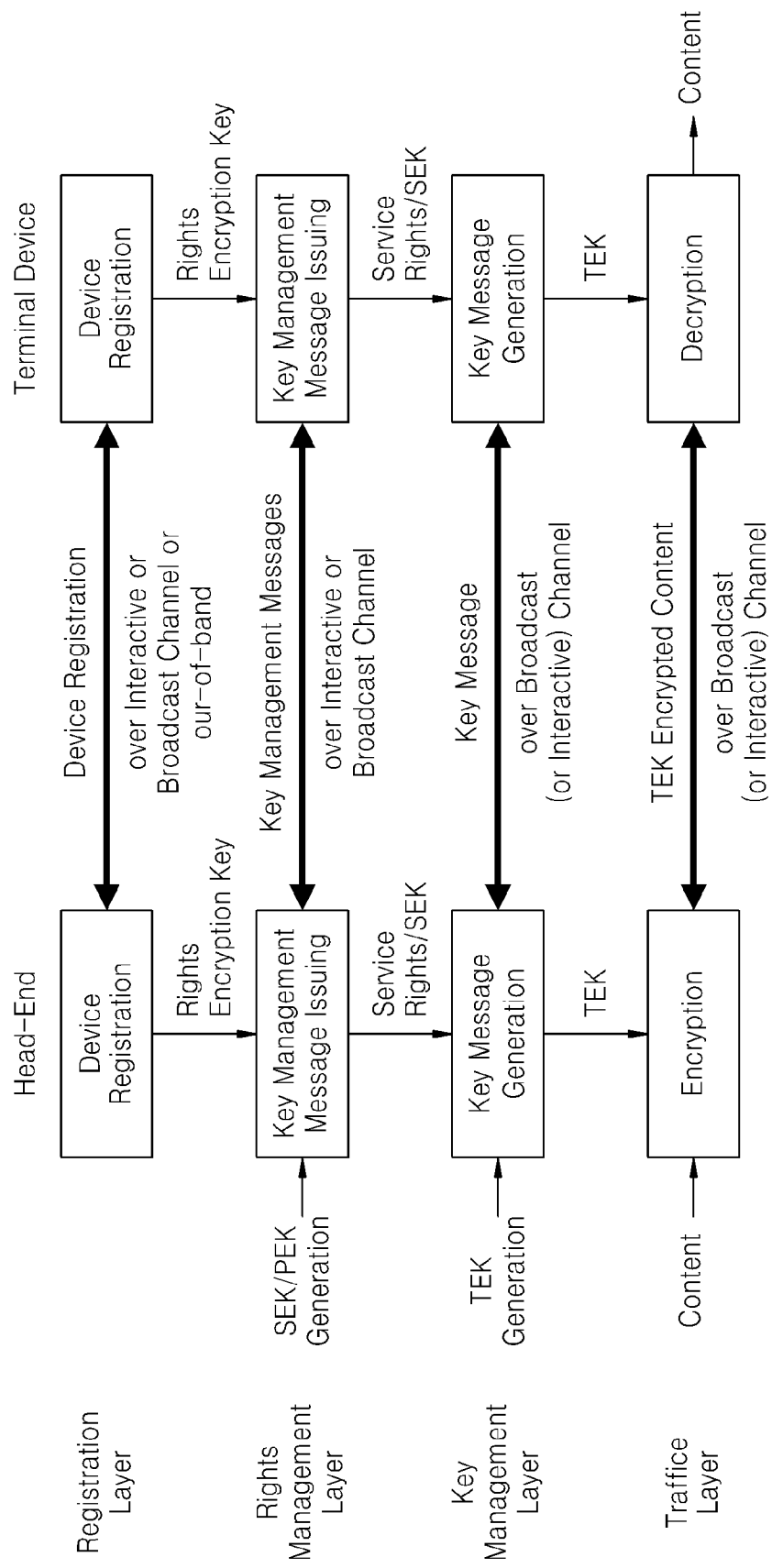
FIG. 67 illustrates four layers for protection of a service and content according to an exemplary embodiment of the present invention.

FIG. 67 schematically illustrates the structure of four layers for protection of a service and content according to an exemplary embodiment of the present invention.

For service protection, two key management systems (KMSs) are supported.

One of the two KMSs is terminal-based KMS (DRM profile) that is key management performed by a terminal. The other KMS is smartcard-based KMS (smartcard profile) performed by (U)SIM or (R)UIM/CSIM.

An ATSC-M/H terminal may support both the two KMSs but may not support any of them.

If the ATSC-M/H terminal supports terminal-based KMS, it may support the mandatory parts of DRM profile defined in the specifications.

If the ATSC-M/H terminal supports smartcard-based KMS, it may support the mandatory parts of smartcard profiled defined in the specifications.

Both the above two KMSs provide high-level security for mobile device service protection, and they may be simultaneously applied.

The four layers will now be described with reference to FIG. 59.

A traffic layer uses IPsec, SRTP or ISMACryp as a traffic cryptogram.

IPsec is an encapsulating security payload (ESP) and uses AES-128-cbc with explicit IV as an encryption algorithm in each IP packet. Authentication is optional and uses HMAC-SHA-1-96.

SRTP uses AES-128-CTR as an encryption algorithm. Authentication is optional and uses HMAN-SHA-1-80.

ISMACryp 1.1 with OMA BCAST specifies extensions for codec agnosticism. AES-BYTE-CTR is used an encryption algorithm. Authentication is optional and uses HMAC-SHA1.

A key management layer, a rights management layer and a registration layer for DRM profile using Microsoft PlayReady may be specified in the specifications.

A key management layer, a rights management layer and a registration layer for DRM profile using OMA DRM 2.0 may be specified in the specifications.

A key management layer, a rights management layer and a registration layer for smartcard profile may be specified in the specifications.

A terminal that supports interactivity may support either one of or both DRM profile and smartcard profile. For DRM profile, long-term key messages (LTKMs) delivery over an interactive channel may be supported and LTKM delivery over a broadcast channel may be supported.

A terminal that does not support interactivity may support DRM profile. LTKM delivery over a broadcast channel may be supported.

An ATSC-M/H terminal may support content protection. If the ATSC-M/H terminal supports content protection, it may support either one of or both Microsoft PlayReady and OMA DRM v2.0.

An MCAST system according to an exemplary embodiment of the present invention allows an optional support for an interactive channel. The support for interactive features is optional to the ATSC-M/H terminal. However, if the ATSC-M/H terminal supports interactive features, the terminal may support the OMA BCAST 1.0 specification for addresses interactivity. For these specifications, the mandatory parts are supported.

Representation layer aspects of ATSC-M/H according to an exemplary embodiment of the present invention will hereinafter be described.

In relation to video codec, an ATSC-M/H terminal may support the H.264/AVC video codec. Further, the ATSC-M/H terminal may support at least one of the following five capabilities:

decoding of bitstreams that conform to H.264/AVC Level 1b of the baseline profile with a 'constraint_set1_flag' field whose value is equal to '1';

decoding of bitstreams that conform to H.264/AVC Level 1.2 of the baseline profile with a 'constraint_set1_flag' field whose value is equal to '1';

decoding of bitstreams that conform to H.264/AVC Level 2 of the baseline profile with a 'constraint_set1_flag' field whose value is equal to '1';

decoding of bitstreams that conform to H.264/AVC Level 3 of the baseline profile with a 'constraint_set1_flag' field whose value is equal to '1'; and decoding of bitstreams conforming to H.264/AVC Level 4 of the baseline profile with a 'constraint_set1_flag' field whose value is equal to '1'.

The ATSC-M/H terminal may optionally support more than one of these capabilities, and a capability supporting decoding of levels and profiles that are higher than those required by that capability.

In relation to frame rate, the ATSC-M/H terminal may decode each of frame rates allowable by the H.264/AVC profile and level associated with the capability implemented. The frame rates may include variable frame rates. Decoders may not be required to decode bitstreams when the maximum distance between two pictures exceeds 0.7 seconds.

In relation to aspect ratio, the ATSC-M/H terminal may decode each of aspect ratios allowable by the H.264/AVC profile and level associated with the capability implemented.

In relation to luminance resolution, the ATSC-M/H terminal may decode each luminance resolution allowable by the H.264/AVC profile and level associated with the capability implemented.

In relation to chromacity, the ATSC-M/H terminal may decode each allowed value of colour_primaries, transfer_characteristics, and matrix_coefficients.

In relation to chrominance format, the ATSC-M/H terminal may decode each allowed value of chroma_sample_loc_type_top_field and chroma_sample_loc_type_bottom_field.

In relation to audio codec, the ATSC-M/H terminal may support either one of or both HE AAC v2 and AMR-WB+ (Extended AMR-WB).

First, HH AAC v2 will be described. The ATSC-M/H terminal may support mono/parametric coding or a two-channel stereo function defined in HE AAC v2 Profile Level 2. The ATSC-M/H may optionally support decoding of multi-channel audio defined in HE AAC v2 Profile Level 4.

In relation to profiles, the ATSC-M/H terminal may support the HE AAC v2 Profile. The ATSC-M/H terminal may optionally support decoding of the HE AAC Profile.

In relation to bit rate, the ATSC-M/H terminal may decode any bit rate permitted by HE AAC v2 Profile and selected Level.

In relation to sampling frequency, the ATSC-M/H terminal may decode each audio sampling rate permitted by HE AAC v2 Profile and selected Level.

In relation to dynamic range control, the ATSC-M/H terminal may support the MPEG-4 AAC dynamic range control tool.

In relation to downmixing, the ATSC-M/H terminal may support the matrix downmixing as defined in MPEG-4.

AMR-WB will now be described.

In relation to an audio mode, the ATSC-M/H terminal may perform decoding in mono and stereo the functionality defined in AMR-WB+.

In relation to sampling frequency, the ATSC-M/H terminal may be capable of decoding each audio sampling rate permitted by AMR-WB+ for mono and stereo.

In relation to captioning, the ATSC-M/H system may provide subtitles and closed captions using 3GPP Timed Text format. The ATSC-M/H terminal may support 3GPP Timed Text format for subtitles and closed captions.

Figure 68:
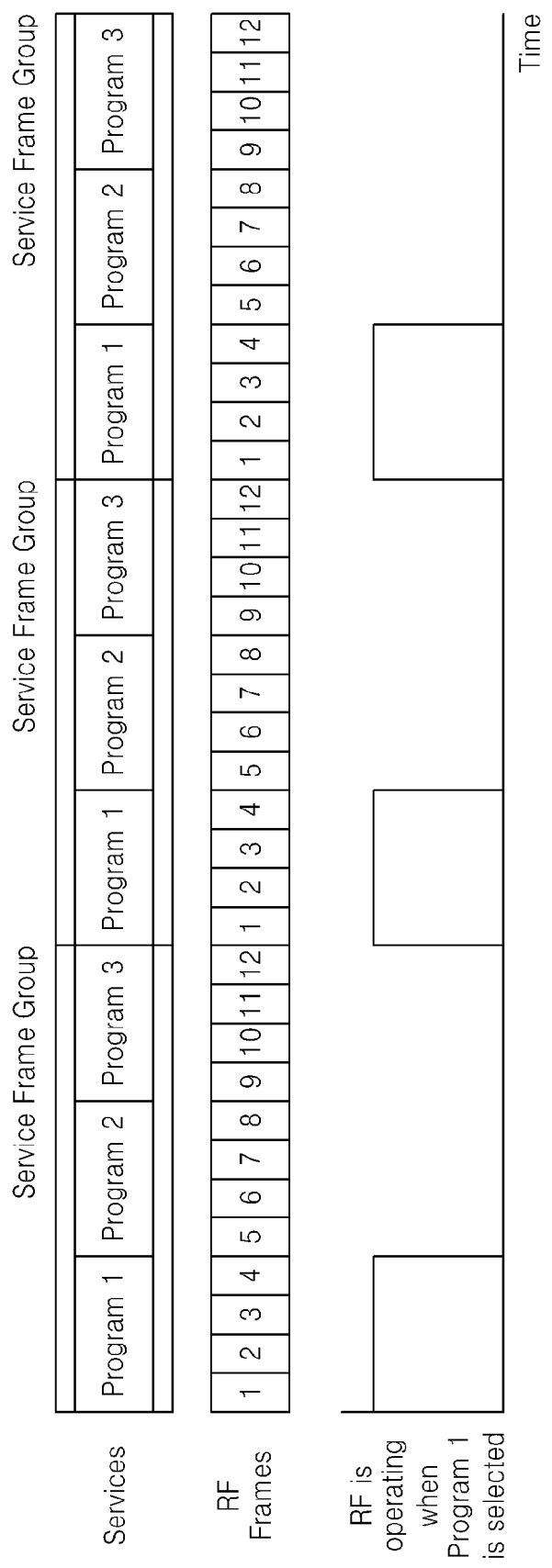
FIG. 68 illustrates a power management mechanism according to an exemplary embodiment of the present invention.

FIG. 68 illustrates a power management mechanism according to an exemplary embodiment of the present invention. In general, critical devices of power consumption are a display panel, such as an LCD, and a radio-frequency (RF) module. In this section, a power saving mechanism based on RF module control will be described.

In a generic broadcasting system, RF module must be turned on and monitor all input frames in order to find a desired frame. In ATSC-MCAST, all turbo services are grouped and mapped to a sequence set of frames and information regarding the frames, e.g., the positions and number of the frame, are delivered via an SIC. From the delivered information, a broadcast receiving apparatus can distinguish between an idle period and a work period.

FIG. 68 illustrates examples of MCAST frame slicing, and frame numbers that are used to identify a service. For example, if a user selects program #1, then the RF module may work to receive frames #1 to #4 from among RF frame groups. That is, a transport layer commands a physical layer to receive frames #1 to #4. The number of the RF frame groups and the duration of frame slicing may vary and information regarding a change thereof is transmitted via the SIC.

A fixed number of MCAST packets are burst units. The number of MCAST packets varies according to the function of a turbo coding mode. MCAST packet numbers may change on every burst.

Figure 69:
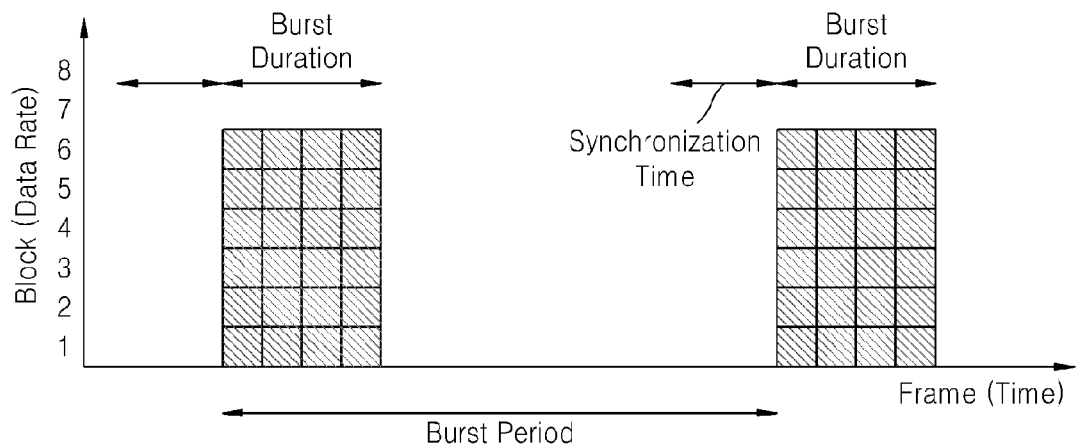
FIG. 69 illustrates parameters related to MCAST frame slicing according to an exemplary embodiment of the present invention.

FIG. 69 is a graph illustrating parameters related to MCAST frame slicing according to an exemplary embodiment of the present invention.

A method of transmitting data according to a burst transmission method will now be described.

FIG. 69 illustrates parameters used for time slicing. Definition of the parameters is as follows:

TABLE 19

| Parameter | Description |
|---|---|
| Bp | Burst Period(frame) |
| Bd | Burst Duration(frame) |
| Ot | Off Time(frame) |
| Bs | Burst Size(Block) |
| Bb | Burst Bandwidth(Block/Frame) |
| Cb | Constant Bandwidth (Block/Frame) |

The relationship among parameters Bd, Bb, Bp and Cb is expressed as '$B_d \times B_b = B_p \times C_b$'.

Figure 70:
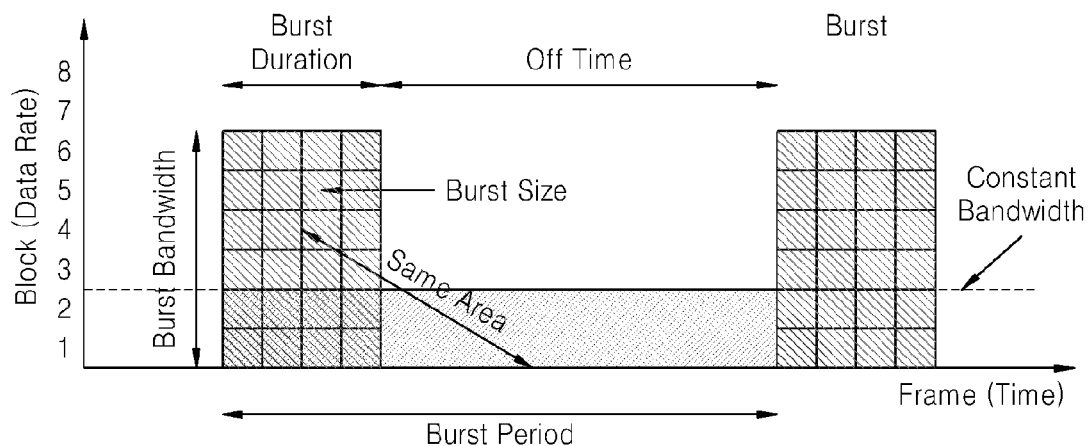
FIG. 70 illustrates parameters related to power saving according to an exemplary embodiment of the present invention.

FIG. 70 is a graph illustrating parameters related to power saving according to an exemplary embodiment of the present invention.

There are three stages required to allocate multiple burst services into a turbo channel. First, a predetermined bandwidth for each of services must be calculated using the following Equation (3). In Equation (3), 'Tc' denotes a turbo coding rate, e.g., ½, ⅓, or ¼.

$$Cb_n = \frac{\text{Data Rate (kbit/s)}}{\frac{32 \times 8 \times 78}{24.2 \text{ (ms)}} \times \frac{188}{208} \times Tc} \qquad (3)$$

Second, each of the services is allocated to the predetermined bandwidth.

Figure 71:
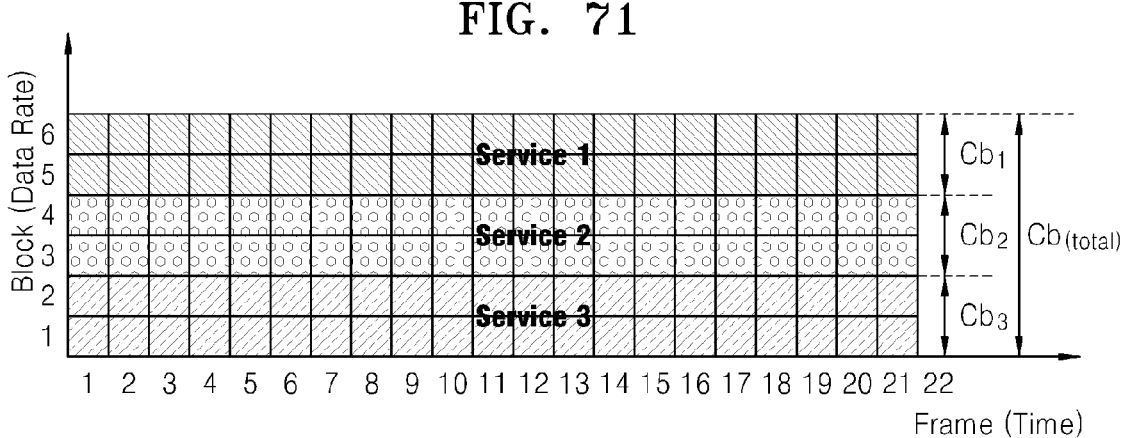
FIG. 71 is a graph illustrating a method of allocating each service to a predetermined bandwidth for burst mode transmission according to an exemplary embodiment of the present invention.

FIG. 71 is a graph illustrating a method of allocating each service to a predetermined bandwidth for burst mode transmission according to an exemplary embodiment of the present invention.

A total bandwidth is calculated by:

$$CbToT = Cb1 + Cb2 + \ldots + CbN. \qquad (4)$$

Third, services #1 through #3 must be rotated by 90 degrees clockwise or counterclockwise.

Figure 72A:
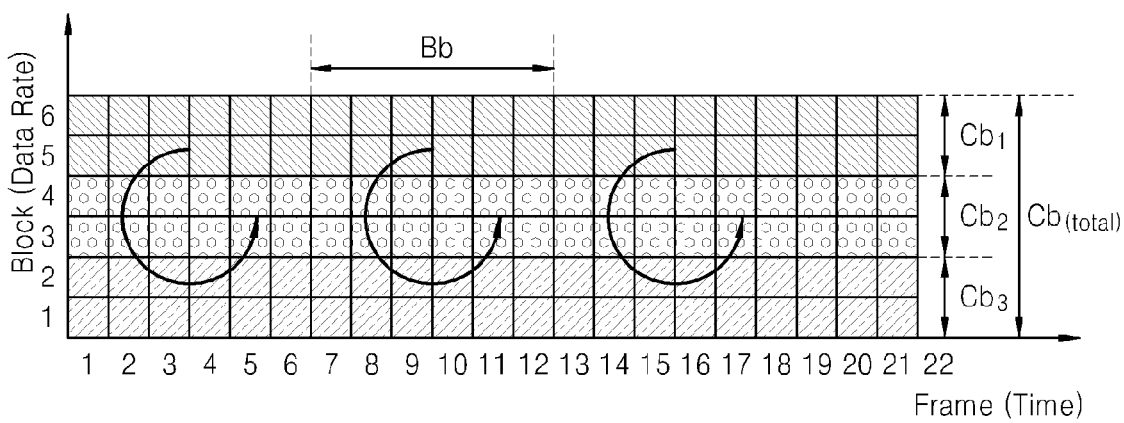
FIGS. 72A and 72B are graphs illustrating rotation of services for burst mode transmission according to an exemplary embodiment of the present invention.
Figure 72B:
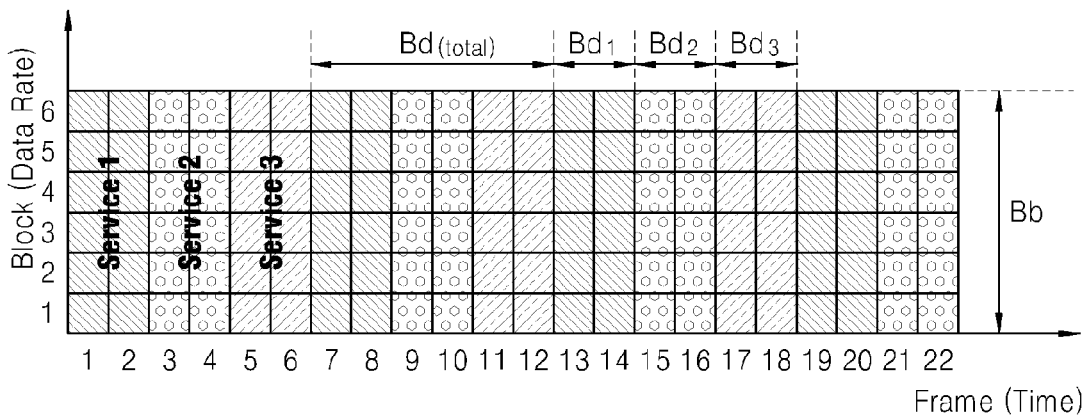

FIGS. 72A and 72B are graphs illustrating rotation of services for burst mode transmission according to an exemplary embodiment of the present invention.

AL-FEC according to an exemplary embodiment of the present invention will now be described.

In relation to encoding, MCAST AL-FEC is a concatenated code of two linear block codes. Inner and outer codes are defined as generator matrices or equivalently graphs. For example, an inner and outer code has a message code ($u_1$, $u_2$). Each of $u_1$ and $u_2$ represents a bitstream having a length of L that is greater than '1'. Similarly, the codeword in the code is expressed as ($v_1$, $v_2$, $v_3$, $v_4$, $v_5$, $v_6$), and $v_i\{i=1, \ldots 6\}$ is a bitstream having a length of L.

If a matrix G illustrated in Equation (5) is given, the message word($u_i,u_{(2)}$) is encoded into a codeword ($v_i$, $V_{(2)}$, $V_{(3)}$, $V_{(4)}$, $V_{(5)}$, $V_{(6)}$) by $V_{(1)}=U_i$, $v_{(2)}=u_i(+)U2$, $v_{(3)}{}^{(=)}ui(+)u_{(2)}$, $V_{(4)}=U_{(2)}$, $V_{(5)}=U_i$, and $V_{(6)}=U_{(2)}$. The above operator (+) denotes an XOR(exclusive-OR) bitstream.

$$G = \begin{bmatrix} 1 & 2 & 3 & 4 & 5 & 6 & v/u \\ 1 & 1 & 1 & 0 & 1 & 0 \\ 0 & 1 & 1 & 1 & 0 & 1 \end{bmatrix} \begin{matrix} \\ 1 \\ 2 \end{matrix} \qquad (5)$$

Since the length of the codeword is three times greater than the length of the message word, a code rate is ⅓. The generator matrix may be conventionally expressed by a graph.

Figure 73:
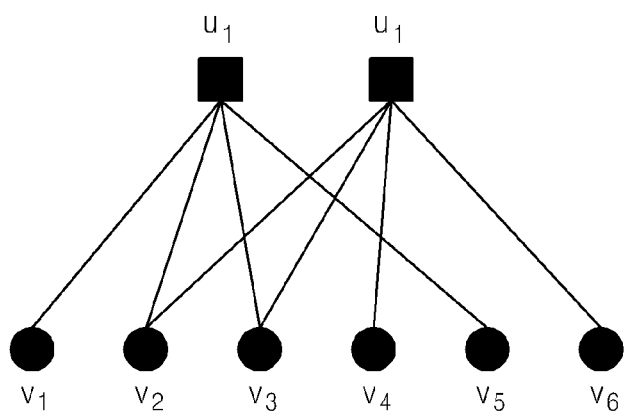
FIG. 73 is a graph illustrating a generator matrix according to an exemplary embodiment of the present invention.

FIG. 73 is a graph illustrating a generator matrix according to an exemplary embodiment of the present invention. The graph of FIG. 73 represents the matrix G illustrated in Equation (5). The description of the graph corresponds to that of a generator matrix. Each column in the graph corresponds to a codeword node ($v_i$, i=1, …, 6) while each row stands for a message code ($u_1$, $u_2$). The value in the x-th row and the y-th column of the matrix G means the line between $u_x$ and $v_y$ in the graph. The degree of a node (u or v) represents the number of lines connected to the node and is denoted deg(u or v). For instance, deg($u_1$) is 4 and deg($v_3$) is 2. The generator matrix is an important element to be properly designed.

The design of a generator matrix will now be described.

It is assumed that the number of message nodes is k and the number of code nodes is n. A code rate is k/n. A message word is represented by ($u_1$, $u_2$, …, $u_k$) and a codeword is represented by ($v_1$, $v_2$, … $v_n$). First, a graph is designed, and a generator matrix is obtained through of transformation of a graph. A graph is obtained in two steps. The first step is to determine the degree of codeword nodes (deg(vi)). The second step is to connect message nodes and codeword nodes.

In detail, in the first step, k message nodes and n alc codeword nodes are given, and the degree of codeword nodes ($\deg(v_i)$) is determined as follows.

1. Determine $d_{Max}$ from a design parameter $\Delta$. $\Delta$ is an integral value from 1 to 16. $d_{Max}$ is specified by the value of the design parameter $\Delta$. For example, if $\Delta$ is '8', $d_{Max}$ is '61'.

TABLE 20

| | $\Delta$ | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $d_{Max}$ | 917 | 388 | 231 | 158 | 117 | 91 | 74 | 61 | 52 | 44 | 38 | 34 | 30 | 27 | 24 | 22 |

2. Determine an array of integral values, $\{N[i] | i=1, 2, \ldots, d_{Max}\}$ as follows:

If an outer code is designed, $N[1]=n$ and $N[i]=0$ ($i=2, \ldots, d_{Max}$)

If an inter code is designed, $$N[1] = \left\lfloor n \cdot \frac{2 \cdot \Delta \cdot d_{Max} - 100}{d_{Max}(100 + 2 \cdot \Delta)} \right\rfloor$$

$$N[i] = \left\lfloor n \cdot \frac{100}{100 + 2 \cdot \Delta} \cdot \frac{d_{Max}+1}{d_{Max}-1} \cdot \frac{1}{i \cdot (i-1)} \right\rfloor,$$

$i = 3, \ldots, d_{Max}$ $$N[2] = n - N[1] - \sum_{i=3}^{d_{Max}} N[i]$$

where [x] denotes a largest positive integer that is less or equal to x.

3. Determine the degrees of each codeword node ($\deg(v_1)$, $\deg(v_2)$, ..., $\deg(v_n)$) according to the flowchart illustrated in FIG. 63.

Figure 74:
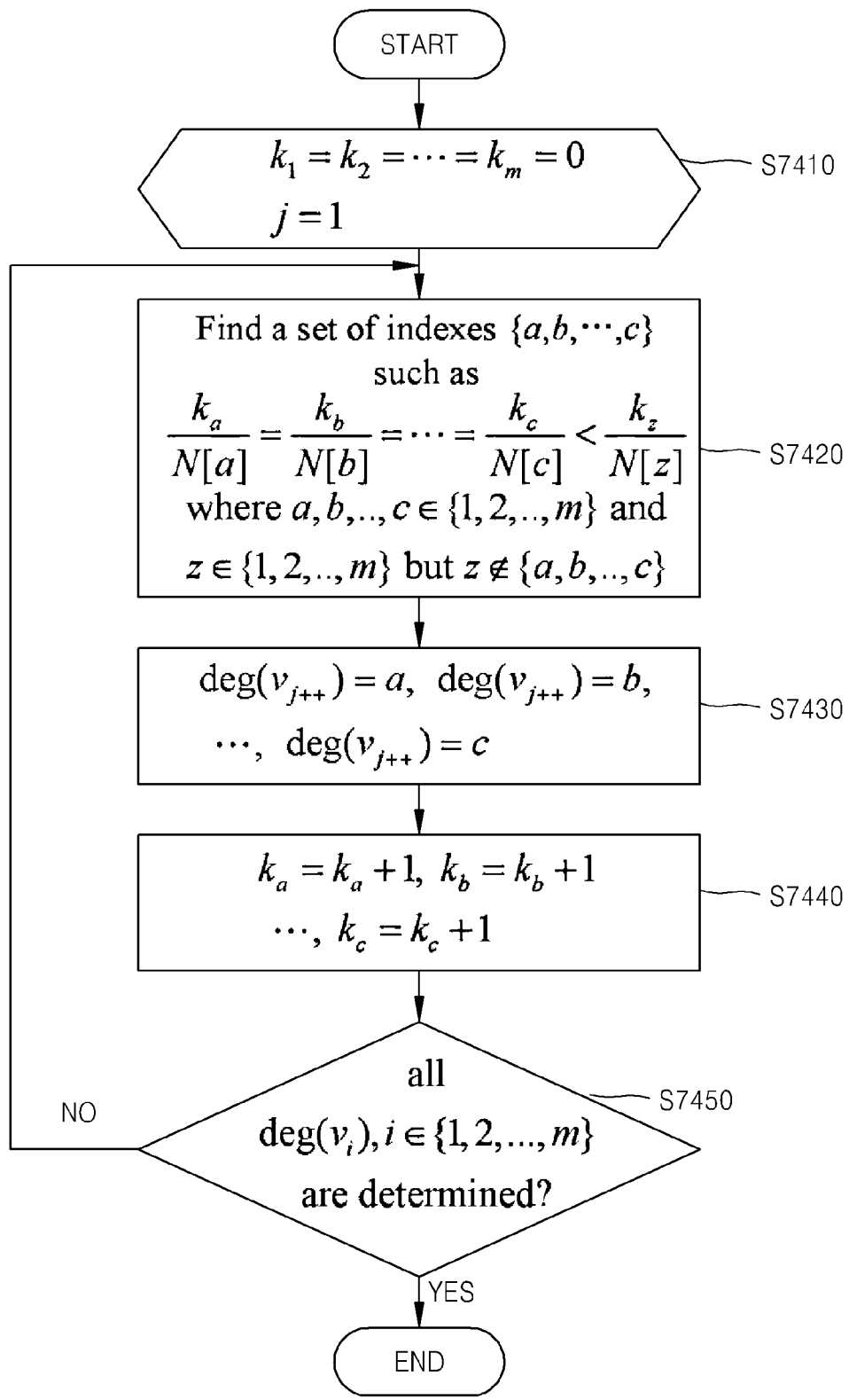
FIG. 74 is a flowchart illustrating a method of determining $deg(v_i)$ according to an exemplary embodiment of the present invention.

FIG. 74 is a flowchart illustrating a method of determining deg(Vj) according to an exemplary embodiment of the present invention.

In operation 7410, integer variables (k1, k2, ..., km) are initialized to '0', that is, k1=k2=...=km=0, where m denotes a largest integer such that N[m] is not zero. The other integer variable j is set to be 1'.

In operation S7420, an index a, such as $$a = \arg\min_{i} \min_{i=1,\ldots,m} \frac{k_i}{N[i]},$$

is determined. When there are a plurality of minimal values, a set of indexes $\{a, b, \ldots, c\}$ is determined.

In operation S7430, the degree of $v_j$ is a and j is increased by one. Also, the degree of $v_j$ is b and j is increased by one. This procedure is repeated until all the indexes are used.

In operation S7440, only variables ($k_a, k_b, \ldots, k_c$) specified in the set of the indexes $\{a, b, \ldots, c\}$ are increased by 1.

In operation S7450, whether all degrees ($\deg(v_j), j=1, \ldots, n$) are determined is verified. If all of them are not determined, operation S7420 is repeated.

In the second step, k message nodes and n codeword nodes are given, the degrees of codeword nodes are deg(vi), and message nodes connected to a codeword node are checked according to the flowchart of FIG. 64.

Figure 75:
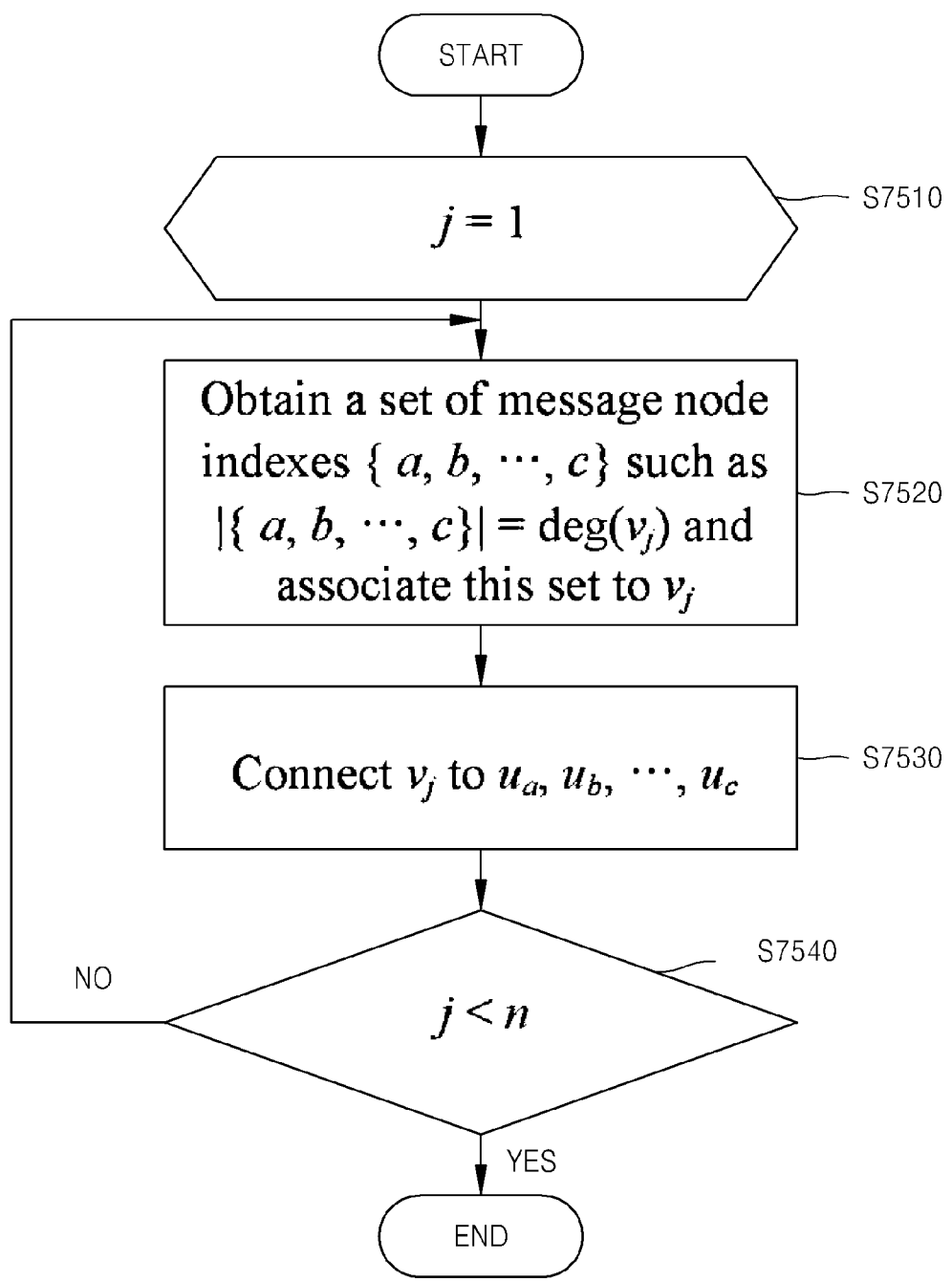
FIG. 75 is a flowchart illustrating a connection of message nodes to a code node according to an exemplary embodiment of the present invention.

FIG. 75 is a flowchart illustrating a connection of message nodes to a code node according to an exemplary embodiment of the present invention.

In operation S7510, an index variable j of a codeword node $v_j$ is initialized to be '1'.

In operation S7520, a set of message node indexes $\{a, b, \ldots, c\}$ that is to be associated with the codeword node $v_j$ is obtained. The number of elements ($|\{a, b, \ldots, c\}|$) in this set may be equal to the degree of $v_j$, $\deg(v_j)$.

In operation S7530, message nodes that are to be connected to the codeword node $v_j$ with $\{u_a, u_b, \ldots, u_c\}$ are identified.

In operation S7540, the above procedures are repeated for all codeword nodes.

Figure 76:
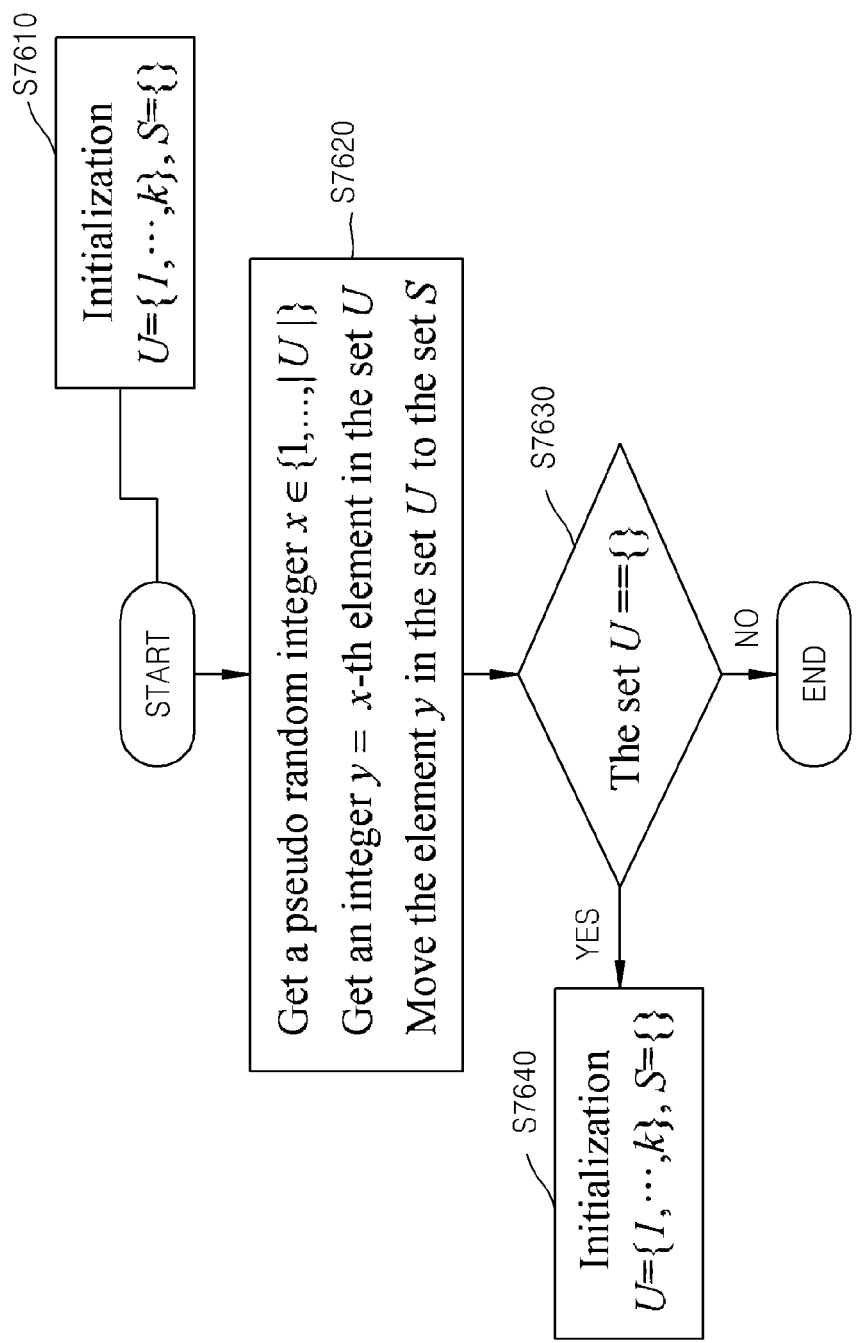
FIG. 76 is a flowchart illustrating in detail operation S7520 illustrated in FIG. 75 according to an exemplary embodiment of the present invention.

FIG. 76 is a flowchart illustrating in detail operation S7520 of FIG. 75 according to an exemplary embodiment of the present invention.

In operation S7610, message node index sets U and S are respectively initialized to $\{1, \ldots, k\}$ and $\{\ \}$. The sets U and S are ordered sets and the order is defined as follows. Given the x-th element a and the y-th element b in the set U or S, if x<y, then a<b and vice versa. This initialization is performed only once before any call of this procedure.

In operation S7620, after obtaining a pseudo random value x in $\{1, \ldots, |U|\}$, the message node index that is to be returned is obtained by the x-th element in the set U where |U| means the number of all elements in the set U. Then, this element moves from the set U to the set S. In this way, all previously selected message node index values are included in the set S while the other unselected values remain in the set U.

In operation S7630, it is determined whether the set U is an empty set. If the set U is empty, operation S7630 is performed to respectively initialize the sets S and U to $\{1, \ldots, k\}$ and $\{\ \}$.

An operation of obtaining a message node index number x in $\{0, \ldots, |U|\}$ is unspecified in FIG. 76. This operation is done by Mersenne Twister (MT) that is a pseudorandom number generating algorithm developed by Makoto Matsumoto and Takuji Nishimura in 1996/1997 and improved in 2002. There is the standard C code by the inventors which is freely available for any purpose, including commercial use.

Before any procedure call, Mersenne Twister (MT) is initialized by one unsigned 32-bit integer seed. To obtain a message node index number x in $\{1, \ldots, |U|\}$, then an unsigned 32-bit integer is generated, a minimum integer e such as $|U|<=2^e$ is obtained, most significant e bits are obtained, and the previous procedure is discarded and repeated again if the number is greater than or equal to |U|. If the number is less than |U|, the message node index number x is the number+1 which is in $\{1, \ldots, |U|\}$.

A method of designing a generator matrix will now be described.

Each column corresponds to a codeword node ($v_i$, $i=1, \ldots, n$) in a graph while each row stands for a message node ($u_i$, $i=1, \ldots, k$). When $u_x$ is connected to $v_y$ in the graph, the element in x-th row and y-th column in the generator matrix may be '1'. If not connected, the element may be zero.

Pre-designed AL-FEC codes will now be described.

In order to define a MCAST AL-FEC code, two matrices are defined. One of them is for the inner code and the other is for the outer code.

Given a (n, k) MCAST AL-FEC code, the inner code may be a (n, k+$\delta_k$) code and the outer code may a (k+$\delta_k$, k) code. k+$\delta_k$ is the number of codeword nodes in the outer code and of message nodes in the inner codes.

To define deg($v_j$) in the inner code, a design parameter $\Delta$ needs to be provided.

To define the connection between $u_i$ and $v_j$ in the inner and outer codes, a random seed for Mersenne Twister procedure needs to be provided. This seed may be used for both inner and outer codes.

Thus, the three parameters $\delta_k$, $\Delta$, and seed are enough to define a MCAST AL-FEC code. For the 3 different (n, k) MCAST AL-FEC codes, these parameters are listed as follows:

TABLE 21

| (n, k) | ($\delta_k$, $\Delta$, seed) |
|---|---|
| (2880, 2304) | (10, 6, 14) |
| (1920, 1536) | (3, 8, 6) |
| (960, 768) | (1, 8, 8) |

Figure 77:
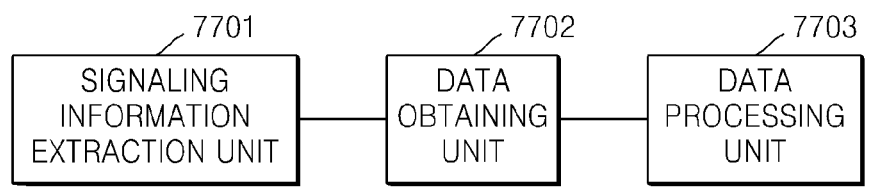
FIG. 77 is a block diagram of an MCAST broadcast receiving apparatus according to an exemplary embodiment of the present invention.

FIG. 77 is a block diagram of an MCAST broadcast receiving apparatus according to an exemplary embodiment of the present invention.

Referring to FIG. 77, the broadcast receiving apparatus includes a signaling information extractor 7701, a data obtaining unit 7702, and a data processing unit 7703.

The signaling information extractor 7701 obtains signaling information needed to process a transport channel. The signaling information may be delivered via a transport channel such as an SIC. The signaling information may include at least one of configuration information regarding an ATSC M/H stream, error correction information regarding the transport channel, configuration information of the transport channel which are needed to process the transport channel.

The signaling information can be continuously or discontinuously included in ATSC normal stream and then transmitted. The signaling information is included in a predetermined location of a frame or location information of the signaling information is included in the predetermined location of the frame so that the signaling information extractor 7701 can recognize the location of signaling information. In addition, the location of the signaling information may be indicated by including a specific bitstream inside or outside a channel transmitting the signaling information.

The signaling information is important information since it contains information needed to process other transport channels, and thus can contain additional code for error correction. The signaling information can be transmitted in-band or out-of-band or be transmitted via a specific location of a transport stream.

The data obtaining unit 7702 obtains packets transmitted via the transport channel. The term, 'transport channel' used in the present specification has a broader definition than used in a general broadcasting system. That is, the term, 'transport channel' according to exemplary embodiments of the present invention includes a stream delivered while being included in another transport stream. For example, it is possible to transmit an ATSC normal stream (MPEG-2 TS) by including an MPEG-2 TS stream or another type of transport stream therein through an additional indication in the ATSC normal stream. In an exemplary embodiment, the broadcast receiving apparatus obtains data by processing a transport stream included in a normal stream. Data may be obtained according to a predetermined method or by using the above signaling information transmitted via a specific channel such as an SIC. A transport stream according to an exemplary embodiment of the present invention, which is to be received by a mobile terminal, is inserted into another transport stream, or information indicating this insertion is transmitted via an SIC. For example, a transport stream is included in an MPEG-2 TS null packet region or in a private data field of an MPEG-2 TS.

If a transport stream according to an exemplary embodiment of the present invention, which is to be received by a mobile terminal, is inserted into (or added to) another transport stream, an additional header or display information may also be included in order to process the inserted or added stream. For example, a combination of information regarding the starting and ending positions of the added stream, information regarding the length of the added stream, information indicating whether the added stream exists, and other information needed to process the added stream may be included.

Although not shown in the drawings, the data obtaining unit 7702 may include a meta information output unit and a transport channel accessing unit.

The meta information output unit outputs meta data regarding a broadcast service provided. The meta data provides information related to the broadcast service provided, such as an ESG, an EPG, or an OMA BCAST service guide. The meta data may include information needed to process a transport packet. For example, SDP data for processing IP streams may also be included in the meta data. Information indicating the location of the transport channel containing IP streams may also be included in the meta data. That is, various information regarding the service may be considered as being meta data. Hereinafter, exemplary embodiments of the present invention will be described with respect to an OMA BCAST service guide as an example of meta data. A service guide must be obtained by sequentially accessing a service guide announcement channel and a service guide delivery channel in order to provide a service according to OMA BCAST. A transport channel transmitting a service guide announcement channel may be specified in an i-IMT in an SIC as described above. Thus, the meta information output unit obtains meta data regarding a service, which is provided via the transport channel, from the i-IMT and then outputs it.

If MCAST transmission system supports high-speed access such as the above primary service, it is possible to provide a primary service simultaneously with obtaining meta data.

The transport channel accessing unit accesses a transport channel providing a broadcast service selected by a user. Alternatively, a transport channel can be automatically selected by the broadcast receiving apparatus or a broadcast service provider.

If the transport channel is selected, data transmitted via the transport channel is obtained. The data transmitted via the transport channel may be constructed in packet units, bytestream units, or bitstream units. Error protection code may be added to data in order to correct an error therein. In this case, the error is corrected using the error protection code. As described above, the data transmitted via the transport channel may be present in a specific location or a location known by an SIC, and the transport channel accessing unit can process all such information. However, according to another exemplary embodiment of the present invention, processing of such information may be performed by the data obtaining unit 7703.

The data processing unit 7703 processes obtained data. The data may be processed in packet units, bytestream units, or bitstream units. If the data is processed in packet units, a header is present in each of the packets. Each header contains the configuration information of a packet, and the original data is restored based on the configuration information.

In particular, the MCAST transmission system according to an exemplary embodiment fragments application data into encapsulation packets and segments the encapsulation packets into transport packets. In this case, the data processing unit 7703 restores the encapsulation packets by using the header information of the transport packets and restores the original application data by using the header information of the encapsulation packets.

According to another exemplary embodiment of the present invention, data can be processed in packet streams. In this case, the configuration information regarding the packet streams, e.g., the above LMT, is obtained, and then, the data is obtained by processing the packets included in the packet streams.

The obtained data is output via an output device (not shown) after being decoded or without being decoded. The output device processes and outputs the data in access units (AUs) in order to provide a user with a broadcast service. The AU denotes a minimum unit that can be divided and processed by an output device or a decoding device. For example, in the case of video, I, P, and B frame packets may be AU units, and in the case of an MPEG-2 transport packet, a PES or section data may be AU units.

Although not shown in the drawings, the broadcast receiving apparatus may further include a channel setting module, an RF receiver, a baseband processor, and an embedded stream information receiver. The channel setting module sets a frequency to a channel and the RF receiving apparatus receives a signal corresponding to the set frequency. The baseband processor processes the received signal, and transforms it into a bitstream in order to process the signal at a latter part. The embedded stream information receiver receives information regarding an embedded stream. The information regarding an embedded stream may be any information needed to process the embedded stream, including information specifying whether an embedded stream is present, the type of the embedded stream, or a method of processing the embedded stream, e.g., outer interleaving, RS parity information, and time interleaving.

If a first transport stream includes a second transport stream in the same or different format, the embedded stream described with reference to FIG. 77 is used to indicate the included the second transport stream. Thus, information for processing the embedded stream is transmitted in-band or out-of-band or a predetermined condition or value is used, so that the broadcast receiving apparatus can recognize it.

Figure 78:
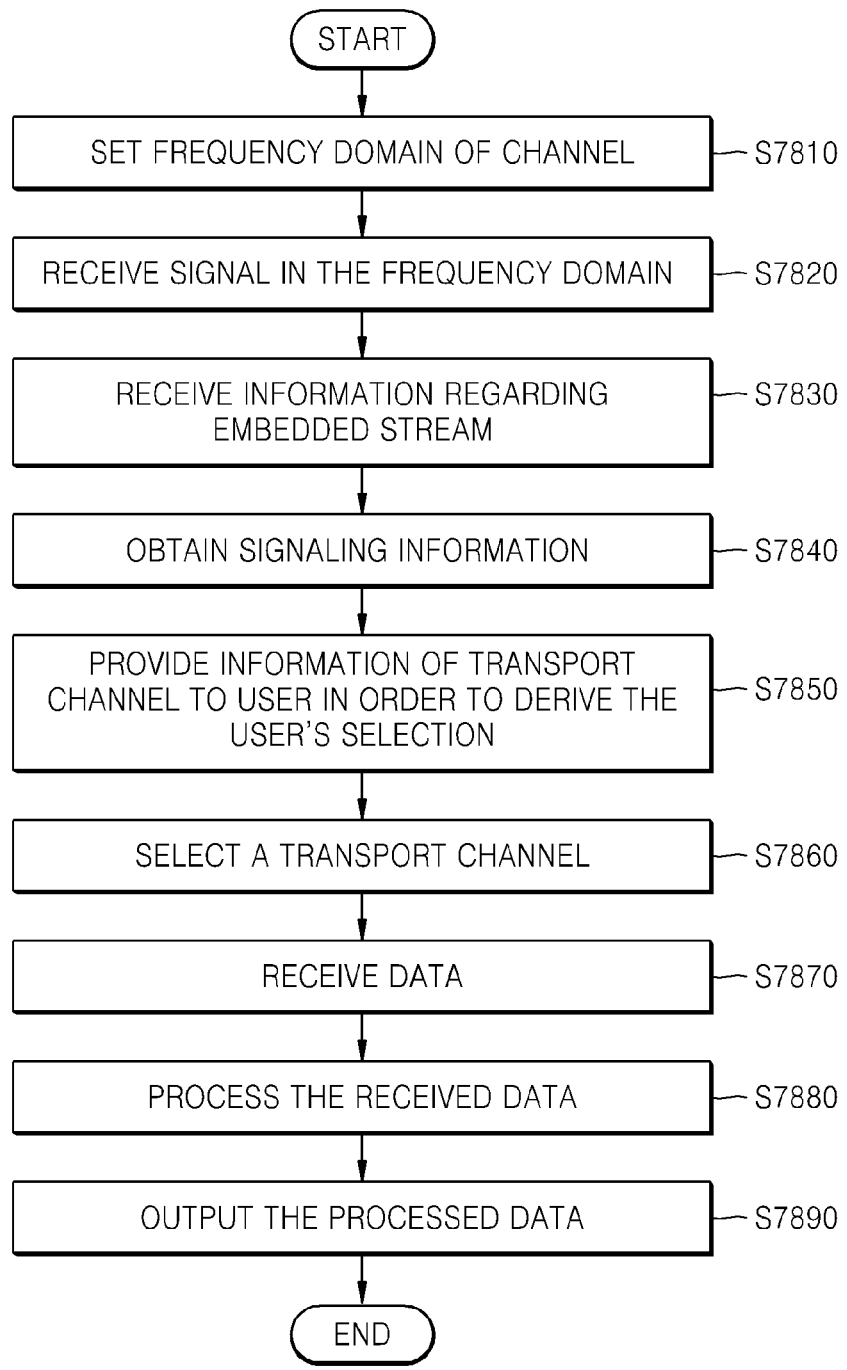
FIG. 78 is a flowchart illustrating a method of receiving a broadcast according to an exemplary embodiment of the present invention.

FIG. 78 is a flowchart illustrating a method of receiving a broadcast according to an exemplary embodiment of the present invention.

In operation S7810, a frequency of a channel is set.

In operation S7820, a signal corresponding to the set frequency is received.

In operation S7830, information regarding an embedded stream is received.

In operation S7840, signaling information containing information for processing one or more transport channel is obtained. In the present invention, signaling information can be transmitted via a SIC.

In operation S7850, information of a transport channel is provided to a user in order to derive the user's selection.

In operation S7860, a transport channel providing a service is selected based on the user's input. Alternatively, a predetermined transport channel may be selected as default.

In operation S7870, data is received via one or more transport channels.

In operation S7880, the received data is processed.

In operation S7890, the processed data is output.

A transport frame according to an exemplary embodiment of the present invention may be transmitted via a transport frame used in an ATSC transport system or separately. If a transport frame containing a transport stream used in another transport system is transmitted, some of the operations illustrated in FIG. 78 may be skipped according to another exemplary embodiment of the present invention.

Figure 79:
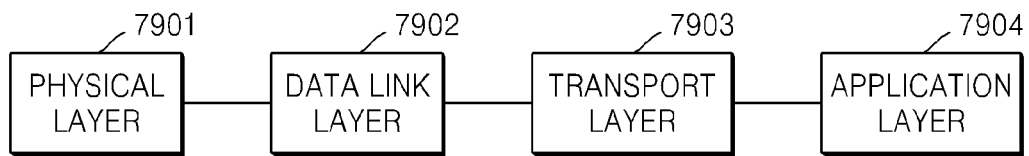
FIG. 79 schematically illustrates an A-VSB MCAST receiving system according to an exemplary embodiment of the present invention.

FIG. 79 schematically illustrates an A-VSB MCAST receiving system according to an exemplary embodiment of the present invention.

A broadcast signal received via a tuner is provided to a user via a physical layer, a data link layer, a transport layer and an application layer. The operations of the layers illustrated in FIG. 79 are opposite to those of layers in an MCAST transmission system.

The physical layer obtains an MCAST transport frame from the received broadcast signal. The MCAST transport frame may be inserted into a transport frame in another transport system and then transmitted. Thus, the physical layer must obtain the MCAST transport frame. If the MCAST transport stream is inserted into an ATSC transport frame and then transmitted, the MCAST transport stream is obtained by detecting a 'deterministic frame sync (DFS)' field, wherein the MCAST transport stream is divided into N packets. The MCAST transport frame has a deterministic structure, and thus, the N packets can be included in the MCAST transport frame irrespective of the presence of an error.

The data link layer corrects errors in data transmitted via a turbo channel and in a plurality of pieces of signaling information transmitted via a SIC. A transmitting side can apply specific FEC (a code rate, etc.) to each turbo channel. In particular, robust FEC can be applied to the signaling information in the SIC. The data link layer in the broadcast receiving apparatus can perform error correction using additional code such as FEC.

The transport layer in the broadcast receiving apparatus includes a packetization layer and an encapsulation layer. The packetization layer creates an encapsulation packet by processing a multiplexed transport packet, and the encapsulation layer restores the original application data and application specific information by processing the encapsulation packet. The application data may include real-time media data, IP data, object data and signaling data.

A transport frame used in the MCAST transmission system has a deterministic structure. That is, integral packets are present in one transport frame. When a transport frame has a deterministic structure, it is effective since a 'sync' field or 'CC' field can be removed from packets. However, in a system multiplexing and transmitting data in parcel units according to exemplary embodiments of the present invention, multiplexing using a parcel needs all packets constituting the parcel to be received. If an error occurs in some of the packets, the error packets must also be received in order to constitute the parcel. Otherwise, an ending offset value of a sub data channel and the location of data in the actual parcel are changed, thereby preventing all the packets from being completely received. For example, information, such as an LMT, which indicates the location of a transport channel indicates the location of data by using an offset value in a frame, and thus, the physical layer must transmit even an error packet to an upper layer.

Thus, when an error occurs in a particular packet, it is needed to indicate that the occurrence of the error is indicated in this packet or a packet demultiplexing device is informed of this fact. The occurrence of error may be informed as follows:

First, the occurrence of an error is indicated by an 'error_indicator' field in the header of a packet. This method is employed in the case of a MPEG-2 TS. However, packet efficiency is degraded since a new field must be added to the header of a packet.

Second, hardware signal flag is used in order to indicate that an error occurs in a current packet. When an 'error_indicator' field is not used, then an occurrence of an error may be indicated through additional signaling. However, overhead occurs since signaling information must be synchronized with the packet.

Third, an additional field that is not specified in the standards is generated for each packet, and the 'error_indicator' field is included in the additional field. However, it is inconvenient since a terminal must individually insert information representing the occurrence of an error.

To solve these problems, the occurrence of an error is implicitly indicated using a combination of fields showing a discrepancy according to the structure of packet header. The occurrence of an error may be indicated by constructing the header of an error packet not to exist in an actual packet. That is, the header of the error packet is constructed using a combination of fields that cannot actually exist in a packet header. Since such header structure cannot exist, a packet demultiplexing unit determines a packet having such header structure to be an error packet.

The following shows an exemplary embodiment of the header of an error packet defined in MCAST:

First_last 0x00
DC_flag 0x01

These fields mean that an encapsulation packet is not a first packet and includes decoder configuration information.

Decoder configuration information is always included in a location where a first packet of an encapsulation packet is present, and thus cannot exist in an MCAST packet. Thus, a terminal determines a packet showing such header structure to be an error packet.

Figure 80:
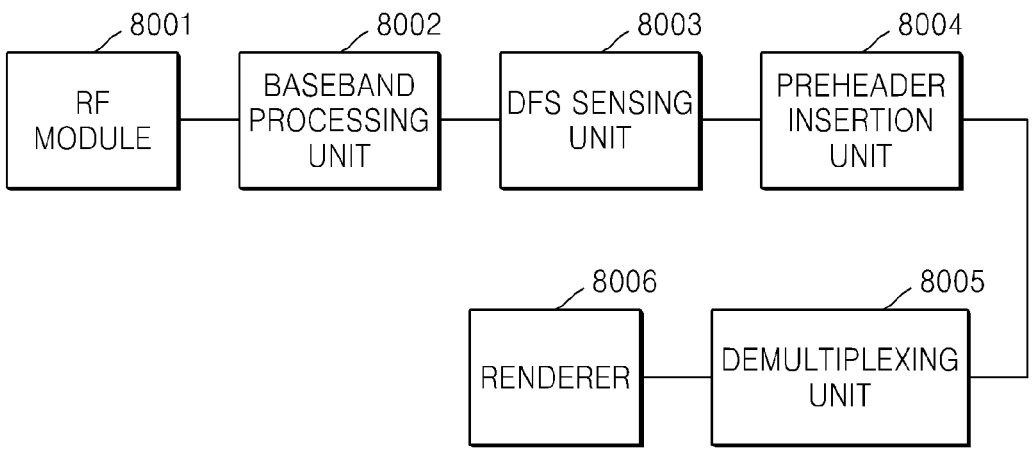
FIG. 80 is a block diagram of a broadcast receiving apparatus capable of indicating an error packet according to an exemplary embodiment of the present invention.

FIG. 80 is a block diagram of a broadcast receiving apparatus capable of indicating an error packet according to an exemplary embodiment of the present invention. Referring to FIG. 80, the broadcast receiving apparatus includes an RF module 8001, a baseband processing unit 8002, a DFS sensing unit 8003, a preheader insertion unit 8004, a demultiplexing unit 8005, and a renderer 8006.

The RF module 8001 receives an analog broadcast signal, and the baseband processing unit 8002 generates a bitstream according to the ATSC and A-VSB standards. The DFS sensing unit 8003 divides the bitstream into N packets by sensing DFS.

The preheader insertion unit 8004 inserts a pre-header into each of the packets. The pre-header may include an identifier representing the type of the packet, error information indicating whether an error is present in the packet, and a 'CC' field for checking whether continuity is present according to the type of the packet. By using the 'CC' field, it is possible to determine whether there is a lost packet.

The structure of the pre-header according to an exemplary embodiment of the present invention will be described later with reference to FIG. 82.

The demultiplexing unit 8005 demultiplexes a transport packet. In this case, the identifier representing the type of the packet, which is included in the pre-header, may be used.

The renderer 8006 processes data and outputs the processing result.

Figure 81:
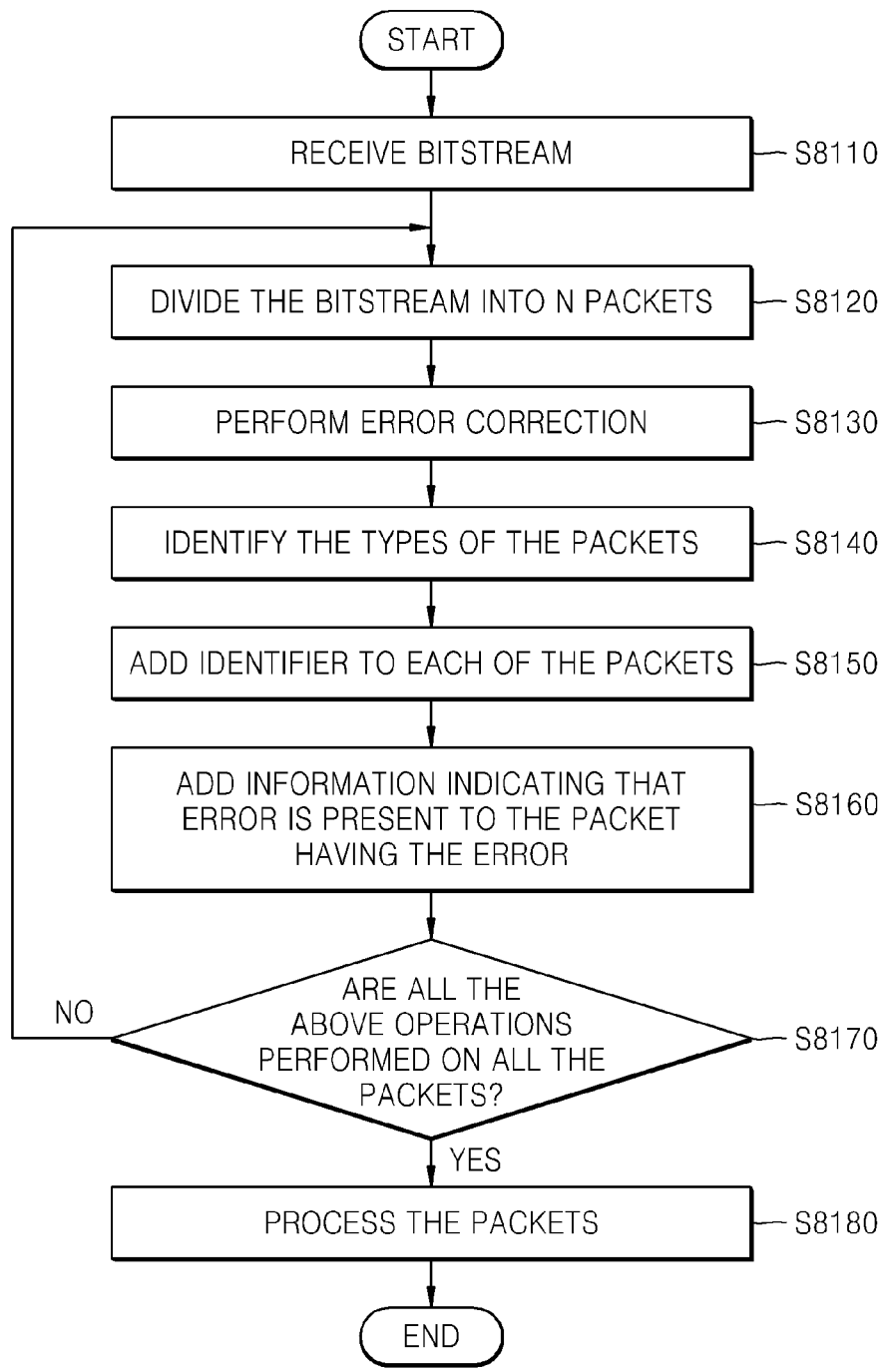
FIG. 81 is a flowchart illustrating a method of receiving a broadcast indicating an error packet according to an exemplary embodiment of the present invention.

FIG. 81 is a flowchart illustrating a method of receiving a broadcast indicating an error packet according to an exemplary embodiment of the present invention.

In operation S8110, a bitstream is received from a baseband processor.

In operation S8120, the bitstream is divided into N packets by using DFS. The value of N may vary according to a transmission mode.

In operation S8130, error correction is performed. A method of error correction corresponds to a method of error protection, which was used in a transmitting side. For example, RS decoding or outer decoding may be performed.

In operation S8140, the types of the packets are identified. For example, it is determined whether a transport packet is either a signaling packet containing signaling data or a general data packet.

In operation S8150, an identifier is added to each of the packets according to packet type. For example, '0x30' is added as an identifier to the signaling packet containing signaling information, and '0x47' is added as an identifier to a general MCAST transport packet.

In operation S8160, it is determined whether an error is present in each of the packets, and when an error is present, information indicating this determination is added to the packet having the error.

In operation S8170, it is determined whether all the above operations are performed to all the packets. If not so, the above operations are repeated.

In operation S8180, the packets are processed by a demultiplexer at a transport layer.

The above operations S8110 through S8170 may be performed by the baseband processor or below the transport layer.

Figure 82A:
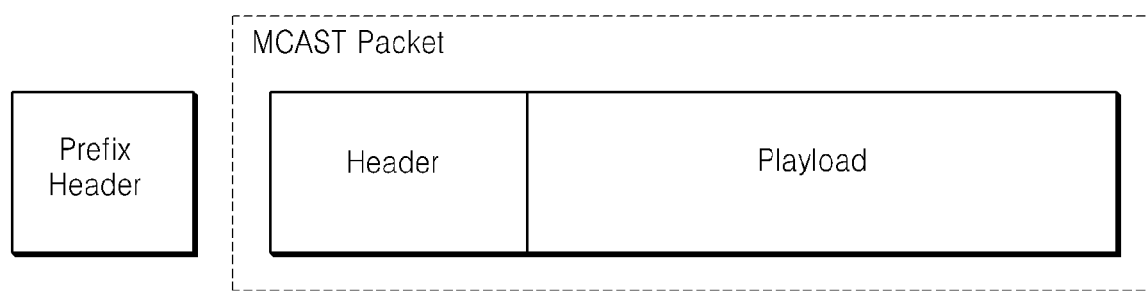
FIGS. 82A and 82B illustrate the structure of a pre-header according to exemplary embodiments of the present invention.
Figure 82B:
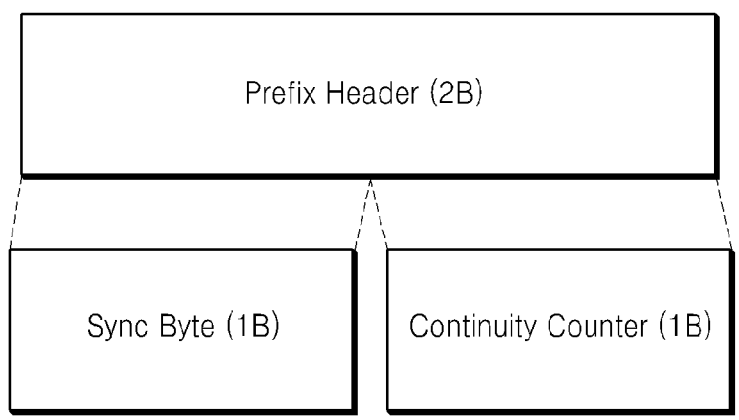

FIGS. 82A and 82B illustrate the structure of a pre-header according to exemplary embodiments of the present invention.

The pre-header may include a sync byte and a CC field.

The sync byte is one byte and contains identification information identifying packet type. For example, '0x38' may indicate a signaling packet and '0x47' may indicate a general data packet.

The CC field is a one-byte field and may contain an error flag indicating whether an error is present in a packet. When an error is present, one bit of the CC field may be used to indicate the error.

For example, '0, 1, 2, 3, 4, . . . , 254, 255, 0, 1, 2, 3, . . .' indicates that no error is present and '0, 1, 2, 3, 4, . . . , 126, 127, 0, 1, 2, 3, . . .' indicates that an error is present.

Figure 83:
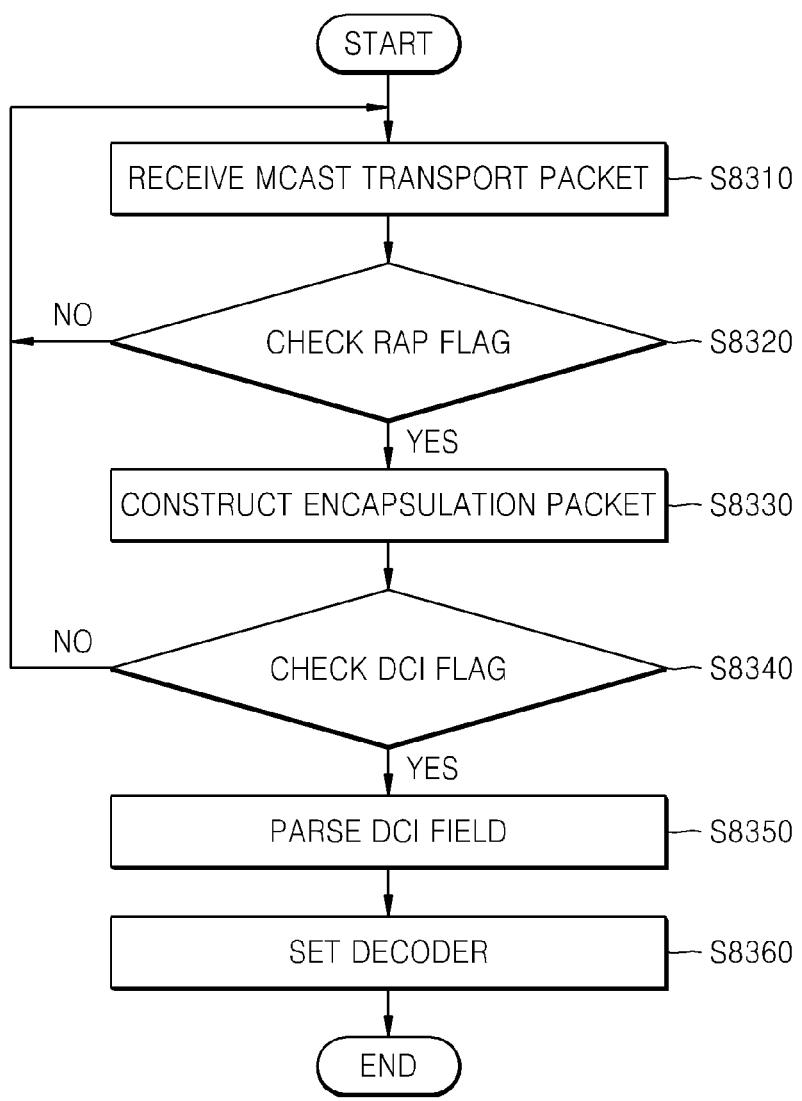
FIG. 83 is a flowchart illustrating a method of processing a DCI by a broadcast receiving apparatus according to an exemplary embodiment of the present invention.

FIG. 83 is a flowchart illustrating a method of processing a DCI by a broadcast receiving apparatus according to an exemplary embodiment of the present invention.

In operation S8310, an MCAST transport packet is received.

In operation S8320, RAP flag is checked.

If the RAP flag is activated, an encapsulation packet is constructed in operation S8330.

In operation S8340, DCI flag is checked.

In operation S8350, a DCI field is parsed.

In operation S8360, a decoder is set in order to correspond to the DCI field.

Figure 84A:
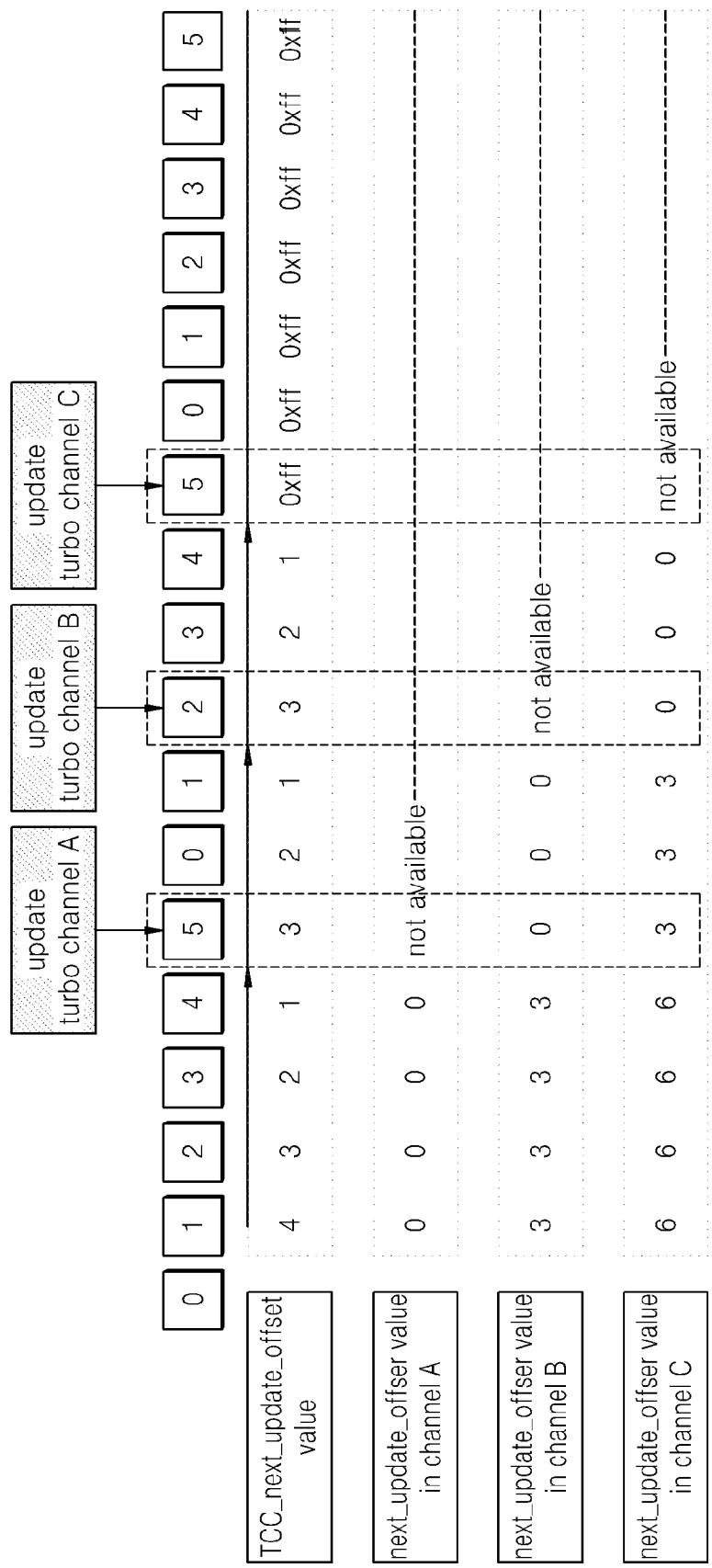
FIG. 84A illustrates a method of updating TCC in adaptive time slicing according to an exemplary embodiment of the present invention.

FIG. 84A illustrates a method of updating TCC in adaptive time slicing according to an exemplary embodiment of the present invention.

Referring to FIG. 84A, a GOF consists of five frames, and numbers of '0' to '5' are respectively allocated to frames belonging to each of GOFs.

A TCC_next_update_offset' field may be transmitted via a 'service configuration information' field in an SIC, and indicates a frame, TCC, which is to be updated. That is, if the TCC_next_update_offset' field has a value of '4', it means that the TCC is updated after four frames.

The value of a 'Next_update_offset' field varies according to channel type, and a point of time that TCC is updated in each of the channels may be calculated using the TCC_next_update_offset' field and the 'Next_update_offset' field. In an exemplary embodiment, a point of time that TCC is updated in a turbo channel is calculated to be (TCC_next_update_offset+Next_update_offset).

First, a point of time that TCC is updated in a channel A will be described.

When receiving a frame having a value of '1' and belonging to a first GOF, the broadcast receiving apparatus obtains the values of the 'TCC_next_update_offset' field and the 'Next_update_offset' field. In an exemplary embodiment, the value of 'TCC_next_update_offset' field is '4' and the value of the 'Next_update_offset' field is '0'. Thus, the turbo channel configuration information (TCC) of the channel A is updated at a point of time indicated by the sum of the values of the 'TCC_next_update_offset' field and the 'Next_update_offset' field, i.e., after four frames. Accordingly, the changed TCC is applied starting from a frame having a value of '5' and belonging to the first GOF.

Similarly, in a channel B, the changed TCC is applied starting from a frame having a value of '2' and belonging to a second GOF, and in a channel C, the changed TCC is applied starting from a frame having a value of '5' and belonging to the second GOF.

Figure 84B:
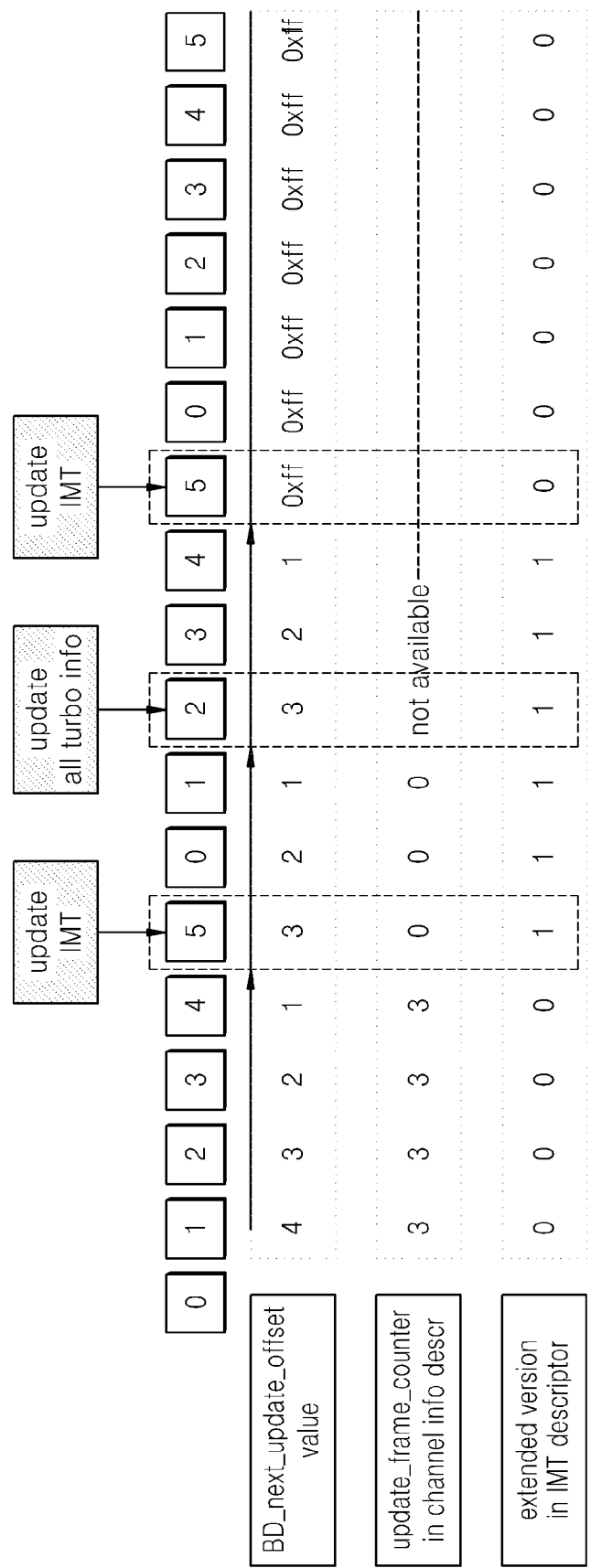
FIG. 84B illustrates an updating method using a BD in adaptive time slicing according to an exemplary embodiment of the present invention.

FIG. 84B illustrates an updating method using a BD in adaptive time slicing according to an exemplary embodiment of the present invention. In detail, FIG. 84B illustrates a method of updating an IMT and channel information by using information contained in a BD. Similar to FIG. 84A, a GOF consists of five frames and numbers of '0' to '5' are respectively allocated to frames belonging to each of the frames.

If it is assumed that a frame having a value of 1 and belonging to a first GOF, a broadcast receiving apparatus obtains the value of a 'BD_next_update_offset' field. In an exemplary embodiment, the value of the 'BD_next_update_offset' field is '4'.

Also, the values of an 'update_frame_counter' (or 'channel_info_update') field included in a 'channel_info_descriptor' field and an 'extended version' field included in 'IMT' field are obtained. In an exemplary embodiment, the 'BD_next_update_offset' field has a value of '4' and the 'extended version' field has a value of '0'. Thus, the IMT is updated at a point of time indicated by the sum of the values of the 'BD_next_update_offset' field and the 'extended version' field, i.e., after four frames. Accordingly, the updated IMT is applied starting from a frame having a value of '5' and belonging to the first GOF.

Also, turbo channel information is updated at a point of time indicated by the sum of the values of the 'BD_next_update_offset' field and the 'update_frame_counter' field, i.e., after seven frames. Thus, the updated channel information is applied starting from a frame having a value of '2' and belonging to a second GOF. That the turbo channel information is updated refers to not only to a case where turbo channel configuration information is changed, but also a case where some turbo channels are added or canceled.

When the BD consists of a plurality of frames, the value of the 'update_frame_counter' is greater than '0'.

Figure 85:
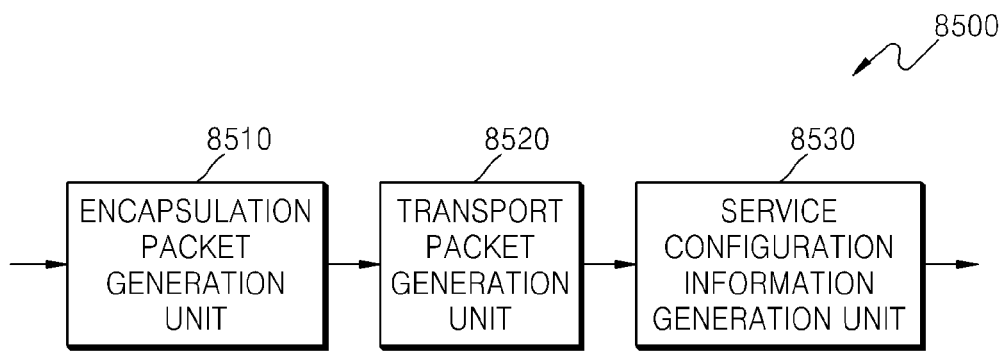
FIG. 85 is a block diagram of a broadcast service transmitting apparatus according to an exemplary embodiment of the present invention.

FIG. 85 is a block diagram of an apparatus 8500 for transporting a broadcast service according to an exemplary embodiment of the present invention.

Referring to FIG. 85, the apparatus 8500 includes an encapsulation packet generation unit 8510, a transport packet generation unit 8520, and a service configuration information generation unit 8530.

The encapsulation packet generation unit 8510 receives application data, generates an encapsulation packet that includes configuration information adaptive to the type of to-be-transported application data and the application data, and outputs the encapsulation packet to the transport packet generation unit 8520.

In an exemplary embodiment of the present invention, the application data is one of signaling data, real-time media data, IP data, and object data. Depending on the type of application data, information about the encapsulation packet is set differently.

In particular, an encapsulation packet including real-time media data according to an exemplary embodiment of the present invention includes, in a header area, decoder configuration information (DCI) that determines the specifications of a target decoder.

The transport packet generation unit 8520 receives the encapsulation packet from the encapsulation packet generation unit 8510, divides the encapsulation packet into at least one predetermined-sized transport packet that includes data of the encapsulation packet and information about the transport packet itself, and outputs the transport packet to the service configuration information generation unit 8530.

According to an exemplary embodiment of the present invention, the transport packet generation unit 8520 generates a transport packet that includes a basic header area, a pointer area, a padding area, a location map table (LMT) area, a linkage information table (LIT) area, and a payload area.

The service configuration information generation unit 8530 receives the transport packet from the transport packet generation unit 8520, generates service configuration information that includes set information about a channel including the transport packet, and outputs the service configuration information to an SIC (not shown) at a predetermined location from at least one transport channel on a transport stream.

According to an exemplary embodiment of the present invention, the service configuration information generation unit 8530 includes a service configuration information determination unit for determining service configuration information that includes information about a turbo channel and frame group information.

Figure 86:
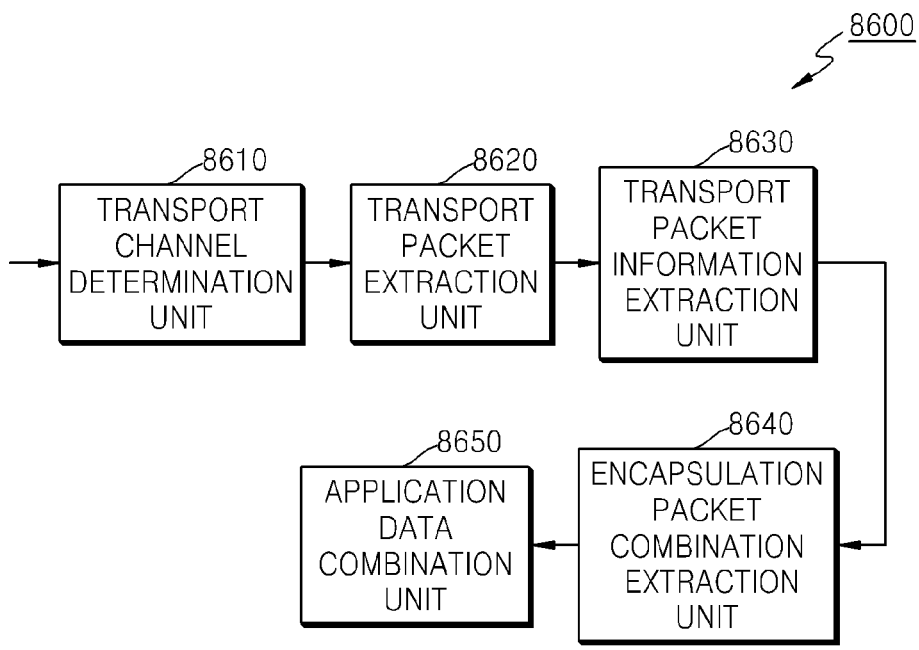
FIG. 86 is a block diagram of a broadcast service receiving apparatus according to an exemplary embodiment of the present invention.

FIG. 86 is a block diagram of an apparatus 8600 for receiving a broadcast service according to an exemplary embodiment of the present invention. Referring to FIG. 86, the apparatus 8690 includes a transport channel determination unit 8610, a transport packet extraction unit 8620, a transport packet information extraction unit 8630, an encapsulation packet combination unit 8640, and an application data combination unit 8650.

The transport channel determination unit 8610 determines a predetermined transport channel by using service configuration information extracted from a service information channel at a predetermined location on a received frame, and outputs information about the determined transport channel to the transport packet extraction unit 8620.

According to an exemplary embodiment of the present invention, information about a turbo channel and frame group information are extracted from the service configuration information.

The transport packet extraction unit 8620 extracts a transport packet from the transport channel determined by the transport channel determination unit 8610, and outputs the transport packet to the transport packet information extraction unit 8630.

The transport packet information extraction unit 8630 extracts transport packet information from the transport packet extracted by the transport packet extraction unit 8620, and outputs the transport packet information to the encapsulation packet combination unit 8640.

The encapsulation packet combination unit 8640 obtains a combination of encapsulation packets including at least one transport packet by using the extracted transport packet information, and outputs it to the application data generation unit 290.

In an exemplary embodiment of the present invention, basic configuration information, an LMT, an LIT, and a program clock reference (PCR) are extracted from the transport packet.

The application data combination unit 8650 receives the combination of the encapsulation packets from the encapsulation packet combination unit 8640, extracts encapsulation packet information from the encapsulation packets, and generates application data including at least one encapsulation packet by using the extracted encapsulation packet information.

Figure 87:
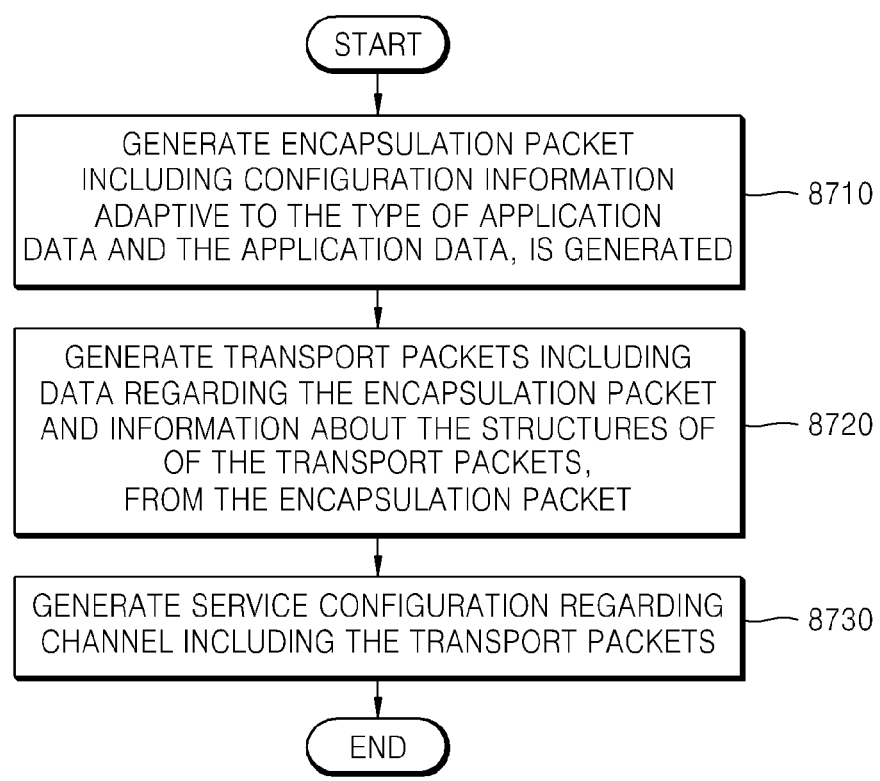
FIG. 87 is a flowchart illustrating a method of transmitting a broadcast service according to an exemplary embodiment of the present invention.

FIG. 87 is a flowchart of a method of transporting a broadcast service according to an exemplary embodiment of the present invention;

In operation 8710, an encapsulation packet including configuration information adaptive to the type of application data that is to be transported and the application data, is generated.

In operation 8720, transport packets including data regarding the encapsulation packet are obtained by dividing the encapsulation packet into predetermined-sized packets. The transport packets include information about the structures of the transport packets.

In operation 8730, service configuration information including information set about a channel including the transport packets is generated and included in a SIC at a predetermined location from among at least one transport channel on a transport stream.

Figure 88:
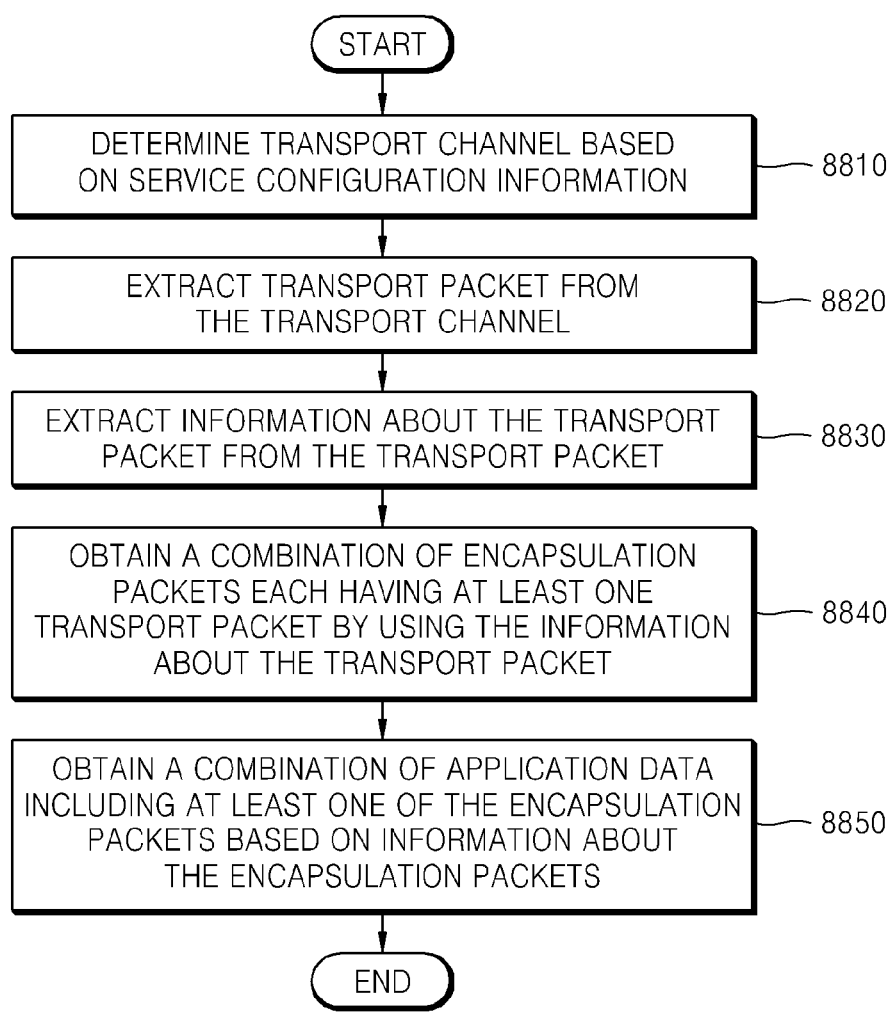
FIG. 88 is a flowchart illustrating a method of receiving a broadcast service for mobile communication according to an exemplary embodiment of the present invention.

FIG. 88 is a flowchart of a method of receiving a broadcast service for mobile communications according to an exemplary embodiment of the present invention.

In operation 8810, a predetermined transport channel is determined using service configuration information extracted from an SIC.

In operation 8820, a transport packet is extracted from the determined transport channel.

In operation 8830, information about the transport packet is extracted from the transport packet.

In operation 8840, a combination of encapsulation packets each having at least one transport packet is generated using the information about the transport packet.

In operation 8850, a combination of application data including at least one of the encapsulation packets is generated using information about the encapsulation packets which is extracted from the encapsulation packets.

The above exemplary embodiments of the present invention can be embodied as computer programs and implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

Alternatively, above exemplary embodiments of the present invention can also be embodied on a computer readable transmission medium such as carrier waves (e.g., transmission through the Internet).

The data fields, packet structures, APIs and each block of flowchart illustrations described for explaining the above exemplary embodiments of the present invention can be implemented by computer program instructions. These computer program instructions can be provided to a processor of a general-use computer, special-use computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in above-described flowchart block or blocks. The computer program instructions may also be loaded into a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block of blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order shown and/or discussed. For example, two blocks illustrated in succession may in fact be executed substantially concurrently or the blocks may sometimes be executed in the reverse order, depending upon the functionality involved.

Also, the data fields and packets illustrated in exemplary embodiments of the present invention may be replaced with other data fields and packets that can execute the same functions.

What is claimed is:

1. A method of transmitting mobile broadcast service, comprising:
   generating an encapsulation packet including application data;
   generating transport packets which have the encapsulation packet and information regarding the application data, the information regarding the application data comprises location information regarding a mobile transmission channel; and
   generating a transport stream including the transport packets,
   wherein first channel, which is one of a plurality of transmission channels included in the transport stream comprises linkage information to bind the application data with the mobile transmission channel,
   wherein second channel, which is another one of the plurality of transmission channels included in the transport stream, comprises the location information regarding the mobile transmission channel.

2. An apparatus for transmitting mobile broadcast service, comprising:
an encapsulation packet generation unit generating an encapsulation packet including application data;
a transport packet generation unit generating transport packets which have the encapsulation packet and information regarding the application data, the information regarding the application data comprises location information regarding a mobile transmission channel; and
a transport stream generation unit generating a transport stream including the transport packets,
wherein first channel, which is one of a plurality of transmission channels included in the transport stream comprises linkage information to bind the application data with the mobile transmission channel
wherein second channel, which is another one of the plurality of transmission channels included in the transport stream, comprises the location information regarding the mobile transmission channel.

* * * * *